United States Patent [19]

Shimada

[11] Patent Number: 5,576,725
[45] Date of Patent: Nov. 19, 1996

[54] IMAGE DISPLAY DEVICE

[75] Inventor: Satoshi Shimada, Kanagawa, Japan

[73] Assignee: Sony Corporation, Japan

[21] Appl. No.: 167,097

[22] Filed: Dec. 16, 1993

[30] Foreign Application Priority Data

Dec. 29, 1992 [JP] Japan .................................. 4-360471

[51] Int. Cl.$^6$ .................................................. G02B 5/18
[52] U.S. Cl. .............................. 345/32; 348/744; 359/569
[58] Field of Search ...................................... 348/744–752,
348/761, 766, 383, 59; 359/40, 569, 456,
67; 353/38, 31; 345/32, 84, 87; 340/815.53

[56] References Cited

U.S. PATENT DOCUMENTS

| | | | |
|---|---|---|---|
| 3,728,014 | 4/1973 | Rosenblum | 359/569 |
| 4,263,594 | 4/1981 | Masucci | 340/815.53 |
| 4,387,959 | 6/1983 | Lange et al. | 359/456 |
| 4,807,978 | 2/1989 | Grinberg et al. | 345/32 |
| 4,836,652 | 6/1989 | Oishi et al. | 359/40 |
| 4,872,750 | 10/1989 | Morishita | 348/59 |
| 5,053,765 | 10/1991 | Sonehara et al. | 362/32 |
| 5,101,279 | 3/1992 | Kurematsu | 348/766 |
| 5,161,042 | 11/1992 | Hamada | 359/40 |
| 5,300,942 | 4/1994 | Dolgoff | 345/32 |
| 5,353,133 | 10/1994 | Bernkopf | 359/67 |

*Primary Examiner*—Steven Saras
*Attorney, Agent, or Firm*—Ronald P. Kananen

[57] ABSTRACT

A picture display device includes, as picture projecting components, a light source unit 3 for radiating a light beam, a liquid crystal device 4 for splitting and distributing the light beam in accordance with picture signals, that is fractional picture signals associated with respective fractional pictures, a reflecting plate 6 for reflecting the light beam for guiding the reflected light beam towards the rear surface of the liquid crystal device 4, and a projection lens 5 for forming an image of each fractional picture produced by radiating the reflected light beam from the rear surface of the liquid crystal device 4. A plurality of sets of the above-described picture projecting components are provided in association with respective fractional pictures making up a full screen size picture. With the picture display device, high-quality picture display may be made with a display screen of a large size and a reduced thickness.

5 Claims, 56 Drawing Sheets

LIGHT INTENSITY

LIGHT INTENSITY

IMAGE DISPLAY DEVICE

BACKGROUND OF THE INVENTION

1. Field of the Invention

This invention relates to an image display device for an image display by projecting the image on a screen.

2. Description of the Related Art

There have hitherto been known a variety of image display devices, which may roughly be divided into a direct viewing type image display device, such as a cathode ray tube (CRT) or a liquid crystal display (LCD), in which an image displayed on a display surface is viewed, and a projection type image display device, that is an image projecting device or a projection type image display device, in which an image displayed on a projection tube (CRT) or a liquid crystal display device is projected on a screen via an optical system such as a projection lens or a reflecting mirror. The projection type image display device is subdivided into a rear projector, that is back surface projection type in which an image is projected from the back side of a transmitting screen, and a front projector, that is a front surface projection type in which an image is projected from the front side of a reflective screen.

In keeping up with the diversification in the image industry and developments in image media in information communication in recent years, the need for a high definition, large screen display is rapidly increasing. That is, there is an increasing demand for large sized screen display for household use, as well as a large size screen display for public indoor or outdoor use.

Among the direct viewing picture display devices, the picture display device employing a sole CRT, for example, does not lend itself to an increase in size because of constraints as to the strength, weight and depth. Although it is known to provide a large display surface by arranging direct-viewing small-sized CRTs in X and Y directions in a matrix configuration, the picture obtained in this manner is objectionable because of perceptible gaps between the CRTS.

As for the direct viewing picture display devices, it may be contemplated to provide a large display screen using a sole liquid crystal device. However, a large-size liquid crystal device suffers from increased equipment requirements and poor yield. Although a direct viewing large size screen may be realized by arranging a plurality of small-sized liquid crystal devices or liquid crystal units in the X and Y directions in a matrix array in the same manner as described above, the picture obtained in this manner again is objectionable because of so-called shading at a light output unit despite preventative measures, and perceptible junctions between the separate units or devices.

The projection type picture display device lends itself more easily to realization of a large size display screen because the picture is enlarged in size when projected on the screen. However, in the case of the rear projector of the projection type picture display device, the size of the device tends to increase in depth so that a device of reduced thickness cannot be easily realized despite the use of a reflective mirror for reflecting the picture from the projecting tube or the liquid crystal display device in an effort to reduce the depth. Although it is known with the rear projector to realize a large size display screen by arranging a plurality of small-size projection unit devices in the X and Y directions in a matrix configuration, lattice-shaped junctions lines are left as in the case of the direct viewing X-Y matrix array described above.

In the case of the front projector, the screen itself may be reduced in thickness so that it can be hung on the wall. However, the device suffers from insufficient picture lightness such that it cannot be employed except in a dark room or a poorly lighted chamber.

There is also known a collective type picture display device in which a large number of light emitting display elements are arrayed two-dimensionally in association with pixels of a picture for enlarging the screen size. With this device, it is not possible to reduce the pitch of the pixels without considerable difficulties.

With a so-called plasma display, it is not possible to realize a large size screen simultaneously with high brightness and prolonged service life.

Thus, up to now there remains a need for a picture display device which provides a high quality picture display with an ultra thin and large display surface.

OBJECT AND SUMMARY OF THE INVENTION

In view of the above-described status of the art, it is an object of the present invention to provide a picture display device which provides a high quality picture display with an ultra thin and large display surface.

In accordance with the present invention, there is provided a picture display device having a plurality of picture projection means for projecting a plurality of fractional pictures on a screen. The fractional pictures displayed by the picture display device on the screen is synthesized to permit the display of a screen-size picture.

The picture projection means of the picture display device according to the present invention includes a light source unit for generating source light and a fractional picture forming unit, such as a liquid crystal device, for splitting and distributing the source light based on fractional picture signals for forming the fractional picture, and a projecting lens for forming an image on the screen of the fractional picture produced by radiating the source light from the back surface of the liquid crystal device. A large number of the above-described picture projection means are provided in association with the fractional pictures making up a full screen size picture. Consequently, the full screen size picture may be projected on the screen by projecting and synthesizing the fractional pictures from the picture projection means on the screen. For achieving the picture projection with an overlap of adjacent fractional pictures, each picture projection means may be provided with a gradual decrease type projection angle control means for assuring uniform lightness on the screen of adjacent projected fractional pictures projected by adjacent picture projection means.

In the picture display device according to the present invention, the gradual decrease type projection angle control means may be designed to optically decrease the lightness on the screen of overlapping portions of the adjacent projected fractional pictures.

Specifically, the gradual decrease type projection angle control means may be realized by a plurality of, preferably two or three, optical square-shaped apertures positioned in front of and behind the projection lens. These apertures are preferably square-shaped apertures or slits similar in shape to the fractional pictures or the liquid crystal devices.

The overlapping portions of the adjacent projected fractional pictures, the lightness of which is gradually optically decreased, may be used for the entire picture on the screen.

That is, the fractional pictures adjacent to one another in both the horizontal and vertical directions may overlap each other over about at least one-half of their area so that a unitary synthesized picture is projected on the entire screen, including the overlapping portions of the unitary picture.

The overlapping portions of the adjacent fractional pictures, the lightness of which is gradually optically decreased, may also be present only in the peripheral regions of the projected fractional pictures.

In order to provide a gradual decrease type projection angle control means only in the horizontal direction and to eliminate that feature in the vertical direction, slit-shaped apertures may be used, as shown in FIGS. 55 to 59. If it is desired not to use both side projections of the fractional pictures, so that only one side projection is used, such as by providing only the gradual decrease type projection angle control means 68B or 69A or 68A and 69B, as illustrated for example in FIG. 57, a non-symmetrical projection may be achieved in which a non-limited projection towards the outside is used.

For producing adjacent projected fractional pictures with overlap in one or both of the horizontal and vertical directions, the picture projection means may be arrayed in one of the horizontal and vertical directions, or in two orthogonal directions. Each of the picture projection means may be provided with a memory circuit for storage of associated fractional picture signals, provided for each of the fractional picture forming units, such as a liquid crystal device, and a driving circuit for driving the memory circuit, in addition to the above-mentioned components including the light source unit and the gradual decrease type projection angle control means.

The driving circuit causes the memory circuit to store the fractional picture signals obtained on sampling with a small amount of shifting so that the same pictures are stored in some portions of the fractional pictures adjacent to one another in the horizontal and vertical directions, the fractional picture signals stored in said memory circuit being read from the memory circuit and transmitted to each of the fractional picture forming units during a portion of a vertical cyclic period when no writing of the fractional picture signals is being made.

Sampling of the fractional picture signals stored in the memory circuit may be made so that overlapped portions of the adjacent fractional pictures are present for the entire picture displayed on the screen. Alternatively, such sampling of the fractional picture signals stored in the memory circuit may be made so that overlapped portions of the adjacent fractional pictures are present only in peripheral portions of the projected fractional pictures.

In the picture display device according to the present invention, the gradual decrease type projection angle control means may also be designed to electrically decrease the lightness on the screen of the overlapping portions of the adjacent projected fractional pictures.

Specifically, the gradual decrease type projection angle control means may be implemented by an attenuator circuit for attenuating, such as in the horizontal and/or vertical directions, the portions of the fractional picture signals associated with the overlapping portions of the adjacent projected fractional pictures supplied from the memory circuit to the fractional picture forming units, such as the liquid crystal devices.

In the picture display device according to the present invention, three picture projection means may be grouped together as a set and the three prime colors, R, G and B, allocated to the three picture projection means for producing a color picture. The fractional pictures of R, G and B are projected by the picture projection means of the set so that no overlapping portions are produced in the displayed picture.

In the picture display device according to one embodiment of the present invention, the light source units may be grouped into sets, each preferably comprising three light source units each of which is responsible for the three prime colors R, G and B of the fractional picture, each of the fractional picture forming units being used commonly for each set of three light source units. The fractional pictures radiated by the light source units of the sets and projected on the screen by the common picture projecting units do not overlap one another.

In the picture display device according to the present invention, the light source unit of the picture projection means may comprise light radiating devices for separately producing light beams of the three primary colors R, G and B, that is a light source for R, a light source for G and a light source for B. The R, G and B light beams from the three light radiating devices are split and distributed by the fractional picture forming units based on picture signals so as to be projected on the screen to form a color picture.

The light radiating devices as the light source for R, light source for G and the light source for B may be phosphor light sources.

In the picture display device according to an embodiment of the present invention, the respective picture projection means for projecting the fractional pictures on the screen may be adapted for reflecting the light at least twice before the light is projected on the screen for reducing the length of the light path from the light source to the screen, that is for reducing the depth of the display device. In effect, the light is reflected by two reflecting mirrors so that the projected light path is presented as a Z-shape.

In the picture display device according to the present invention, the fractional pictures may be enlarged and projected on the screen for synthesizing the projected fractional pictures to make a screen-size picture. In this manner, a large size screen may be realized with high definition.

Picture synthesis may be made at this time so that the adjacent fractional pictures overlap one another in both the horizontal and vertical directions. In this manner, a continuous picture, free of junctions or geometrical distortions, may be displayed on the screen.

The fractional pictures may be projected using the R, G and B light beams for producing a color picture.

The fractional picture projecting light beams may be reflected at least twice before the light beams reach the screen in order to reduce the distance from the light source to the screen.

DESCRIPTION OF THE PREFERRED EMBODIMENTS

Figure 1:
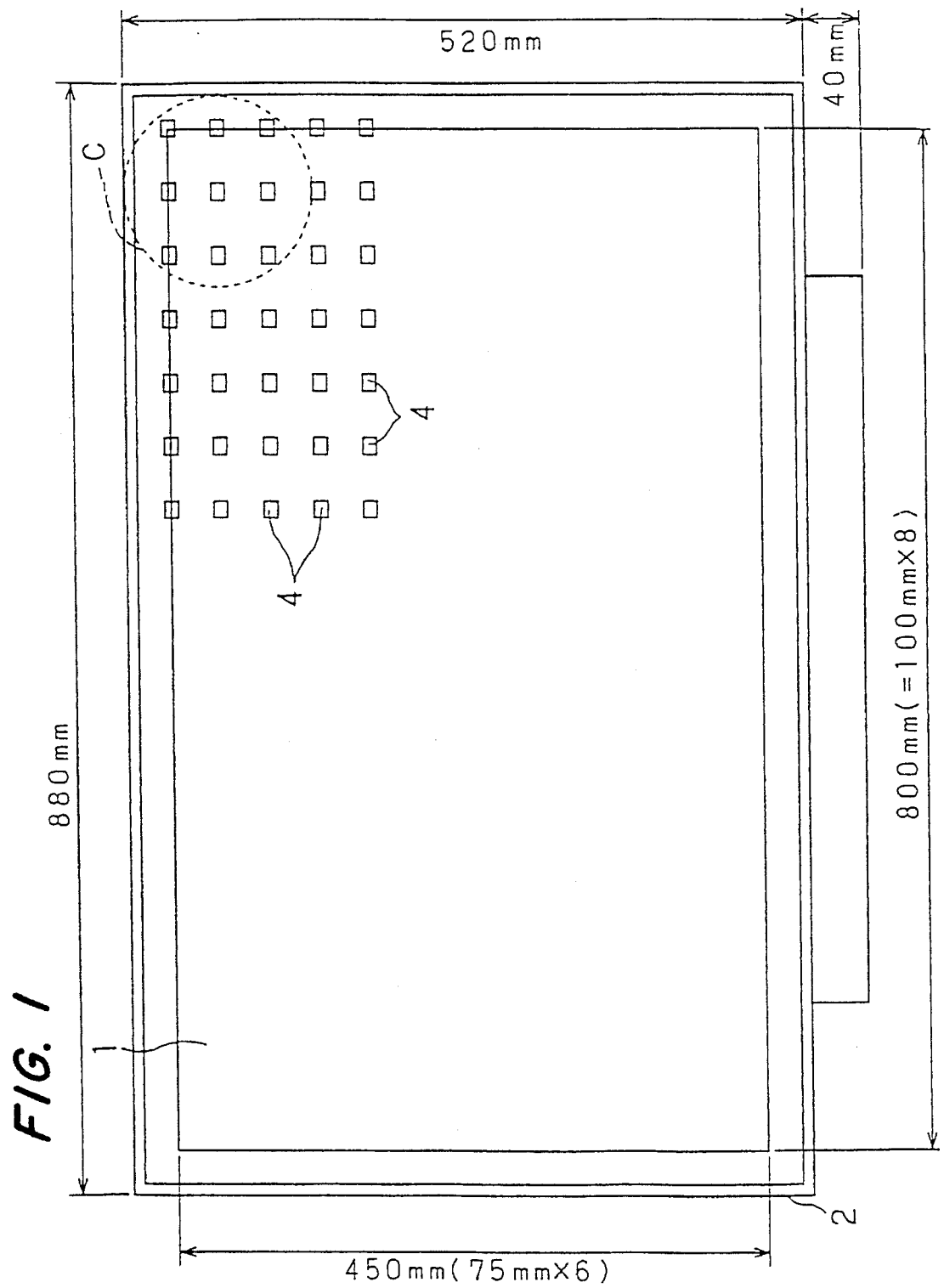
FIG. 1 is a partially see-through front view showing a picture display device according to a first embodiment of the present invention.

Referring to the drawings, illustrative embodiments of a picture display device according to the present invention are explained in detail.

Figure 2:
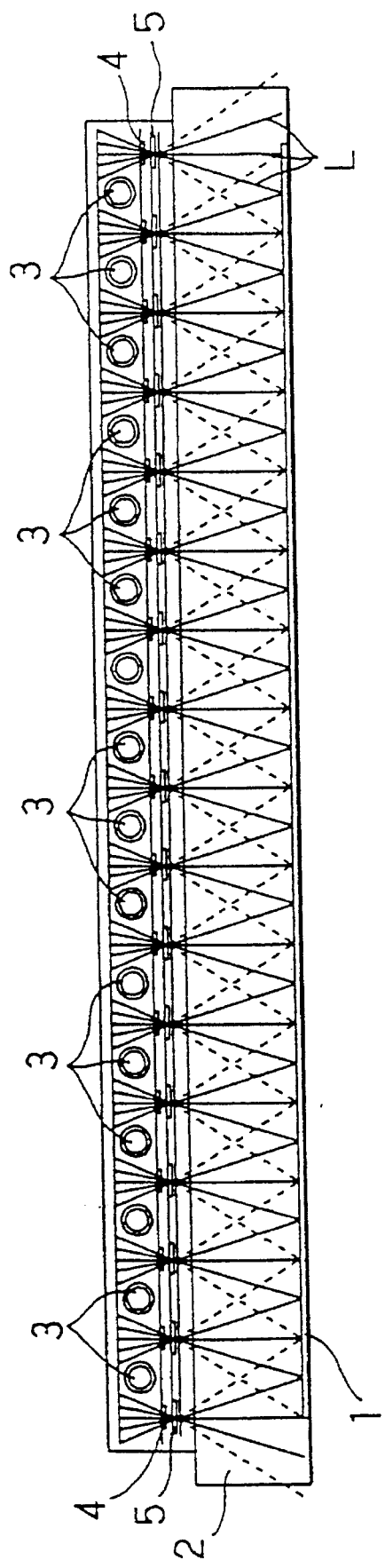
FIG. 2 is a see-through top plan view of the picture display device shown in FIG. 1.
Figure 3:
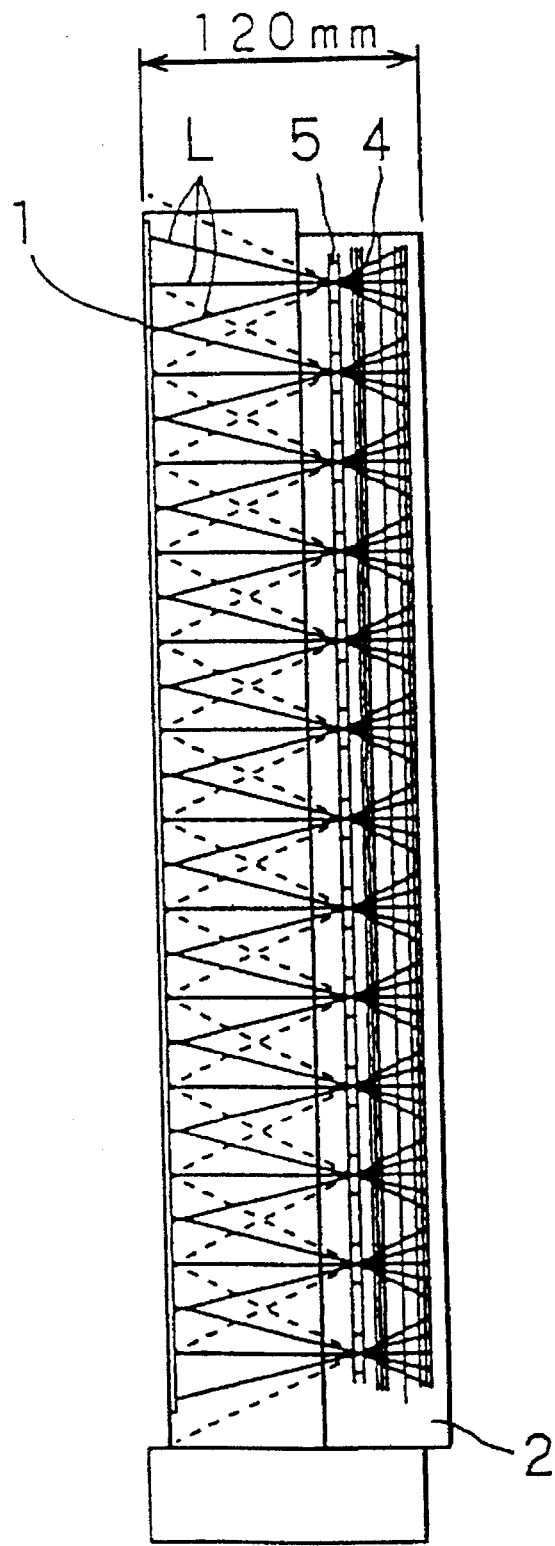
FIG. 3 is a see-through right side view of the picture display device shown in FIG. 1.

FIGS. 1 to 3 illustrate a schematic arrangement of a first embodiment of the picture display device according to the present invention. FIG. 1 shows the display device in a see-through front view, while FIGS. 2 and 3 show the display device in a partially see-through top view and right side view, respectively.

As shown in FIGS. 1 to 3, the present picture display device includes a plurality of picture projection means, such as micro-LCD projectors, arrayed in horizontal and vertical directions for projecting a plurality of fractional pictures on a viewing screen and is adapted for displaying a full picture by synthesizing the fractional pictures, projected on an enlarged scale on the screen 1 by means of these projection means, in the horizontal and vertical directions.

Figure 4:
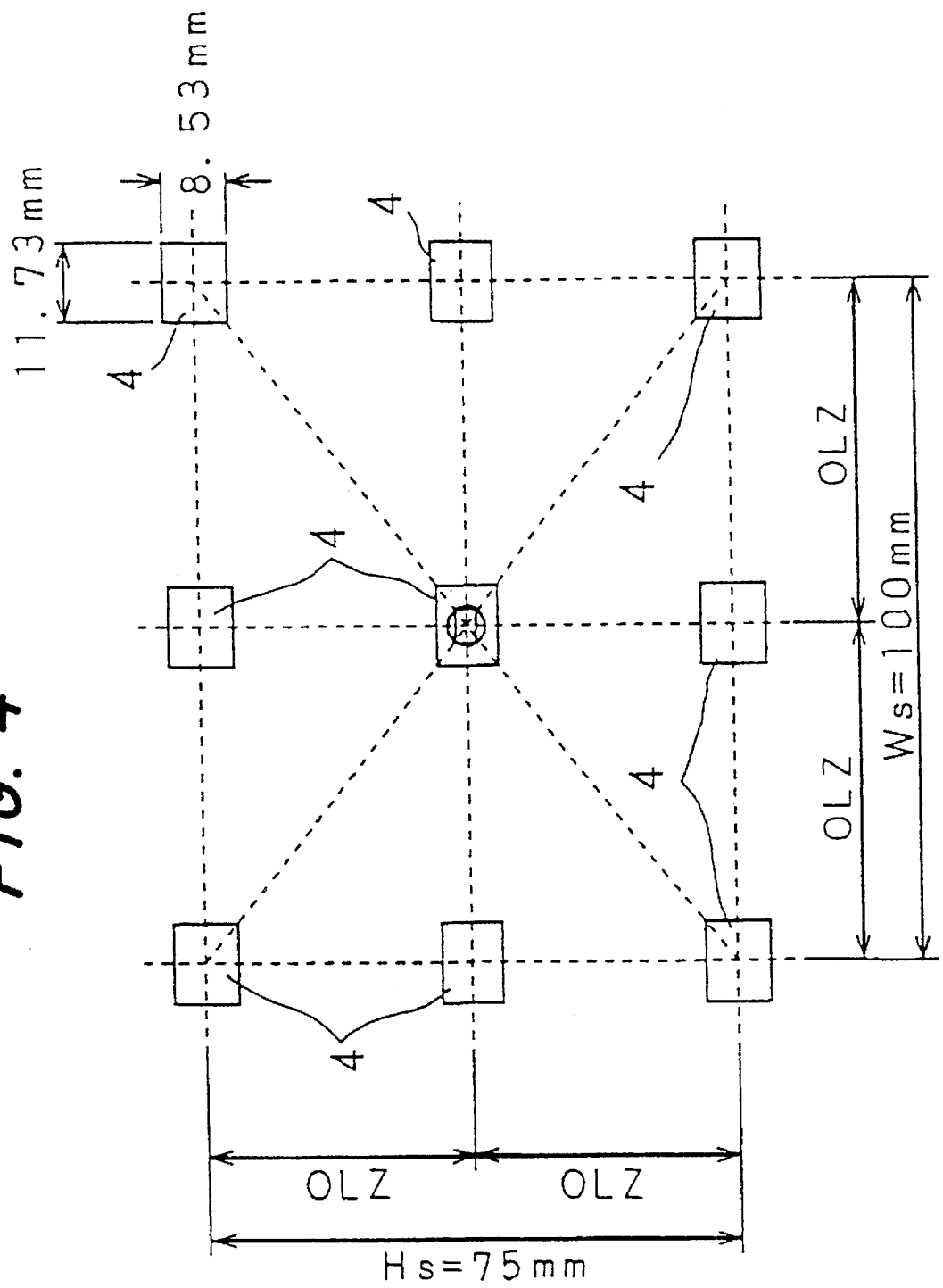
FIG. 4 is a partially enlarged see-through front view of the device shown in FIG. 1.
Figure 5:
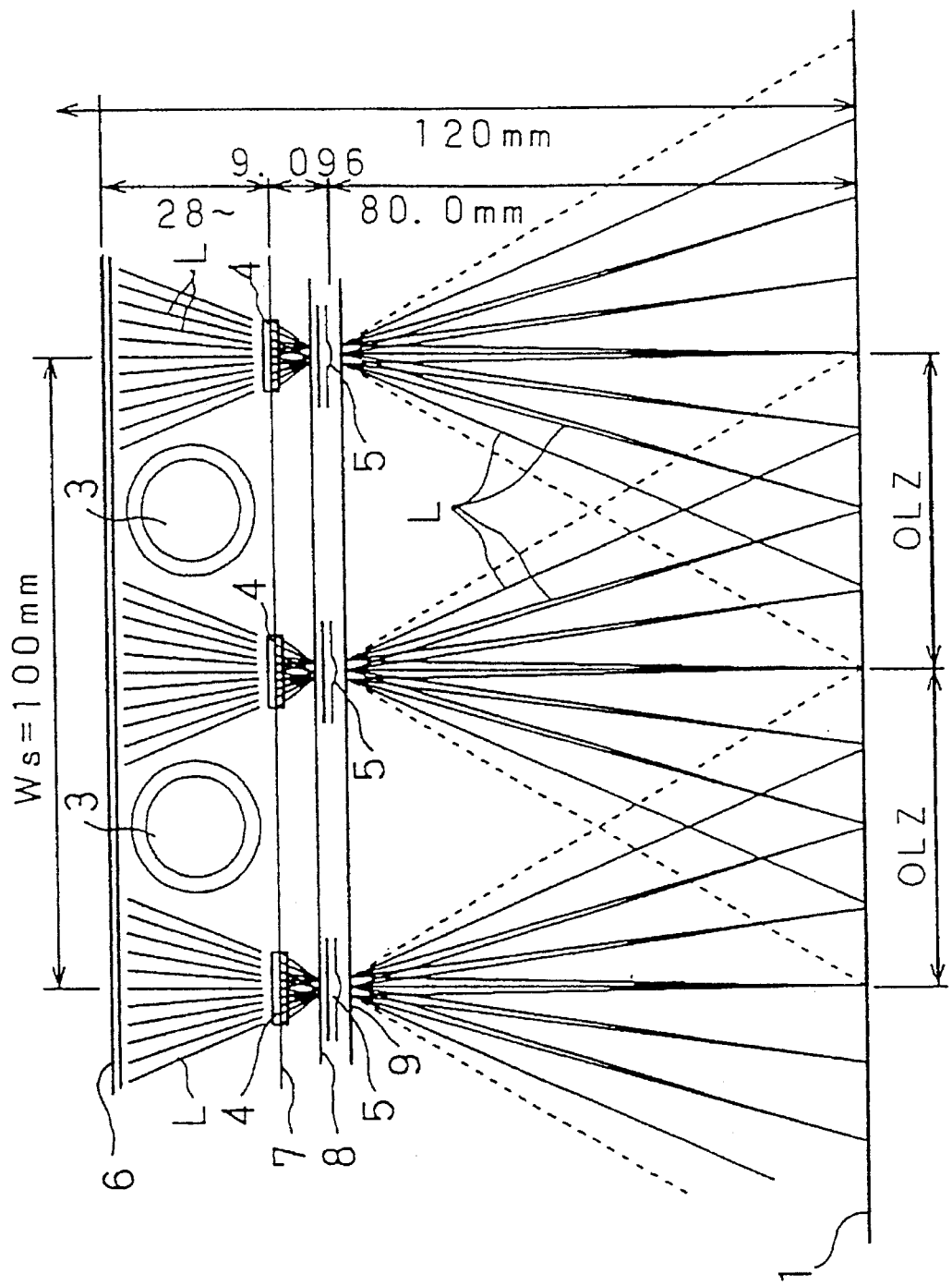
FIG. 5 is a partially enlarged see-through top plan view of the device shown in FIG. 1.
Figure 6:
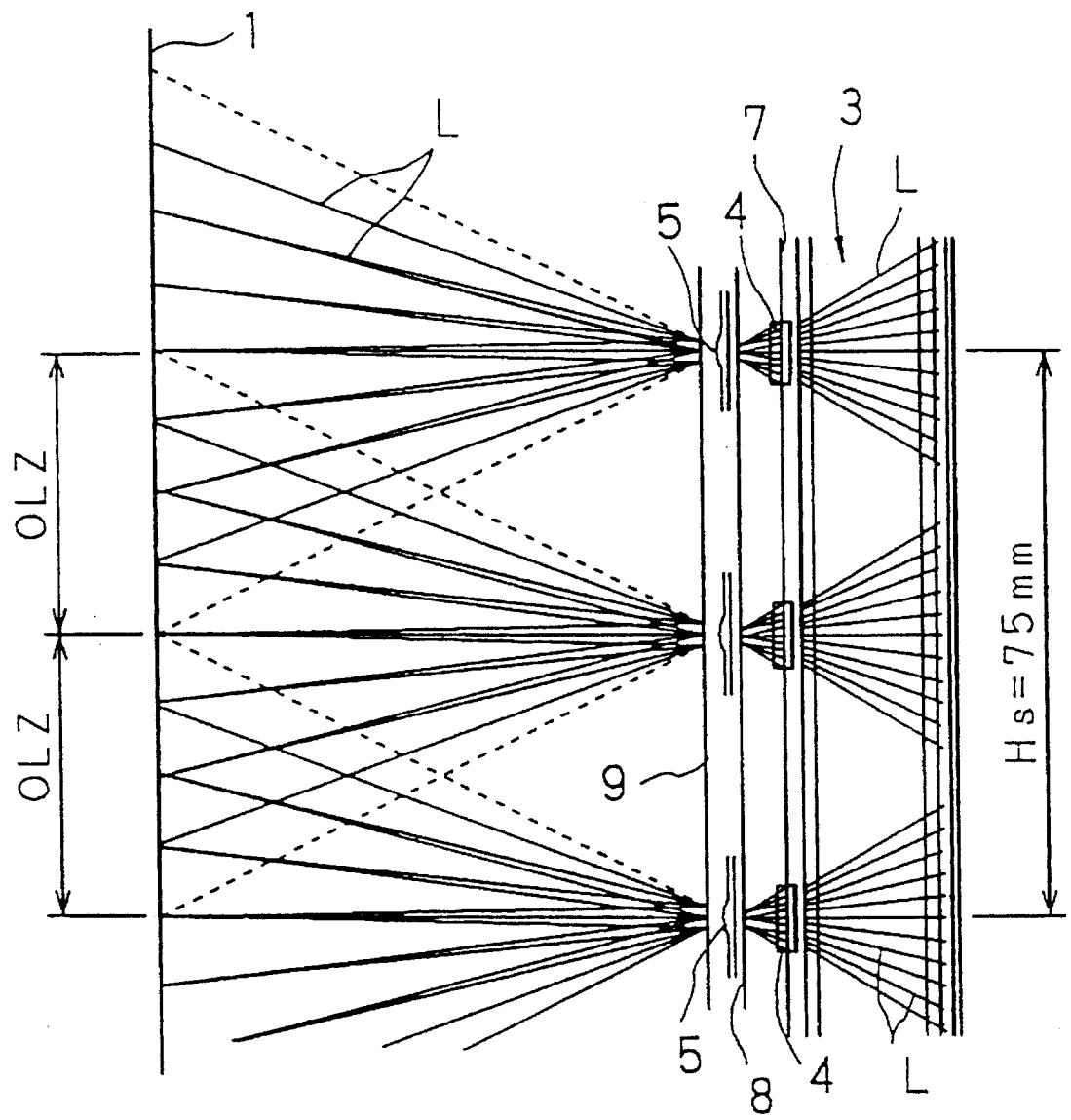
FIG. 6 is a partially enlarged see-through right side view of the device shown in FIG. 1.

Referring to FIGS. 4, 5 and 6, the portion delimited within a circle C in FIG. 1 is illustrated in an enlarged scale showing the portion C in front view, a top plan view, and right side view, respectively. The present picture display device may comprise a cylindrically-shaped light source unit 3 for radiating light, a number of liquid crystal devices 4, as fractional picture forming means, for dividing and distributing the light from the picture projecting unit 3 based on picture signals (fractional picture signals associated with the respective fractional pictures) for forming the respective fractional pictures, a reflecting plate 6 for reflecting light from the light source unit 3 and for guiding the reflected light to the rear surface of the liquid crystal device 4, and a projection lens 5 for forming, on the screen 1, a fractional picture obtained by radiating the light from the light source 3 reflected by the reflector plate 6 to the rear surface of the liquid crystal device 4. It is noted that part of FIG. 1 and FIG. 4 illustrate the arrayed positions of the liquid crystal devices 4 by a see-through drawing through the screen 1. Thus a complete screen-sized picture may be projected by projecting the fractional pictures from the picture projection means on the screen 1, at an enlarged scale, and synthesizing these fractional pictures. In FIGS. 2, 3, 5 and 6, part of the light rays of the projected picture are indicated by the letter L.

It is noted that the liquid crystal devices 4 are supported and secured on a liquid crystal supporting plate 7 which has square-shaped openings registering with the sizes of the liquid crystal devices 4 and which is secured to a housing 2. The projection lenses 5 are mounted so as to register with the liquid crystal devices 4.

The projection lenses 5 and the associated liquid crystal devices 4 may also be mounted within respective optical units which are secured to the housing 2. In front of and behind the projection lenses 5, gradual decreasing type projecting angle control plates 8, 9, which function as an optical gradual decreasing projection angle control means, and which preferably have square-shaped openings or slits as later explained, are provided and secured to the housing 2.

In the illustrated example, the housing 2 has a transverse width of 880 mm, a height of 520 mm+40 mm, and a depth of 120 mm, and the screen 1 having a transverse width of 800 mm (=100 mm ×8) and a total width of 450 mm (=75 mm×6). The picture display device has a screen size of 36 inches and weighs about 30 kg. The distance from the reflecting plate 6 to the center of the liquid crystal device 4 is 28 mm, the distance from the center of the liquid crystal device 4 to the distal end of the projection lens 5 (the apex towards the screen 1) is 9.096 mm and the distance from the distal end (apex point) of the projection lens 5 to the screen 1 is 80 mm. The center-to-center distance of the liquid crystal devices 4 is 50 mm in the horizontal direction and 37.5 mm in the vertical direction. In FIG. 4, the center-to-center distances Ws of two adjoining liquid crystal devices 4 in the horizontal and vertical directions as shown are equal to 100 mm and 75 mm, respectively. In the illustrated example of the display device, 17 ×13 or 221 liquid crystal devices 4 (micro-LCD projectors), each having an outer size of 11.37×8.53 mm, a display surface size of 0.7 inch and having 64000 pixels, are arranged to provide a color picture to be displayed to accommodate three prime colors of R, G and B, so that the resolution is approximately 4,7000,000 pixels, with a power consumption of approximately 600 W.

Figure 7:
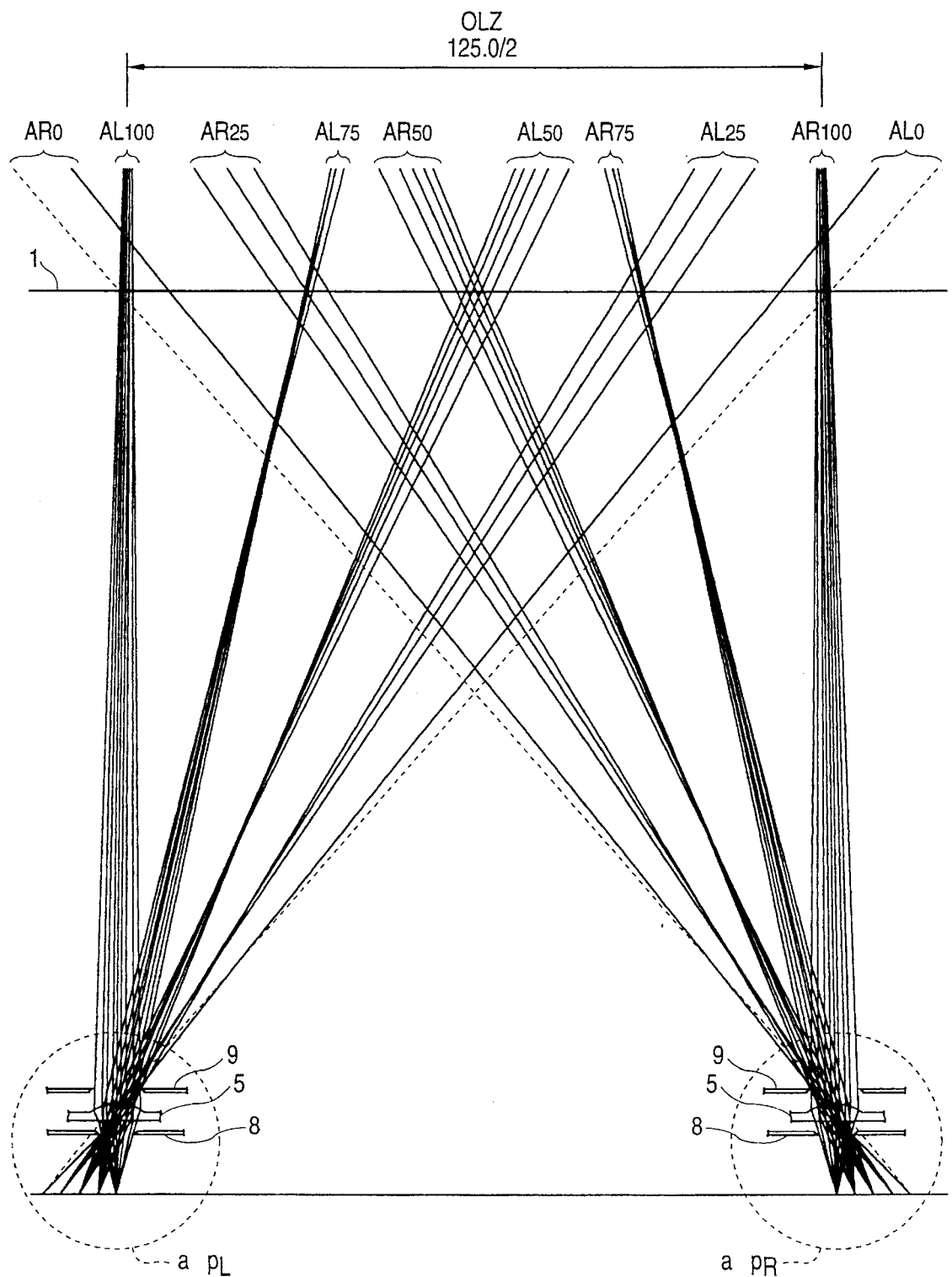
FIG. 7 illustrates the overlap of projection division partial pictures from adjoining picture projection means according to the first embodiment of the present invention.

In the above-described picture projecting device according to the first embodiment of the present invention, when a fractional picture is be projected on the screen 1 from the picture projection means as shown in FIG. 7, picture projection is accomplished in such a manner that the fractional picture projected by the adjacent picture projection means, that is fractional pictures projected by adjacent picture projection means $ap_L$ and $ap_R$ in FIG. 7, overlap one another, as indicated by the overlap zone OLZ in FIGS. 4 to 6.

In the first embodiment of the picture display device, the overlap areas of the neighboring fractional pictures on the screen 1 are present over the entire picture corresponding to the display screen. By projecting the respective fractional pictures so that at least one-half of each neighboring fractional pictures overlaps in the vertical and transverse (i.e., the vertical and horizontal) directions, with the overlapping areas containing the same picture information, a synthesized unitary picture is displayed in superposition on the entire surface.

In the present embodiment, light from adjacent picture projection means is controlled to prevent the lightness of the overlapped picture portions from becoming higher than the remaining portions to thereby provide uniform lightness over the overlapped picture portions.

In the present embodiment, a gradual decreasing type projection angle controlling means, as hereinafter explained, is provided for each of the picture projection means for causing the fractional pictures projected by the neighboring picture projection means, such as the picture projection means $ap_L$ and $ap_R$ shown for example in FIG. 7, to overlap over one-half of their area, as described above, for assuring uniform lightness over the overlapped areas.

In the first embodiment of the present invention, the overlap between the neighboring fractional pictures and the uniform lightness of the overlapped picture portions is realized by using optical square-shaped apertures RA, FA provided in front of and behind the projection lens 5 as shown in FIG. 5. In this example, these apertures are square-shaped openings or slits having a similar shape as that of a picture section or of the liquid crystal device.

Figure 8:
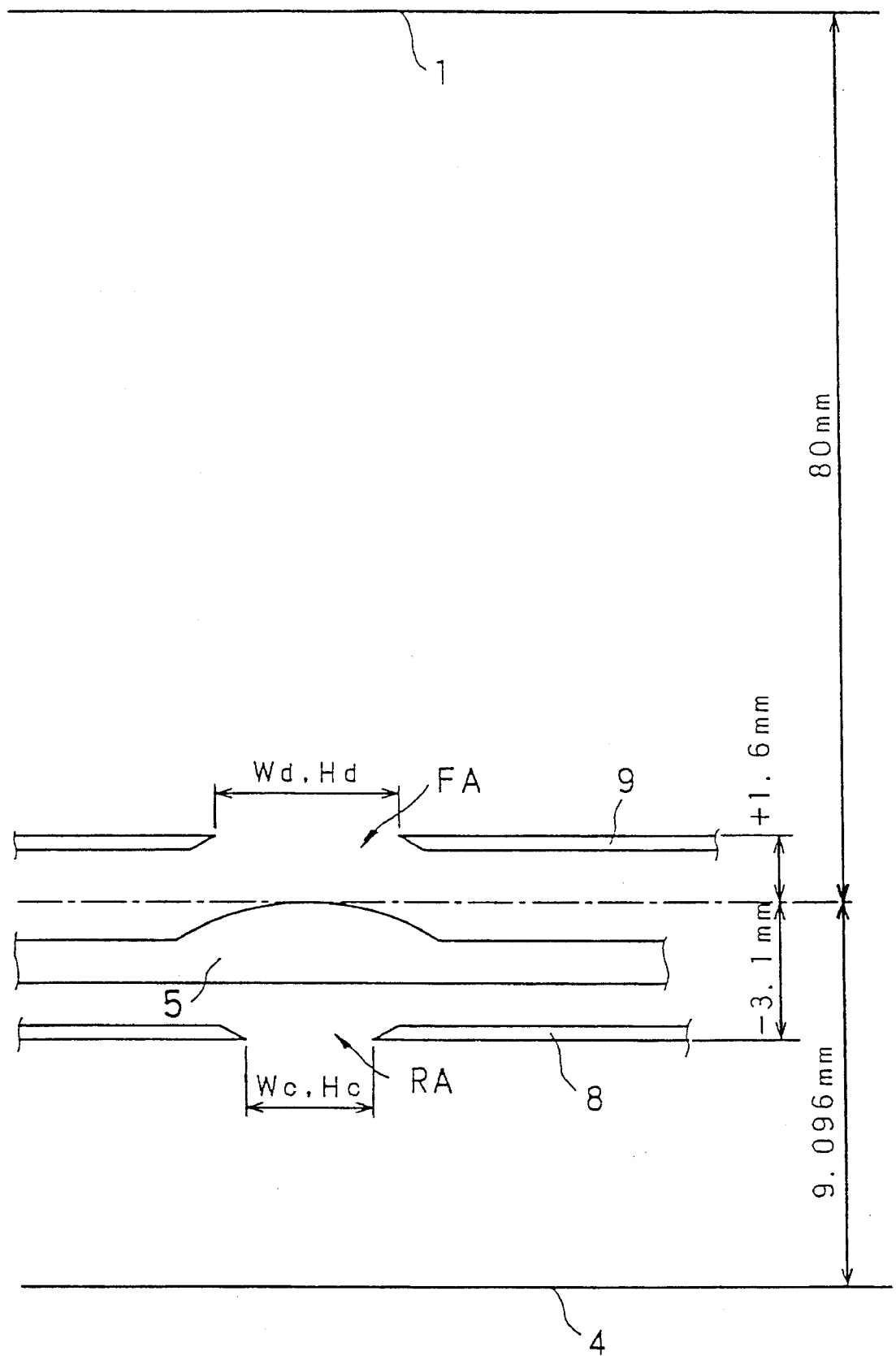
FIG. 8 illustrates the positioning of various parts of the picture projection means according to the first embodiment of the present invention.

Specifically, as illustrated in the example of FIG. 8, the square-shaped aperture RA (rear aperture) of a gradual decreasing type projection angle controlling plate 8 is provided at a position 3.1 mm back towards the liquid crystal device 4 from a point of 9.069 mm from the display surface of the liquid crystal device 4 corresponding to the point of the distal end of the projection lens 5 (an apex point inclusive of the optical axis of the screen 1), while the square-shaped aperture FA (front aperture) of a gradual decreasing type projection angle controlling plate 9 is provided at a position 1.6 mm away from the apex of the projection lens 5 towards the screen 1, for realizing the overlap between the neighboring fractional pictures and gradual optical decrease (uniformity of lightness) over the overlapped areas.

Figure 9:
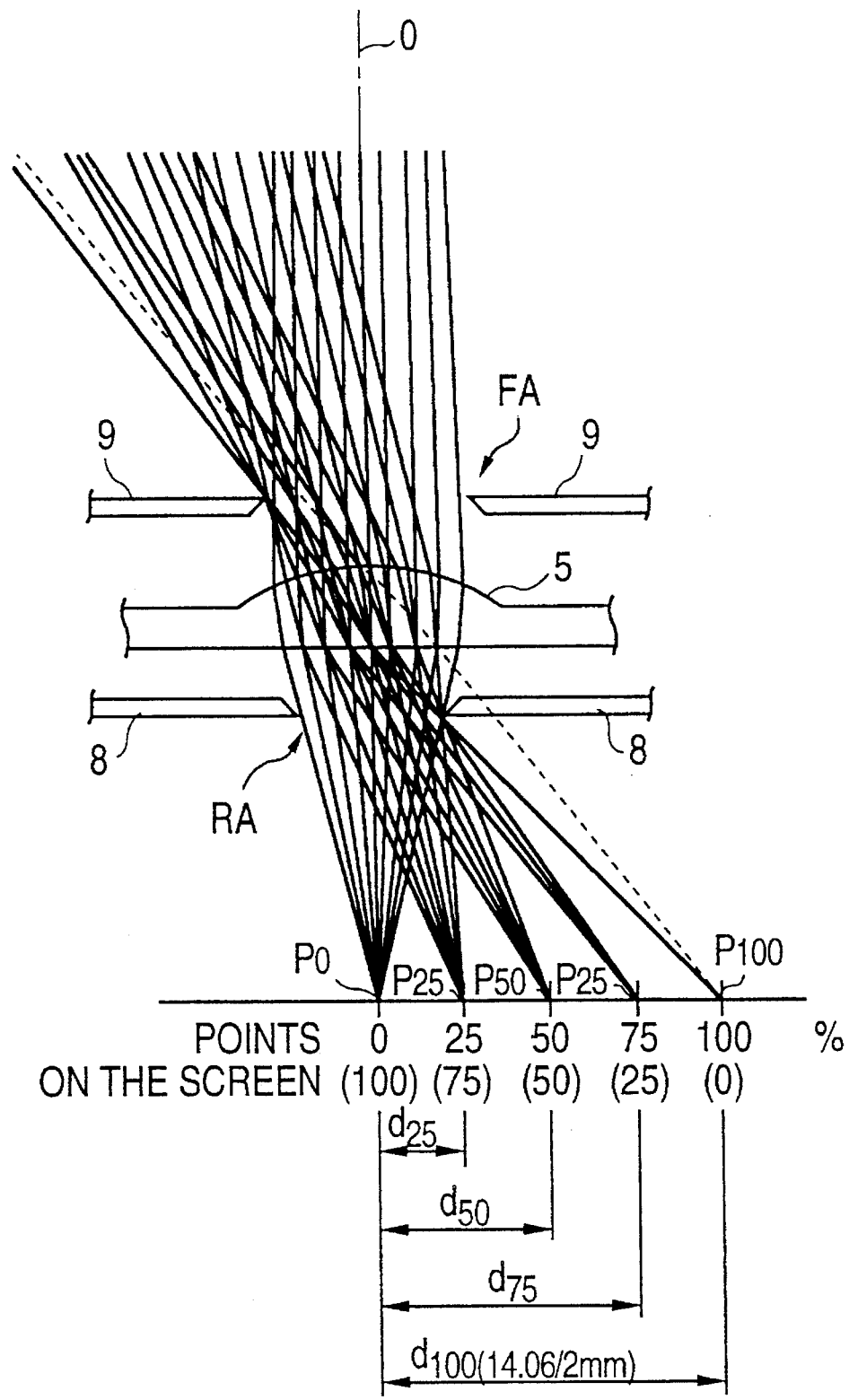
FIG. 9 illustrates the manner in which light is gradually decreased by use of a gradual decreasing type projection angle control means according to the first embodiment of the invention.

That is, in the present embodiment, the light volume from the light source unit via the liquid crystal device 4 may be gradually diminished by the rear aperture RA of the gradual decreasing projection angle control plate 8 and the front aperture FA of the gradual decreasing projection angle control plate 9, as shown in FIG. 9.

If, in FIG. 9, the volume of the light radiated from a position $P_0$ on the liquid crystal device 4, which passes through the optical axis 0 of the projection lens 5 to reach the screen 1 via the rear aperture RA and the front aperture FA, is 100% (i.e., light volume reduction of 0%), then the light radiated from a position $P_{25}$ on the liquid crystal device 4 displaced by a pre-set distance $d_{25}$ from the optical axis 0 is diminished (by interruption) by 25%. That is, only 75% of the light is radiated onto the screen 1 at that position. Similarly, the light radiated from a position $P_{50}$ on the liquid crystal device 4 displaced by a pre-set distance $d_{50}$ from the optical axis 0 is diminished (by interruption) by 50%. That is, only 50% of the light is radiated onto the screen 1 at that position. The light radiated from a position $P_{75}$ on the liquid crystal device 4 displaced by a pre-set distance $d_{75}$ from the optical axis 0 is diminished (by interruption) by 75%. That is, only 25% of the light is radiated onto the screen 1 at that position. The light radiated from a position $P_{100}$ on the liquid crystal device 4 displaced by a pre-set distance $d_{100}$ from the optical axis 0 is diminished (by interruption) by 100%. That is, 0% of the light is radiated onto the screen 1 at that position. By use of the rear aperture RA and the front aperture FA, the area of overlap between the neighboring projected fractional pictures becomes equal to one-half of their respective areas.

With the present embodiment, by gradually decreasing the light volume in each of the areas of overlap of adjacent picture sections as described above, it becomes possible to provide uniform lightness in the overlap area (which comprises one-half divisions on the screen 1) of adjacent projection means $ap_L$ and $ap_R$.

As illustrated in FIG. 7, light from the picture projection means $ap_R$ at the position on the screen 1 where the light intensity from the adjacent picture projection means $ap_L$ comprises light $AL_{100}$ (i.e., light from picture projection means $aP_L$ with the light intensity of 100%) has a light volume reduction of 0%, i.e., a light $AR_o$ has a light intensity of 0%, so that the lightness at that position on the screen 1 corresponds to the lightness of the light $AL_{100}$ from the picture projection means $ap_L$. The light from the picture projection means $ap_R$ which arrives at the position on the screen 1 where the light from the adjacent picture projection means $aP_L$ experiences a light volume reduction of 25%, i.e., light $AL_{75}$, is $AR_{25}$, which has experienced a light volume reduction of 75% so that the lightness at that position on the screen 1 corresponds to the sum of the lightness of the light $AL_{75}$ from the picture projection means $ap_L$, that is a lightness having an intensity of 75%, and the lightness of the light $AL_{25}$ from the picture projection means $ap_R$, that is a lightness having an intensity of 25%, for a total lightness of 100%. Similarly, the light from the picture projection means $ap_R$ arriving at the position on the screen 1 irradiated by light from the adjacent picture projection means $ap_L$ comprising light $AL_{50}$ (with the light intensity of 50% corresponding to a light volume reduction of 50%) is a light $AR_{50}$ (having a light intensity of 50%) so that the lightness at that position on the screen 1 corresponds to the sum of the lightness of the light $AL_{50}$ from the picture projection means $ap_L$, and the lightness of the light $AR_{50}$ from the picture projection means $ap_R$ for a total lightness of 100%. Similarly, the light from the picture projection means $ap_R$ arriving at the position on the screen 1 irradiated by light from the adjacent picture projection means $ap_L$ comprising light $AL_{25}$ (with the light intensity of 25% corresponding to a light volume reduction of 75%), is a light $AR_{75}$ (having a light intensity of 75%) so that the lightness at that position on the screen 1 corresponds to the sum of the lightness of the light $AL_{25}$, that is the lightness of the light intensity of 25%, and the lightness of the light $AR_{75}$, that is lightness of the light intensity of 75%, for a total lightness of 100%. Finally, the light from the picture projection means $ap_R$ arriving at the position on the screen 1 irradiated by the light from the adjacent picture projection means $ap_L$ comprising light $AL_o$ (with the light intensity of 0% corresponding to a light volume reduction of 0%) is a light $AR_{100}$ (having a light intensity of 100%) so that the lightness at that position on the screen 1 corresponds to the lightness of the light $AR_{100}$ from the picture projection means $ap_R$, that is a lightness of light intensity of 100%.

Thus, in the above-described first embodiment of the picture projecting device, the one-half area divisions in which the neighboring fractional pictures overlap on the screen 1 are of uniform lightness.

In the exemplary first embodiment, as illustrated in FIGS. 8 and 9, the pre-set distance $d_{100}$ is one-half of 14.06 mm of the length of a diagonal line of the liquid crystal device 4, or 14.06 /2 mm. The rear aperture RA has a transverse width Wc=Dc×4/5 mm and a longitudinal width Hc=Dc×3/5, where Dc=3.0 mm. Similarly, the front aperture FA has a transverse width Wd=Dd×4/5 mm and a longitudinal width Hd=Dd×3/5, where Dd=4.1 mm. The projection lens 5 has its side facing the liquid device 4 flat while having its side facing the screen 1 in the form of a convex lens of +4.25 mm, with 1/f=1/a+0.1/b=1/8.17 mm, an F number=f/De= 1.99 (center) and a multiplication factor=×8.795, where a=9.096 mm, b=80.0 mm, De=4.10 mm and D2=5.20 mm, f being a focal length.

The manner in which light intensity on the screen 1 is rendered uniform by the gradual decrease characteristics of light intensity by an arbitrary gradual decrease type projection angle control means (rear aperture RA and front aperture FA) and by the gradual decrease type projection angle control means adjacent to the arbitrary gradual decrease type projection angle control means is explained by referring to FIGS. 10 to 13. In these figures, light intensity ranging from 0% (minimum level) up to 100% (maximum level) is shown.

Figure 10:
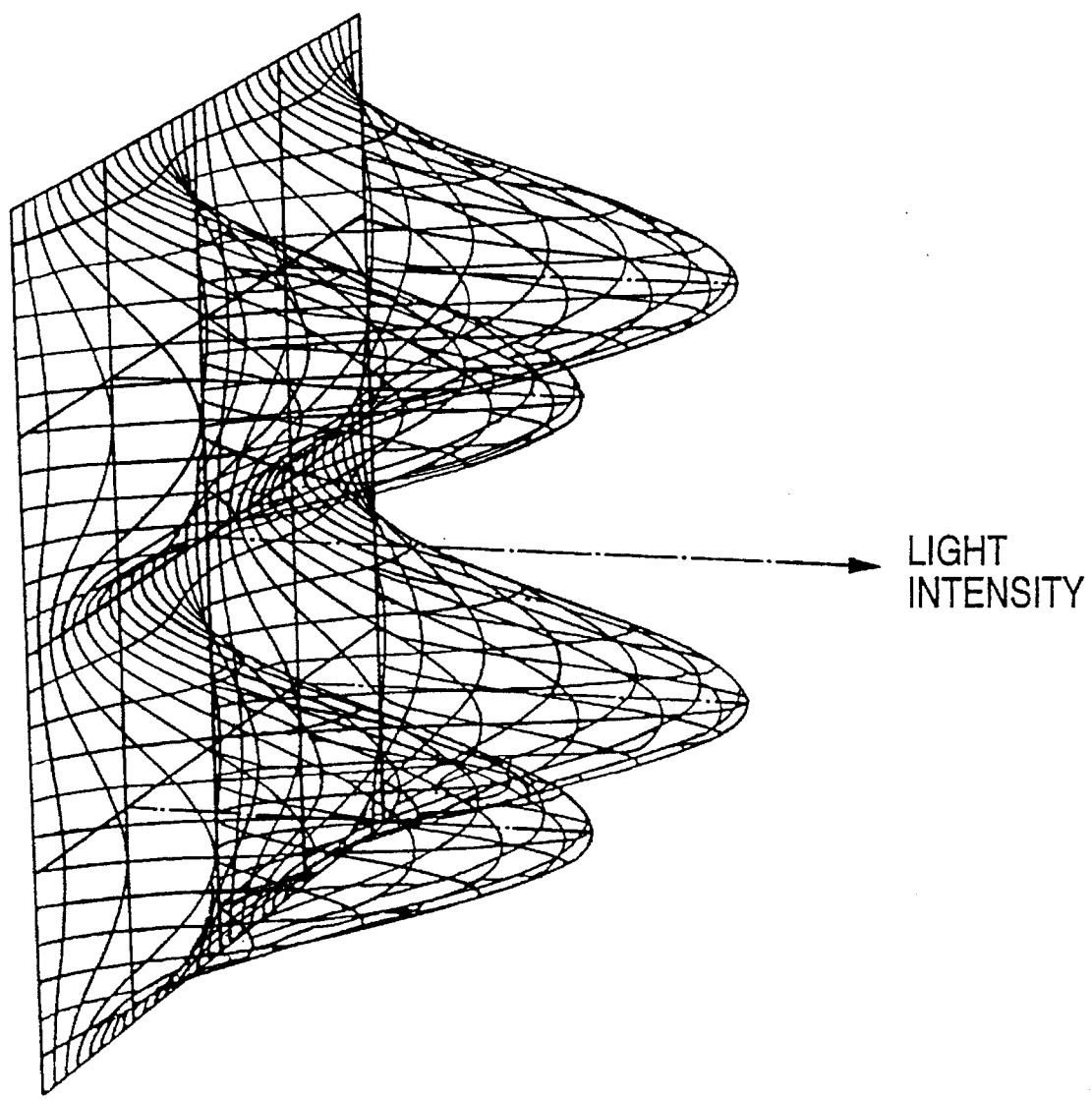
FIG. 10 illustrates the gradual decrease characteristics of the light intensity when using adjacent gradual decreasing type projection angle control means according to the first embodiment of the present invention.

FIG. 10 schematically illustrates gradual decrease characteristics in light intensity by the neighboring gradual decrease type projection angle control means in which the neighboring fractional pictures do not overlap with one another. Referring to FIG. 10, the respective gradual decrease type projection angle control means have a gradual decrease of the light intensity characteristics as shown by equation (1):

$$(\cos\theta x)^2 \times (\cos\theta y)^2 \quad (1)$$

where $\theta_x$ indicates a projecting angle in an x-direction and $\theta_y$ indicates a projecting angle in a y-direction.

Figure 11:
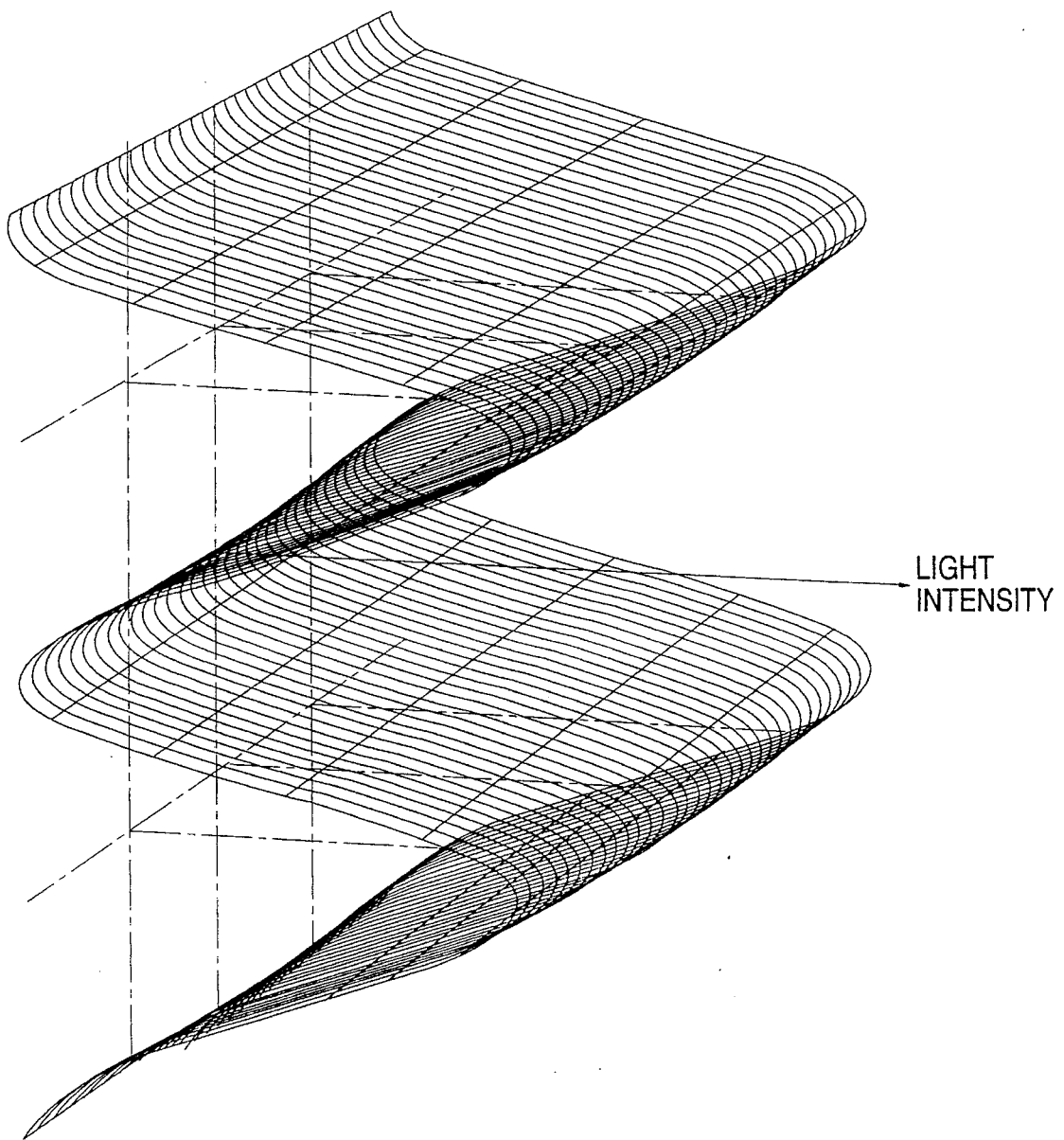
FIG. 11 illustrates the gradual decrease characteristics of the light intensity when using a gradual decreasing type projection angle control means provided a position shifted by $2/\pi$ along the horizontal direction according to the first embodiment of the present invention.

In contrast to FIG. 10, FIG. 11 schematically illustrates a gradually decreasing characteristic of light intensity in which fractional pictures in the horizontal direction (x-direction) overlap for use with the gradual decrease type projection angle control means having the gradually decreasing characteristic shown in FIG. 10. That is, FIG. 11 illustrates the characteristics when the gradual decrease type projection angle control means having the gradually decreasing characteristic according to the equation (1) is provided at a position shifted by $\pi/2$ in the horizontal direction between the neighboring gradual decrease projection angle control means. In the case of FIG. 11, the characteristic is indicated by equation (2):

$$((\cos\theta x)^2 + (\cos(\pi/2 - \theta x))^2) \times (\cos\theta y)^2 \quad (2)$$

Figure 12:
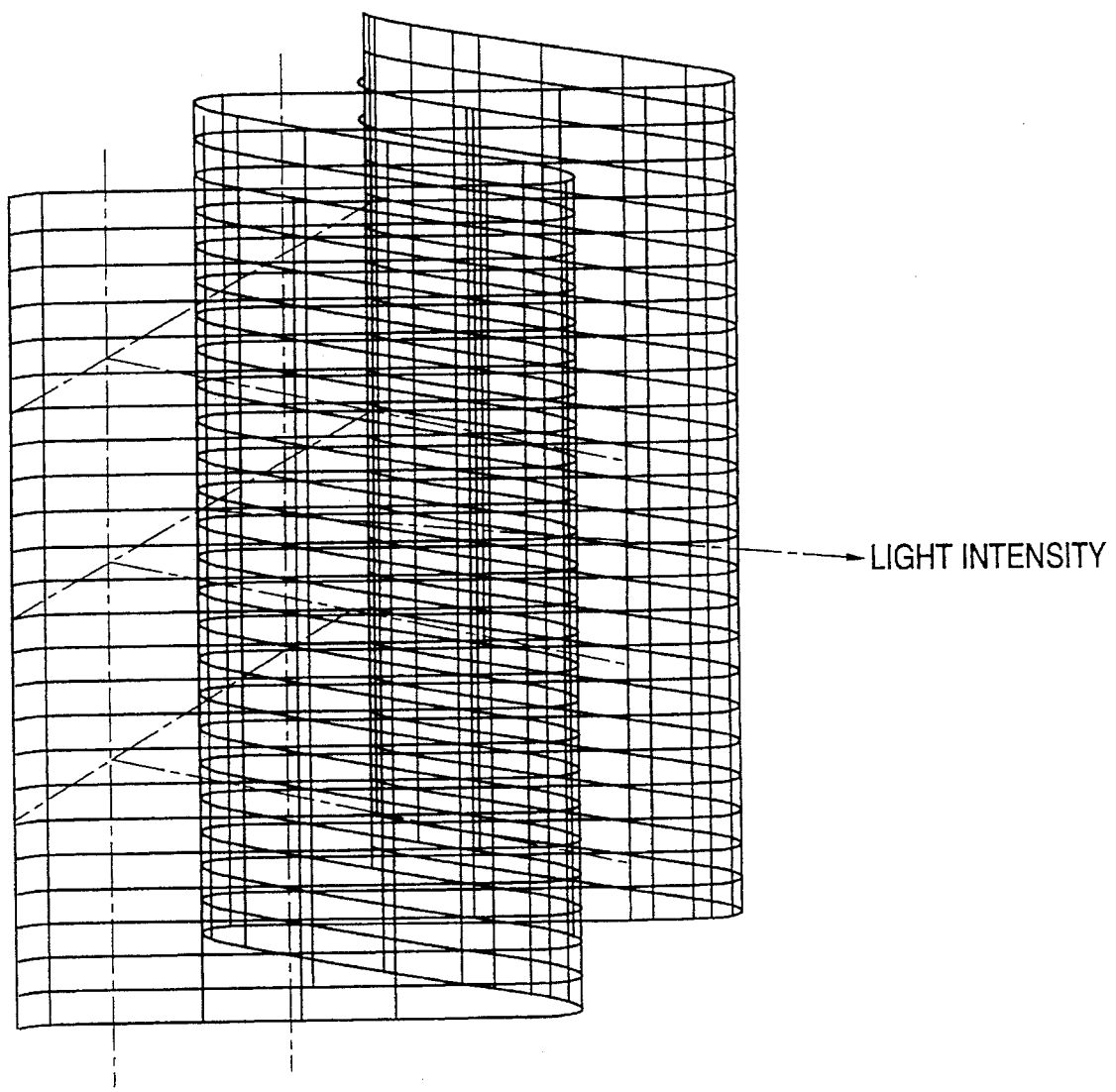
FIG. 12 illustrates the gradual decrease characteristics of the light intensity when using a gradual decreasing type projection angle control means provided at a position shifted by $2/\pi$ along the vertical direction in the first embodiment of the present invention.

FIG. 12 schematically illustrates a gradually decreasing characteristic of light intensity in which fractional pictures in the vertical direction (y-direction) overlap for use with a gradual decrease type projection angle control means having gradual decrease characteristic shown in FIG. 10. That is, FIG. 12 illustrates the characteristic when the gradual decrease type projection angle control means having the gradually decreasing characteristic according to the equation (1) is provided at a position shifted by $\pi/2$ in the vertical direction between neighboring gradual decrease projection angle control means. In the case of FIG. 12, the characteristic is indicated by an equation (3):

$$(\cos\theta x)^2 \times ((\cos\theta y)^2 + (\cos(\pi/2 - \theta y))^2) \quad (3)$$

Figure 13:
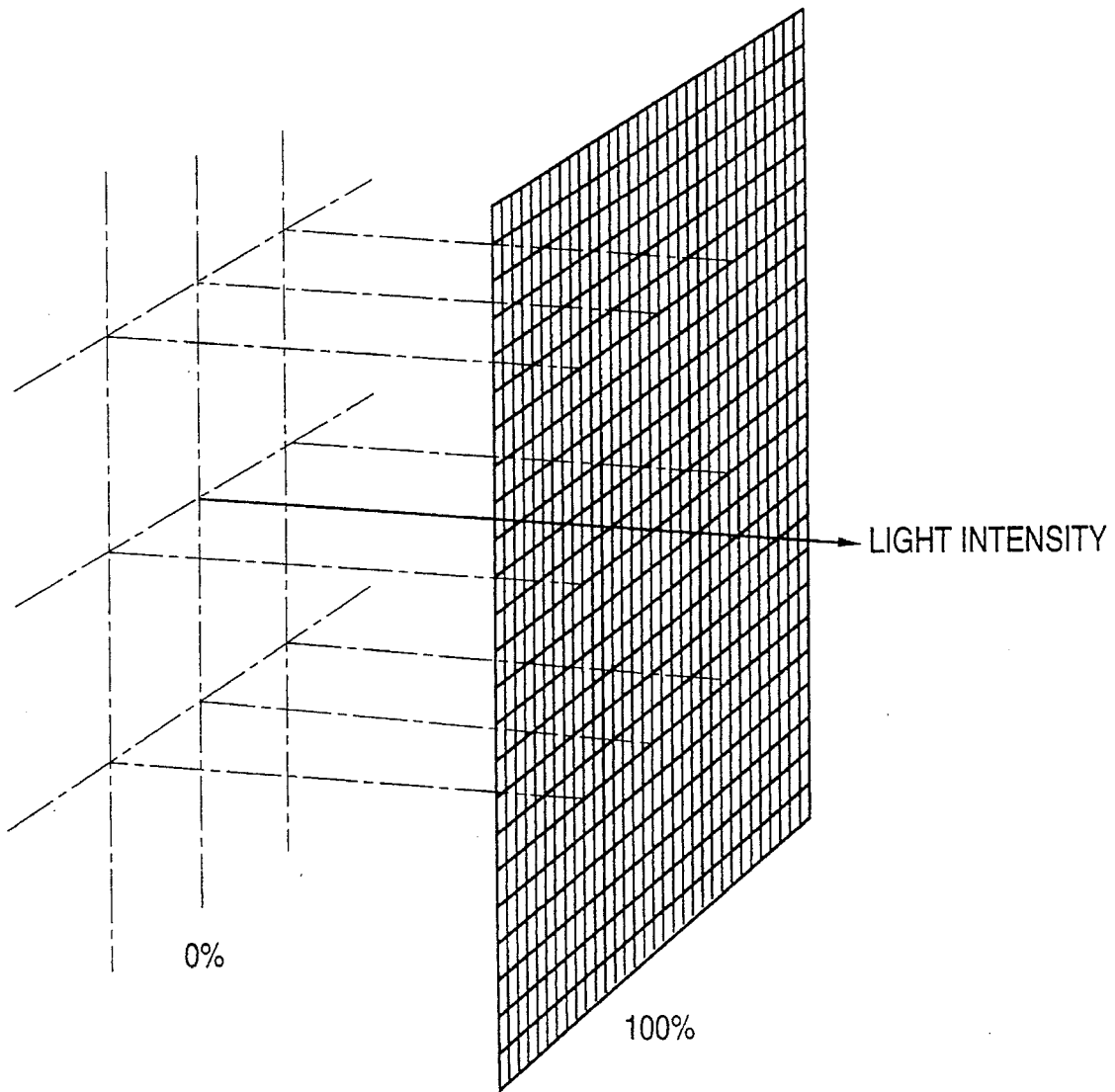
FIG. 13 illustrates the gradual decrease characteristics of the light intensity when using a gradual decreasing type projection angle control means provided at positions shifted by $2/\pi$ along the horizontal and vertical directions according to the first embodiment of the present invention.

FIG. 13 schematically illustrates a gradually decreasing characteristic of the light intensity in which picture sections in the horizontal direction (x-direction) and in the vertical direction (y-direction) overlap for use with the gradual decrease type projection angle control means with the gradually decreasing characteristic shown in FIG. 10. That is, FIG. 13 illustrates the characteristics when the gradual decrease type projection angle control means having the gradually decreasing characteristic according to the equation (1) is provided at a position shifted by $\pi/2$ in the horizontal direction and at a position shifted by $\pi/2$ in the vertical direction between the neighboring gradual decrease projection angle control means. In the case of FIG. 13, the characteristics of the whole is indicated by equation (4):

$$((\cos\theta x)^2 + (\cos(\pi/2 - \theta x))^2) \times ((\cos\theta y)^2 + (\cos(\pi/2 - \theta y))^2) \quad (4)$$

That is, the characteristic of FIG. 13 is such that the light intensity on the screen 1 becomes uniform. That is, the light intensity over the entire screen is 100%.

In the above explanation, with reference to FIGS. 1 to 9, the overlap areas between the neighboring fractional pictures in which the light intensity is optically gradually decreased by the gradual projection angle control means is adapted to overlap for over one-half of the divisions between the adjacent fractional pictures for the entire picture displayed on the screen. To this end, the totality of the liquid crystal devices 4 as the fractional picture forming means are driven and supplied with picture signals in the following manner.

With the exemplary first embodiment of the picture display device of the present invention, in order to produce neighboring fractional pictures overlapping in the horizontal and vertical directions, the picture projection means are arrayed in the horizontal (H) and vertical (V) directions. The picture display device includes, in addition to components such as the light source unit 3, the liquid crystal device 4 and the gradual decrease type projection angle control means, memory circuits $111_{0101}$ to $111_{1713}$ associated with the fractional picture section forming means (liquid crystal devices 4) for storing the corresponding fractional picture signals; that is, picture data constituting the fractional pictures, and driving circuitry for driving the memory circuits $111_{0101}$ to $111_{1713}$; that is, a horizontal write address generator 104, a vertical write address generator 104, a vertical read address generator 106 and a horizontal read address generator 107, as shown in FIG. 14.

It is noted that the driving circuitry is adapted to cause adjacent memory circuits $111_{0101}$ to $111_{1713}$ in the horizontal and vertical arrays to store the fractional picture (picture data) sampled with a small constant amount of shift for storing the same picture within a portion of the fractional picture, while causing the picture section signals (picture data)to be read from memory circuits $111_{0101}$ to $111_{1713}$ for transmitting the read data to associated liquid crystal devices during the time interval of the vertical cyclic period when fractional picture data is not being written.

In the present embodiment, picture signals based on the so-called MUSE (multiple sub-Nyquist sampling encoding) signals (8.1 MHz, 33.75 kHz/60 Hz are handled as high definition television signals.

Figure 14:
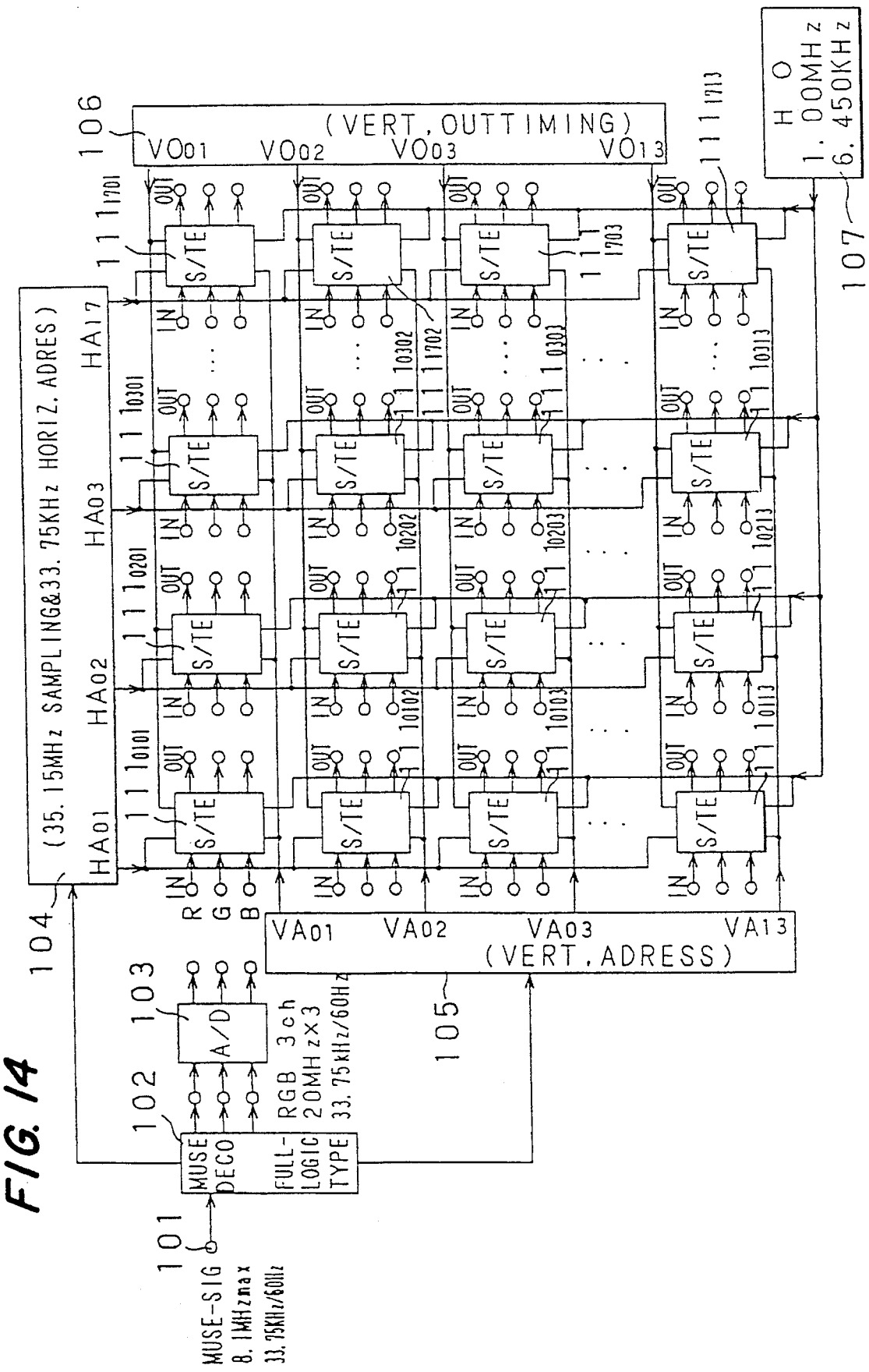
FIG. 14 is a block circuit diagram of a circuit arrangement for forming partial pictures according to the present embodiment.

Referring now to FIG. 14, the MUSE signals supplied via an input terminal 101 are decoded by a full-logic type decoder (MUSE decoder) 112 and resulting three channel signals for R, G and B prime colors (20 MHz×3, 33.75 kHz/ 60 Hz) are transmitted to an analog/digital converter (A/D) converter 103. Digital signals for three R, G and B prime colors are transmitted to 17×13=221 memory circuits $111_{0101}$ to $111_{1713}$.

Each of the memory circuits $111_{0101}$ to $111_{1713}$ may be formed by a 1-Mbit dynamic RAM for which the R, G and B digital signals are recorded and/or read by address generators 104 to 107 playing the part of the address generators.

Figure 15:
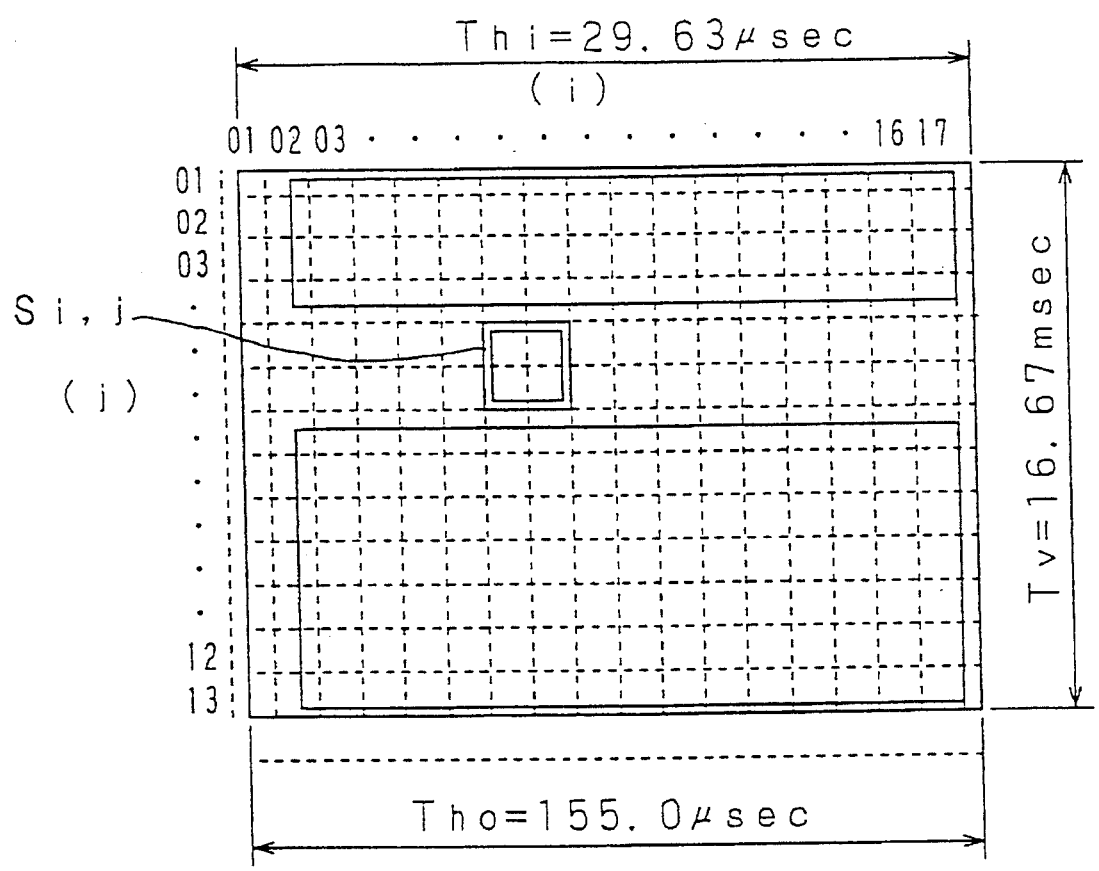
FIG. 15 is a diagrammatic view showing the relationship between the memory circuit according to the first embodiment of the present invention and the overlapping partial picture signals and the total picture of a screen.

It is noted that, in the present first embodiment, the driving circuit causes the fractional picture signals shown, for example in FIG. 15, to be stored in the memory circuits $111_{0101}$ to $111_{1713}$, in order that the overlapping regions of the neighboring sectional pictures will be present over the entire picture corresponding to the display screen.

That is, in the present embodiment, four fractional pictures, for example, as shown at $S_{i,j}$ in FIG. 15, are maintained by the memory circuits $111_{0101}$ to $111_{1713}$, in order that the overlapping regions of the neighboring sectional pictures will be present over the entire picture corresponding to the display screen.

Figure 16:
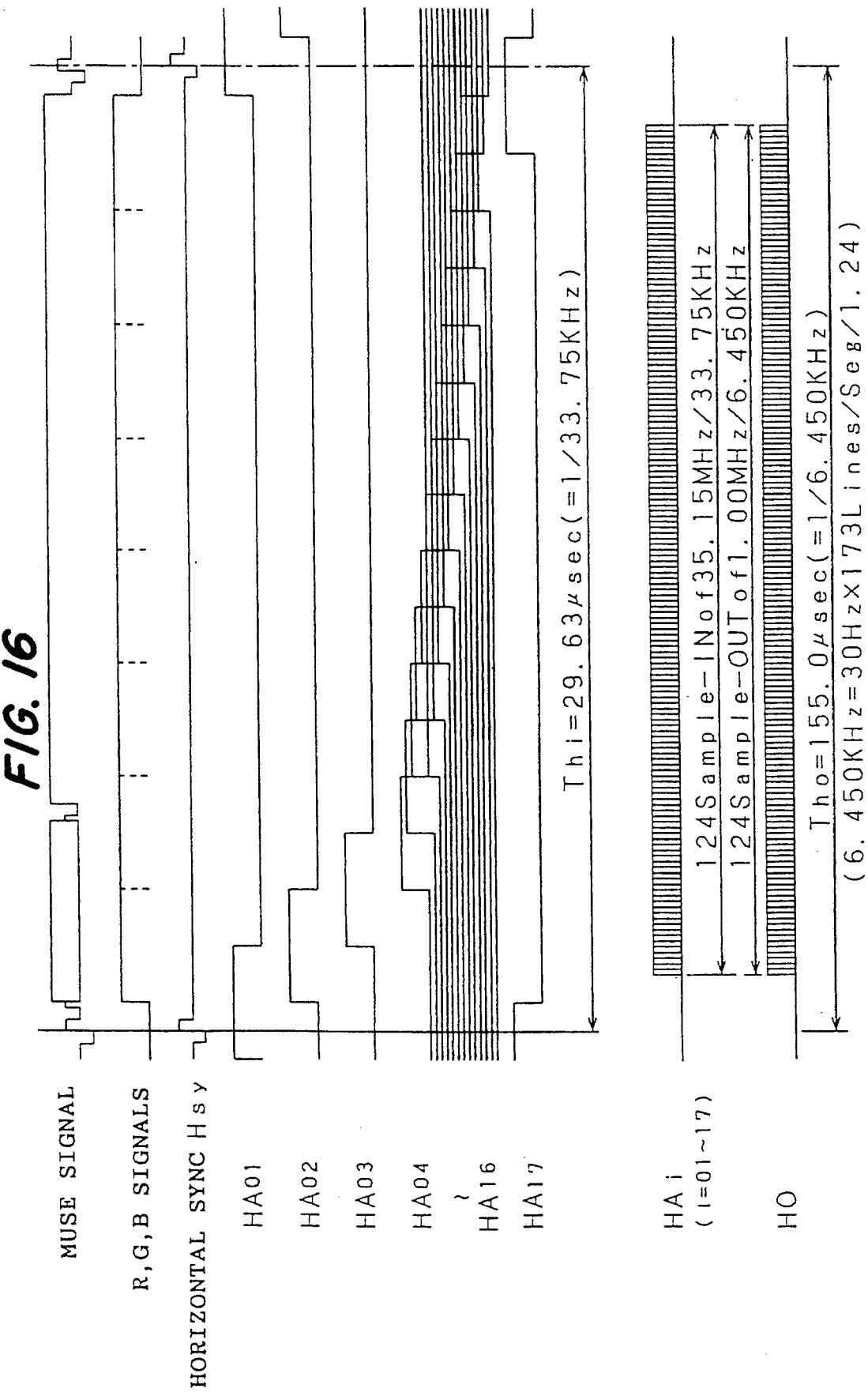
FIG. 16 is a timing chart illustrating the write timing and the read timing in the horizontal direction of the memory circuit according to the first embodiment.
Figure 17:
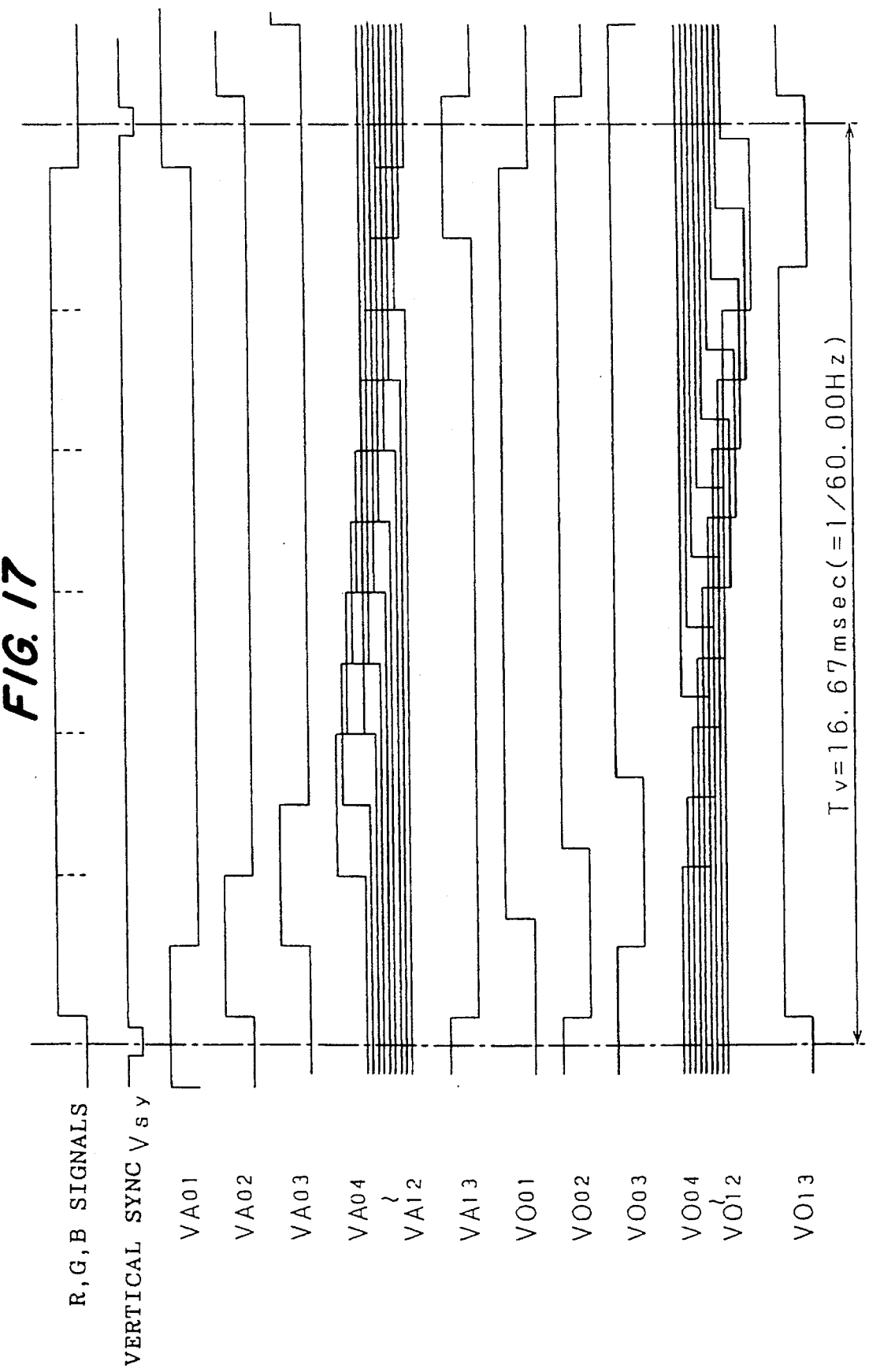
FIG. 17 is a timing chart illustrating the write timing and the read timing in the vertical direction of the memory circuit according to the first embodiment.

To this end, the address generators 104 to 107 of the driving circuit are adapted to drive the memory circuits $111_{0101}$ to $111_{1713}$ in accordance with the timing charts shown in FIGS. 16 and 17. The timing of the MUSE signals, the R, G and B signals, as well as the horizontal synchronization signals HSy, are shown in FIG. 16, while the timing of the R, G and B signals and the vertical synchronization signals VSy are shown in FIG. 17. The waveform HAi in FIG. 16 shows the signal waveform of one of horizontal write address signals $HA_{01}$ to $HA_{17}$ as later explained, to an enlarged scale, while the waveform HO in FIG. 16 shows the address signal waveform of one of horizontal read address signals HO as later explained, similarly to an enlarged scale.

That is, the horizontal address generator 104 of the driving circuit outputs horizontal write address signals $HA_{01}$ to $HA_{17}$ for memory circuits $111_{0101}$ to $111_{1713}$ on the basis of the horizontal synchronization signals HSy of Thi=1/33.75 kHz (=29.63 μsec) from the decoder 102. These horizontal write address signals $HA_{01}$ to $HA_{17}$ may comprise 35.15 MHz sampling pulses for sampling the R, G and B digital signals, with the number of samples being 124. These horizontal write address signals $HA_{01}$ to $HA_{17}$ are each generated at a period of 33.75 kHz. These horizontal write address signals $HA_{01}$ to $HA_{17}$ are generated with a small constant amount of shift, such as, e.g., a shift of a one-half period, so that the respective sectional pictures stored in the memory circuits $111_{0101}$ to $111_{1713}$ will become a single picture comprising partial areas of horizontally consecutive fractional pictures; that is, the pictures will partially overlap with one another.

The horizontal write address signal $HA_{01}$, is transmitted to memory circuits $111_{0101}, 111_{0102}, 111_{0103}, \ldots 111_{0113}$, the horizontal write address signal $HA_{02}$ is transmitted to memory circuits $111_{0201}, 111_{0202}, 111_{0203}, \ldots 111_{0213}$, the horizontal write address signal $HA_{03}$ is transmitted to memory circuits $111_{0301}, 111_{0302}, 111_{0303}, \ldots 111_{0313}$, and so forth, such that the horizontal write address signal $HA_{17}$ is transmitted to memory circuits $111_{1701}, 111_{1702}, 111_{1703}, \ldots 111_{1713}$.

The vertical read address generator 105 outputs vertical write address signals $VA_{01}$ to $VA_{13}$ for memory circuits $111_{0101}$ to $111_{1713}$ on the basis of the vertical synchronization signals VSy of Tvi=1/60.00 Hz (=16.67 μsec) from the decoder 102. These vertical write address signals $VA_{01}$ to $VA_{17}$ are generated with a small constant amount of shift, such as, e.g., a shift of a one-half period, so that the respective fractional pictures stored in the memory circuits $111_{0101}$ to $111_{1713}$, will become a single picture comprising partial areas of horizontally consecutive fractional pictures, that is, the pictures will overlap, in partial areas thereof, with one another.

The vertical write address signal $VA_{01}$ is transmitted to memory circuits $111_{0101}, 111_{0201}, 111_{0301}, \ldots 111_{1701}$, the vertical write address signal $VA_{02}$ is transmitted to memory circuits $111_{0102}, 111_{0202}, 111_{0302}, \ldots 111_{1702}$, the vertical write address signal $VA_{03}$ is transmitted to memory circuits $111_{0103}, 111_{0203}, 111_{0303}, \ldots 111_{1703}$, and so forth, such that the vertical write address signal $VA_{13}$ is transmitted to memory circuits $111_{0113}, 111_{0213}, 111_{0313}, \ldots 111_{1713}$.

The vertical read address generator 106 outputs vertical read address signals $VO_{01}$ to $VO_{13}$ at the timing of Tv=1/ 60.00 Hz (=16.67 μsec) similarly to the vertical write address generator 105. That is, these vertical write address signals $VA_{01}$ to $VA_{13}$ are generated with a small constant amount of shift, such as, e.g., a shift of a one-half period, so that the respective fractional pictures as read from the memory circuits $111_{0101}$ to $111_{1713}$, will become a single picture comprising partial areas of vertically consecutive fractional pictures, that is, the pictures will overlap, in partial areas thereof, with one another.

The vertical write address signal $VO_{01}$ is transmitted to memory circuits $111_{0101}, 111_{0201}, 111_{0301}, \ldots 111_{1701}$, the vertical read address signal $VO_{02}$ is transmitted to memory circuits $111_{0102}, 111_{0202}, 111_{0302}, \ldots 111_{1702}$, the vertical write read signal $VO_{03}$ is transmitted to memory circuits $111_{0103}, 111_{0203}, 111_{0303}, \ldots 111_{1703}$, and so forth, such that the vertical write address signal $VO_{13}$ is transmitted to memory circuits $111_{0113}, 111_{0213}, 111_{0313}, \ldots 111_{1713}$.

The horizontal read address generator 107 outputs horizontal read address signals HO for reading the stored sectional picture signals (digital R, G and B signals) from the memory circuits $111_{0101}$ to $111_{1713}$ during the time period within the vertical cyclic period when no writing of fractional picture signals by the vertical write address generator 105 is made. More specifically, in the present example, the horizontal read address signals HO may comprise 1.00 MHz pulses for reading data of 124 samples stored in the memory circuits $111_{0101}$ to $111_{1713}$ and may be generated at a period of 6.450 kHz.

The horizontal read address signals HO are transmitted to all of the memory circuits $111_{0101}$ to $111_{1713}$.

The respective R, G and B outputs of the memory circuits $111_{0101}$ to $111_{1713}$ are output via a digital/analog (D/A) converter, not shown, provided for each of the memory circuits. These output signals are transmitted to liquid crystal devices associated with the memory circuits $111_{0101}$ to $111_{1713}$.

As may be seen from FIGS. 16 and 17, the horizontal write address signals $HA_{01}$ to $HA_{17}$, the vertical write address signals $VA_{01}$ to $VA_{13}$, and the vertical read addresses $VO_{01}$ to $VO_{13}$ overlap by one-half periods so that the R, G and B digital signals held by the write address signals $HA_{01}$ to $HA_{17}$ and $VA_{01}$ to $VA_{13}$ are read based on the vertical read address signals $VO_{01}$ to $VO_{13}$ and the horizontal read address signals HO and are transmitted to the associated liquid crystal devices 4 so that the overlapping areas of the neighboring sectional pictures are present over the entire picture corresponding to the screen 1.

In the above-described first embodiment, the overlapping areas of the neighboring fractional pictures for gradually optically decreasing the lightness by use of the gradual decrease type projection angle control means are present over the entire picture corresponding to the screen 1. Alternatively, by way of a second embodiment of the present invention, the overlapping areas of the neighboring fractional pictures in which the lightness is gradually optically decreased using a gradual decrease type projection angle control means may be adapted to exist only in the peripheral regions of the fractional pictures.

Figure 18:
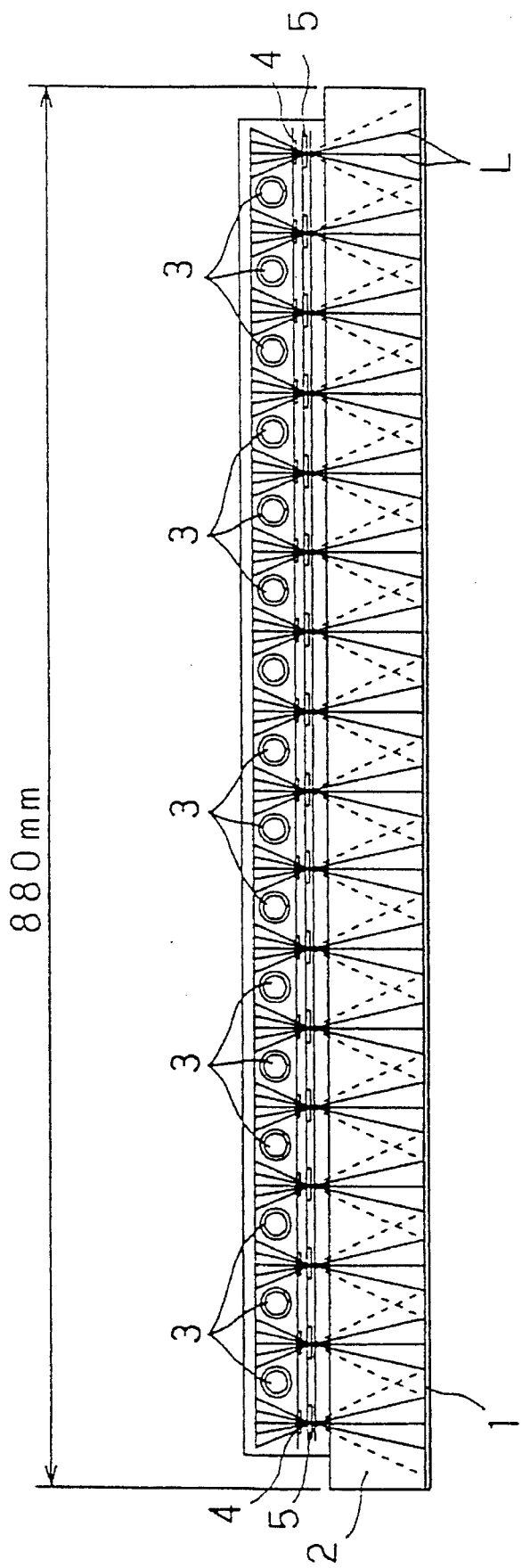
FIG. 18 is a see-through top plan view of a picture display device according to a second embodiment of the present invention.
Figure 19:
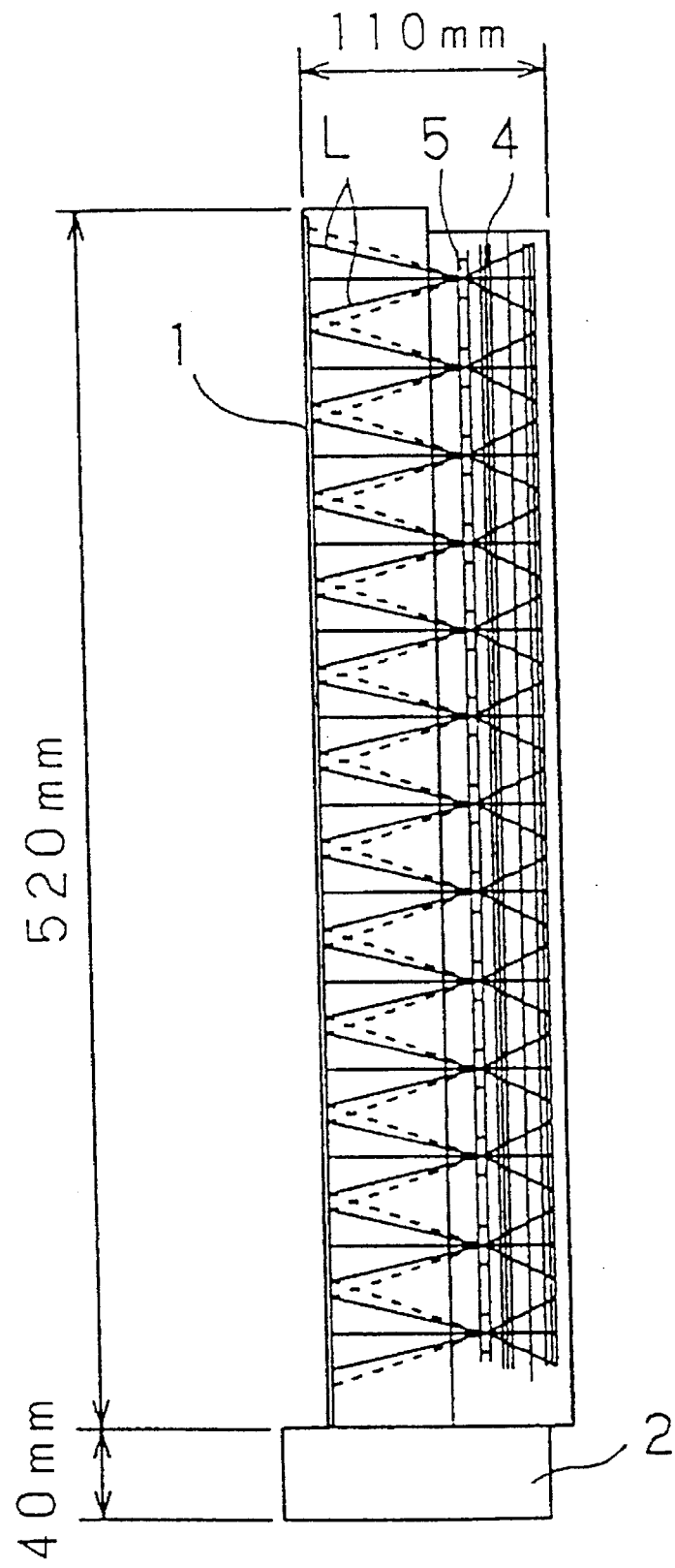
FIG. 19 is a see-through right side view of the picture display device according to the second embodiment of the present invention.

Referring now to FIGS. 18 and 19, the schematic arrangement of the picture display device of the second embodiment is explained. It is noted that the front view of the picture display device is omitted because it is similar to FIG. 1. FIGS. 18 and 19 illustrate the picture display device of the preset embodiment by a see-through top plan view and a see-through right side view, respectively.

Similarly to the picture display device of the first embodiment, the picture display device of the exemplary second embodiment includes a plurality of picture projection means (micro-LCD projectors), arrayed in the horizontal and vertical directions, for projecting a plurality of fractional pictures on a viewing screen and is adapted for displaying a full picture by synthesizing the fractional pictures projected on an enlarged scale by these projection means on the screen 1 in the horizontal and vertical directions.

Figure 20:
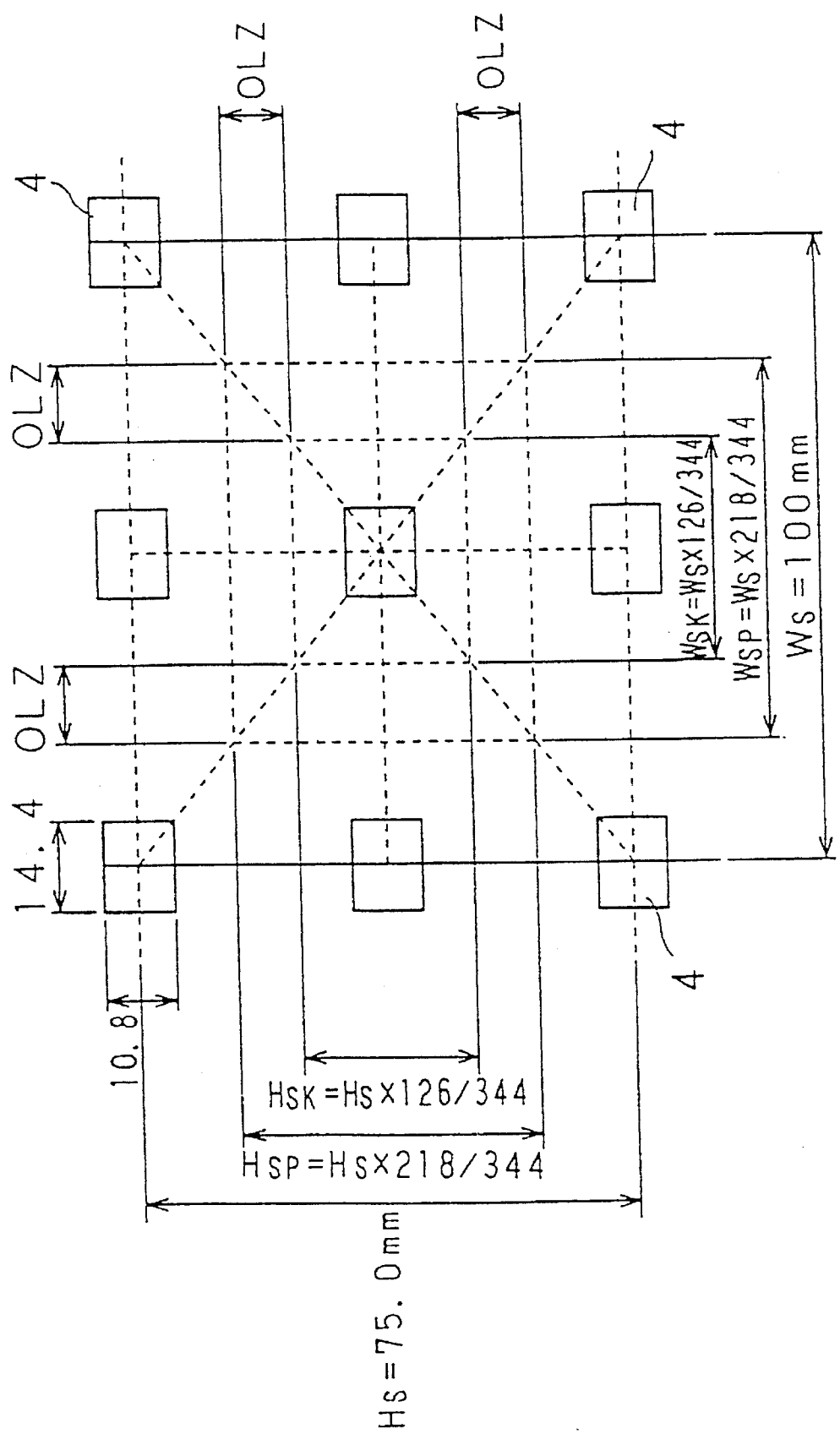
FIG. 20 is a see-through front view of the picture display device according to the second embodiment of the present invention.
Figure 21:
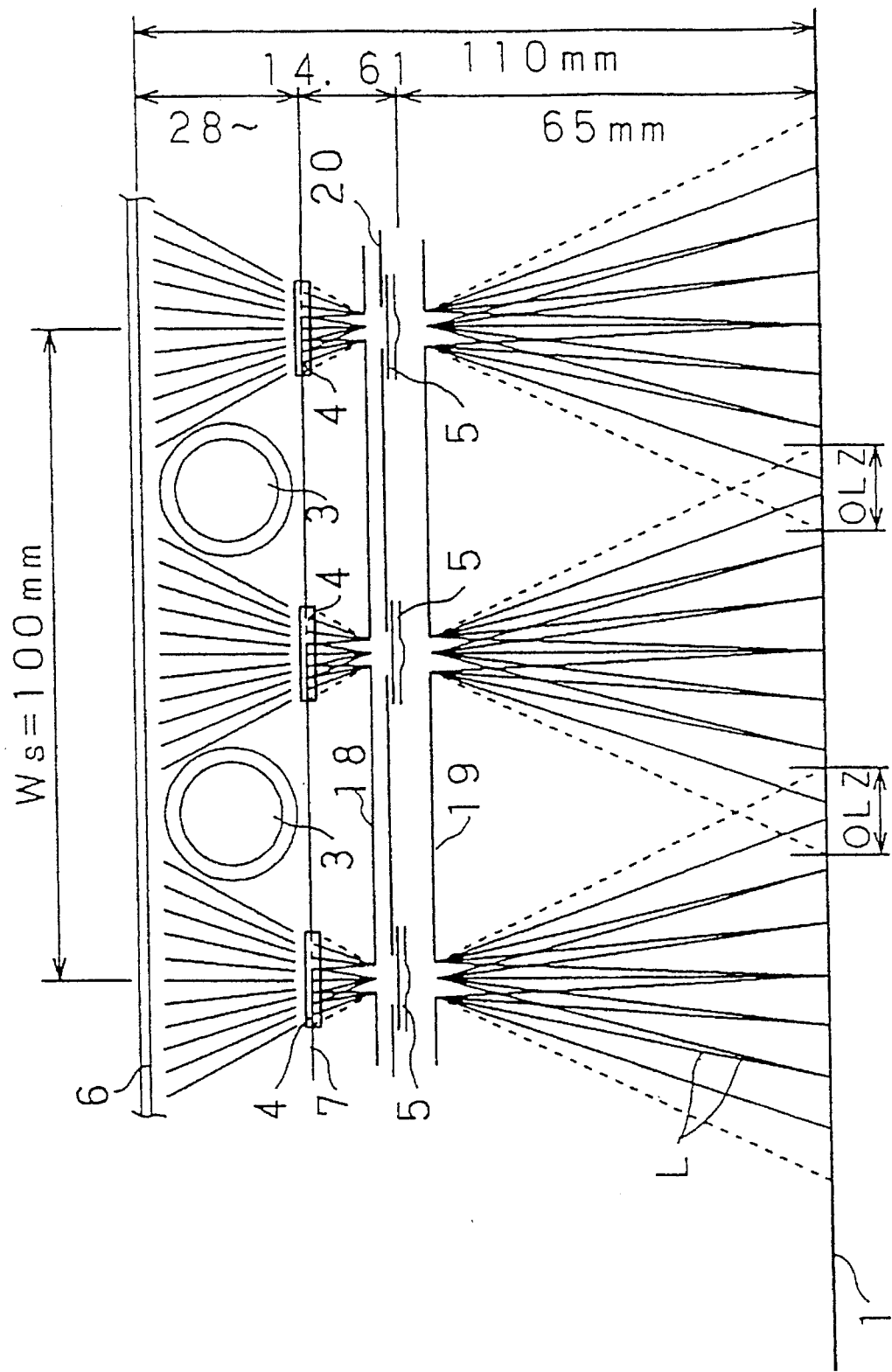
FIG. 21 is a partially enlarged see-through top plan view of the device according to the second embodiment of the present invention.
Figure 22:
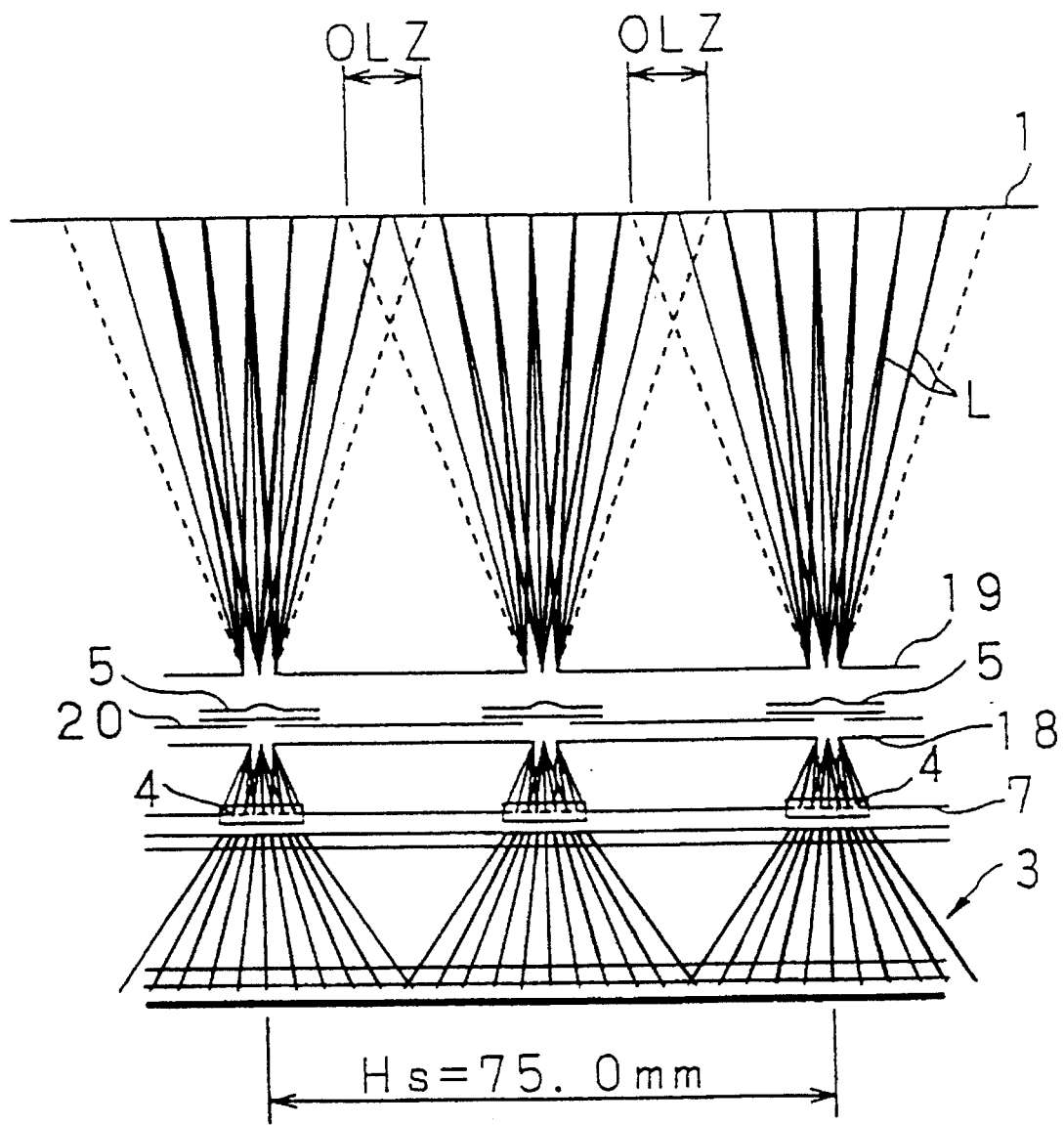
FIG. 22 is a partially enlarged see-through right side view of the device according to the second embodiment of the present invention.

The picture display device is shown in FIG. 20 which is an enlarged see-through partial front view showing the portion of the second embodiment delimited by a circle C in FIG. 1, in FIG. 21 which is an enlarged see-through partial top plan view showing the portion of the second embodiment delimited by a circle C in FIG. 1, and in FIG. 22 which is a see-through drawing similar to FIG. 21 and which illustrates the portion of the right side of the device of the second embodiment delimited by the circle C in FIG. 1 in an enlarged scale. The picture display device also includes, as the picture projecting means, at least a light source unit 3, a liquid crystal device 4, a projection lens 5 and a reflector plate 6, and picture projection means, made up of these devices, is provided for each of the fractional pictures which make up the picture corresponding to the full viewing screen. By enlarging and projecting the fractional pictures from these picture projection means on the screen 1, the full-screen size picture may be projected on the screen 1. Part of the light rays of the projected picture is indicated as L in FIGS. 18, 19, 21 and 22.

The liquid crystal devices 4 are supported by the liquid crystal supporting plate 7, as in the first embodiment, while the projection lenses 5 are also secured at positions which register with the liquid crystal devices 4. The projection lens 5 and the liquid crystal device 4 may also be assembled into an optical unit.

Similarly to the display device of the first embodiment, the picture display device of the present example of the second embodiment has a housing 2 having a transverse width of 880 mm, a height of 520 mm+40 mm and a depth of 110 mm, and a total weight of approximately 30 kg, and a display screen having a transverse width of 800 mm (=100 mm×8), and a longitudinal width of 450 mm (=75 mm×6), with the screen size being 36 inches. With the present example of the second embodiment, the distance from the reflecting plate 6 to the center of the liquid crystal device 4 is 28 mm, the distance from the center of the liquid crystal device 4 to the distal end of the projection lens 5 (the apex towards the screen 1) is 14.61 mm and the distance from the distal end (apex point) of the projection lens 5 to the screen 1 is 65.0 mm. The second embodiment is otherwise essentially the same as the first embodiment. As for the liquid crystal devices 4, each liquid crystal device has an outer dimension of 14.4×10.8 mm and a display surface of 0.7 inch, with the number of pixels being 100,000. A total of 17×13=221 liquid crystal devices 4 are arranged to produce a color picture displayed to accommodate the three prime colors of R, G and B, so that the resolution is approximately 7,000,000 pixels, with a power consumption of approximately 600 W.

In the present example of the second embodiment, two gradual decrease type projection angle control plates 18, 19, each preferably having square-shaped apertures, are provided as optical gradual decrease type projection angle controlling means as later explained, and a non-gradual decrease type projection intensity control plate 20, are in front of and behind the projection lens 5, and are secured to the housing 2.

Figure 23:
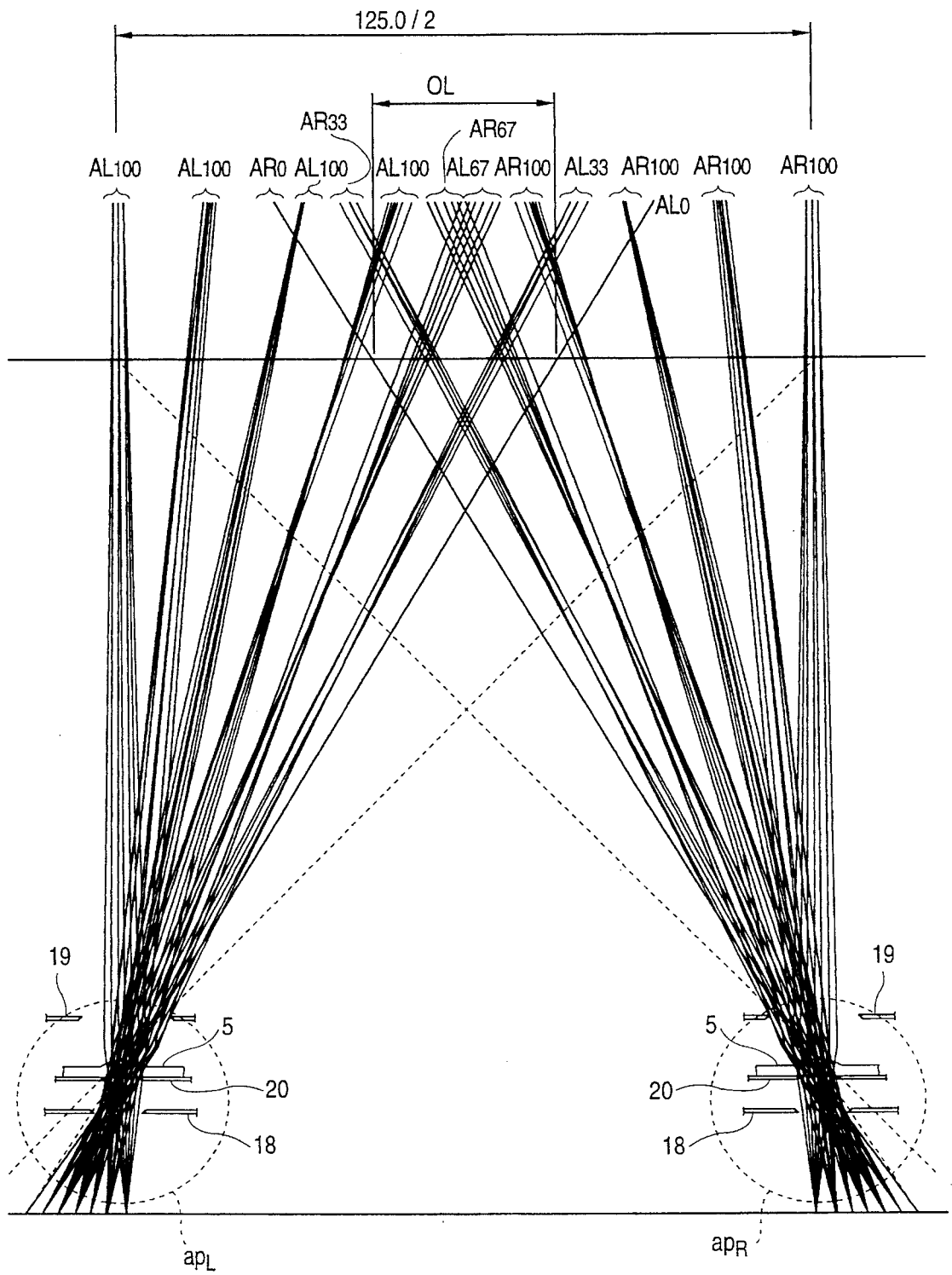
FIG. 23 shows the overlap of projection division partial pictures from adjoining picture projection means according to the second embodiment of the present invention.

In the present second embodiment, in distinction from the first embodiment, the overlap areas of the neighboring fractional pictures, the lightness of which is to be gradually decreased by the projection control plates 18 to 20, is provided only in the peripheral areas of the fractional picture, as shown in FIG. 23. In other words, when fractional pictures are projected on the screen 1 from the adjacent picture projection means, the overlap area from adjacent picture projection means $ap_L$, $ap_R$ in FIG. 23 is limited only to the peripheral area, as indicated at OLZ in FIGS. 20 to 22. The overlap zone OLZ is optically decreased gradually in lightness for assuring uniform lightness on the entire screen.

Figure 24:
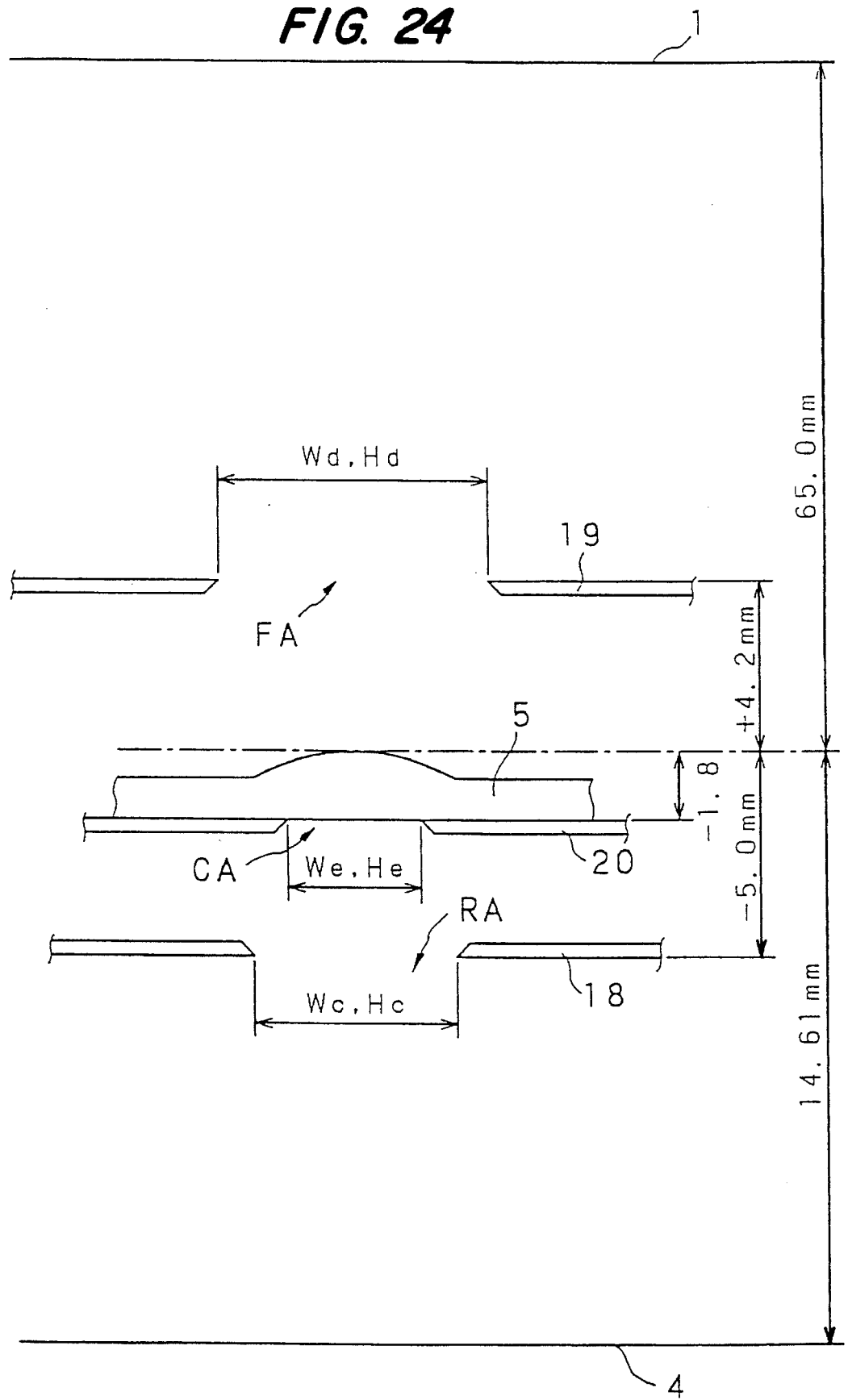
FIG. 24 illustrates the positioning of various parts of the picture projection means according to the second embodiment of the present invention.

Specifically, the gradual decrease type projection angle control means of the present second embodiment for gradually decreasing the lightness of the overlap zone OLZ of the neighboring fractional pictures projected by the neighboring picture projection means $ap_L$, $ap_R$ is realized by three optical square-shaped apertures RA, FA and CA provided, as further described below and as shown in FIG. 24, in front of and behind the projection lens 5. These apertures are similar in contour to the fractional pictures of the liquid crystal devices 4.

Specifically, in the example shown in FIG. 24, the square-shaped aperture RA (rear aperture) of the gradual decreasing type projection angle controlling plate 18 is provided at a position 5.0 mm back towards the liquid crystal device 4 from a point of 14.61 mm from the display surface of the liquid crystal device 4 to the point of the distal end of the projection lens 5 (an apex point inclusive of the optical axis of the screen 1), while the square-shaped aperture FA (front aperture) of the gradual decreasing type projection angle controlling plate 19 is provided at a position 4.2 mm away from the apex of the projection lens 5 towards the screen 1, and the square-shaped aperture (center aperture) CA is provided in proximity to the liquid crystal device 4 of the projection lens 5, for realizing the overlap between the neighboring fractional pictures and gradual optical decrease (uniformity of lightness) in the overlapped areas. Using the rear aperture RA of the gradual type projection angle control plate 18, the front aperture FA of the gradual decrease type projection angle controlling plate 9 and the center aperture CA of the non-gradual decrease type projection intensity control plate 20, the light volume of the light from the light source unit 3 via the liquid crystal devices 4 is gradually diminished as indicated in FIG. 25.

Figure 25:
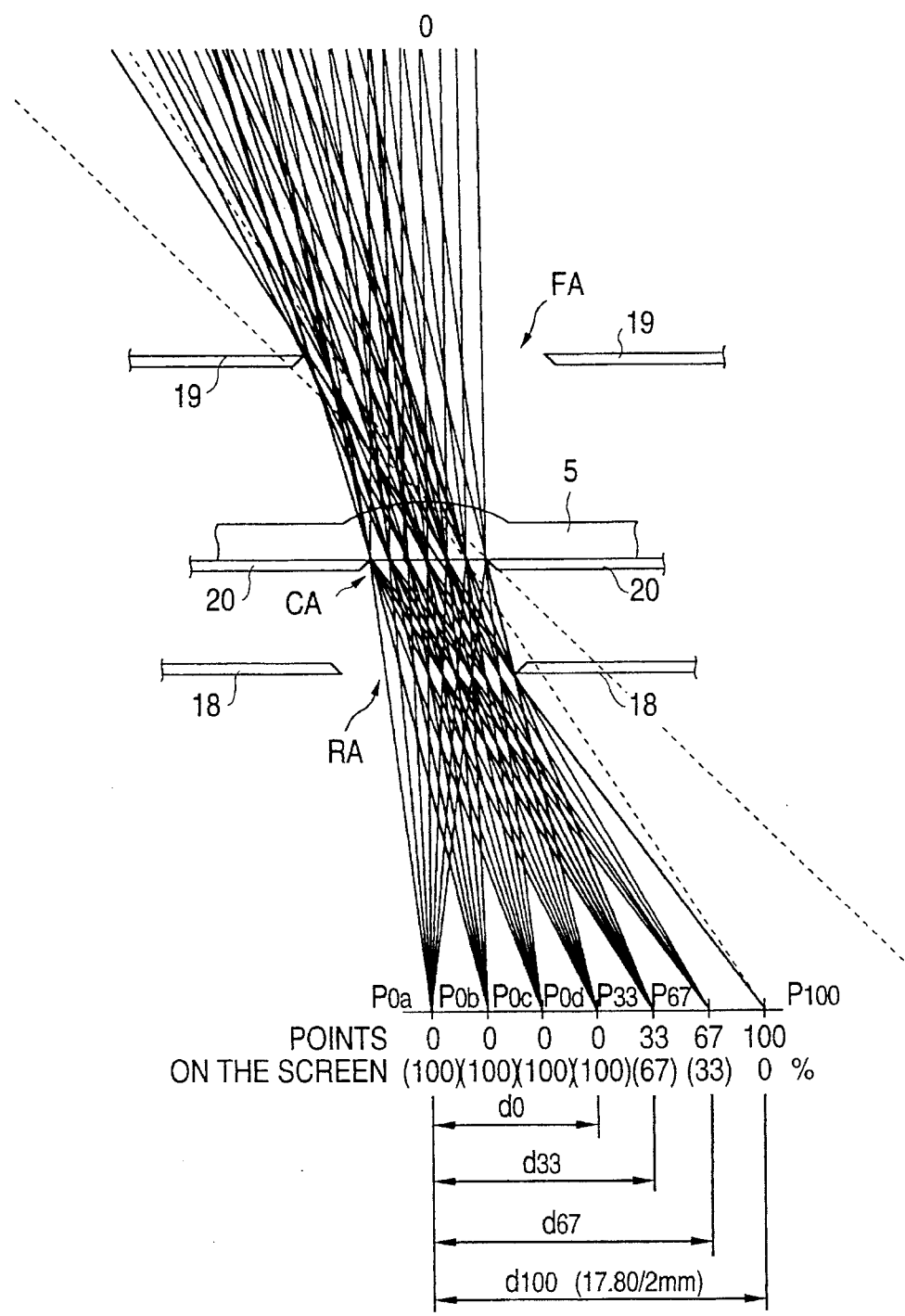
FIG. 25 illustrates the manner in which light is gradually decreased by use of the gradual decreasing type projection angle control means according to the second embodiment of the present invention.

Referring more specifically to FIG. 25, it is assumed that the volume of light is 100%, that is, the amount of light reduction is 0%, when the light from a position on $P_{oa}$ on the liquid crystal device 4 has passed through the optical axis of the projection lens 5 and through the rear aperture RA, the front aperture FA and the center aperture CA so as to be radiated on the screen 1. The light from positions $P_{ob}$ to $P_{od}$ on the liquid crystal device, separated by a pre-set distance $d_0$ from the optical axis 0, has its intensity maintained by the center aperture CA, when the light is passed through the rear aperture RA, center aperture CA and the front aperture FA, so that further light volume reduction is 0%, with the light volume radiated on the screen 1 being 100%. The light from a position $P_{33}$ on the liquid device 4 separated from the optical axis 0 by a pre-set distance $d_{33}$ has its light volume reduced by 33% by the front and rear apertures, with the light volume radiated on the screen being 67%. Similarly, the light from a position P67 on the liquid crystal device 4 separated from the optical axis 0 by a pre-set distance $d_{67}$ has its light volume reduced by 67% by the front and rear apertures, with the light volume radiated on the screen being 33%, while the light from a position $P_{100}$ on the liquid crystal device 4 separated from the optical axis 0 by a pre-set distance $d_{100}$ has its light volume reduced by 100% by the front and rear apertures, with the light volume radiated on the screen being 0%.

Since the rear aperture RA of the gradual decrease type projection angle control plate 18, the center aperture CA of the non-gradual decrease type projection angle control plate 20 and the front aperture FA of the gradual decrease type projection angle control plate 19 are arranged in this manner in each picture projection means, the neighboring fractional pictures projected on the screen 1 from the neighboring picture projection means $ap_L$ and $ap_R$ overlap only in peripheral areas in which the lightness is rendered uniform.

Referring to FIG. 23, the light from the picture projection means $ap_L$ reach various points on the screen 1 while experiencing a 0% light volume reduction and arrives as light $AL_{100}$ having a light intensity of 100%. In those areas, the light from the projection means $aP_R$ has its light volume reduced by 100%, that is, it is the light $AR_0$ with light intensity of 0%, so that the lightness at these points on the screen 1 is the lightness of the light $AL_{100}$ from the picture projection means $ap_L$. The lightness of this light has an intensity of 100%. The light from the picture projection means $ap_R$ reaching various points on the screen 1, radiated by the light of 33% light volume reduction from the picture projection means $ap_L$, that is the light $AL_{67}$ having the light intensity of 67%, has its light volume reduced by 67%, that is, it is the light $AR_{33}$ with light intensity of 33%, so that the lightness at the various points on the screen 1 is the sum of the lightness of the light $AL_{67}$ from the picture projection means $ap_L$ (i.e., lightness having a light intensity of 67%) and the lightness of the light $AR_{33}$ from the picture projection means $ap_R$ (i.e., lightness having a light intensity of 33%) thus totalling 100%. Similarly, the light from the picture projection means $ap_R$ which reaches the various points on the screen 1, which are radiated by light of 67% light volume reduction from the picture projection means $ap_L$, i.e., light $AL_{67}$, has a light intensity of 67%, its light volume having been reduced by 33% so that the lightness at these various points on the screen 1 is the sum of the lightness of the light $AL_{33}$ from the picture projection means $ap_L$ (i.e., lightness having a light intensity of 33%) and the lightness of the light $AR_{67}$ from the picture projection means $ap_R$ (i.e., lightness having a light intensity of 67%) thus totalling 100%. Finally, light from the picture projection means $ap_R$ reaching various points on the screen 1, which are radiated by light of 100% light volume reduction from the picture projection means $ap_L$, that is light $AL_{100}$ having the light intensity of 0%, is lighted by the light $AR_{100}$ with light intensity of 100%, so that the lightness at these various points on the screen 1 is the lightness of the light $AR_{100}$ from the picture projection means $ap_R$; that is, lightness having a light intensity of 100%.

Thus, with the present second embodiment, the lightness of the overlap zone OLZ on the screen 1 becomes uniform.

With the present example of the second embodiment, the pre-set distance $d_{100}$ is one-half of 17.80 mm of the length of a diagonal line of the liquid crystal device 4, or 17.80/2 mm. The rear aperture RA has a transverse width Wc=Dc×4/5 mm and a longitudinal width Hc=Dc×3/5, where Dc=4.7 mm. Similarly, the front aperture FA has a transverse width Wd=Dd×4/5 mm and a longitudinal width Hd=Dd×3/5, where Dd=6.6 mm. The center aperture CA has a transverse width We=De×4/5 mm and a longitudinal width He=De×3/5, where De=3.2 mm. The projection lens 5 has its side facing the liquid device 4 flat while having its side facing the screen 1 in the form of a convex lens of +6.40 mm, with 1/f=11.93 mm, an F number=f/De=1.99 (center) and a multiplication factor=×4.55, where a=14.61 mm, b=65.0 mm, De=3.2 mm and D2=5.20 mm, f being a focal length.

The overlap zone OLZ between two neighboring fractional pictures as viewed from an arbitrary sectional picture, is a zone delimited between a line $W_{sp}$ (=Ws×218/344) and a line $W_{sk}$ (=WS ×126/344) in FIG. 20, as far as the horizontal direction is concerned, $W_s$ being 100 mm, and a region delimited between a line $H_{sp}$ (=Hs×218/344) and a line $H_{sk}$ (=Hs×126/344), as far as the vertical direction is concerned, $H_s$ being 75.0 mm, as shown in FIG. 20.

The manner in which light intensity on the screen 1 is rendered uniform by the gradual decrease characteristics of light intensity using an arbitrary gradual decrease type projection angle control means (the apertures RA and FA) and by the non-gradual decrease type projection angle control means adjacent to the arbitrary gradual decrease type projection angle control means (the aperture CA) is explained by referring to FIGS. 26 to 29. In these figures, the light intensity ranges from 0% (minimum level) up to 100% (maximum level) is shown.

Figure 26:
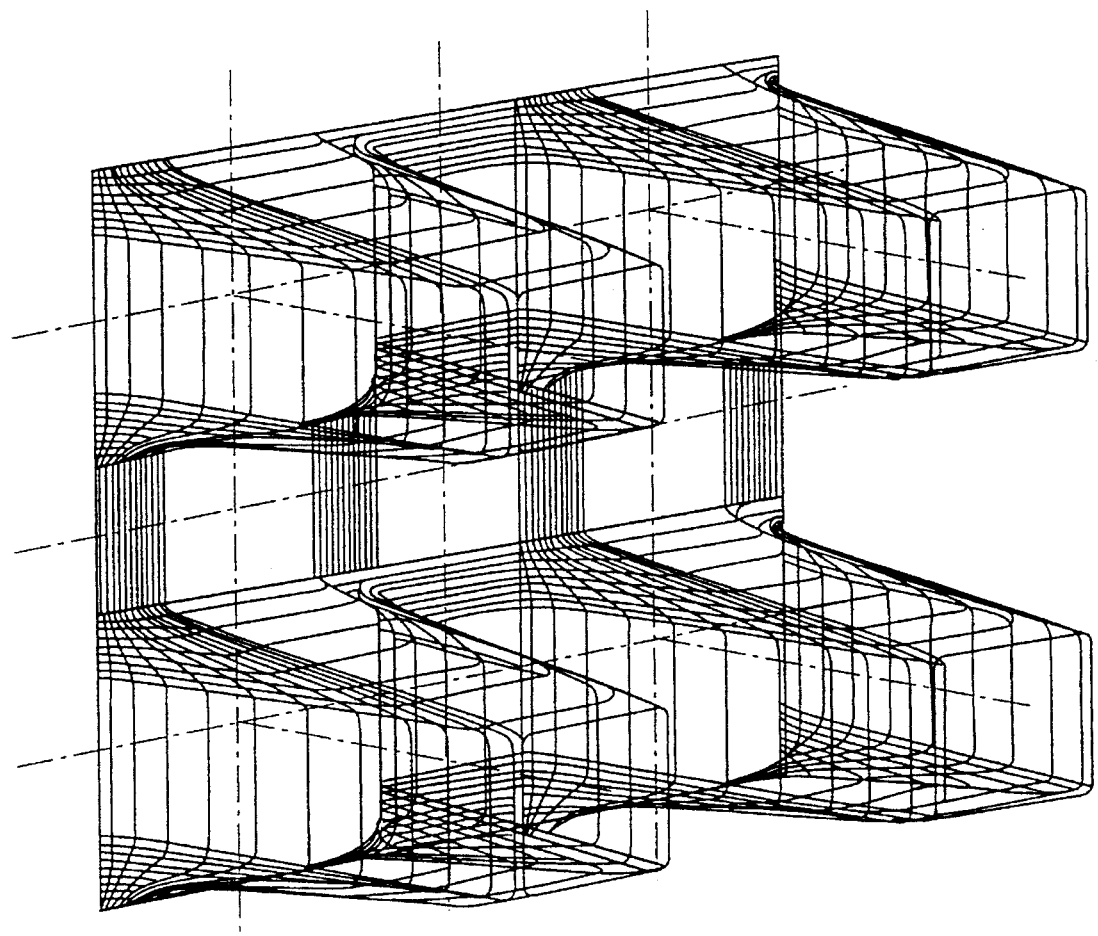
FIG. 26 illustrates the gradual decrease characteristic of the light intensity when using adjacent gradual decreasing type projection angle control means according to the second embodiment of the present invention.
Figure 27:
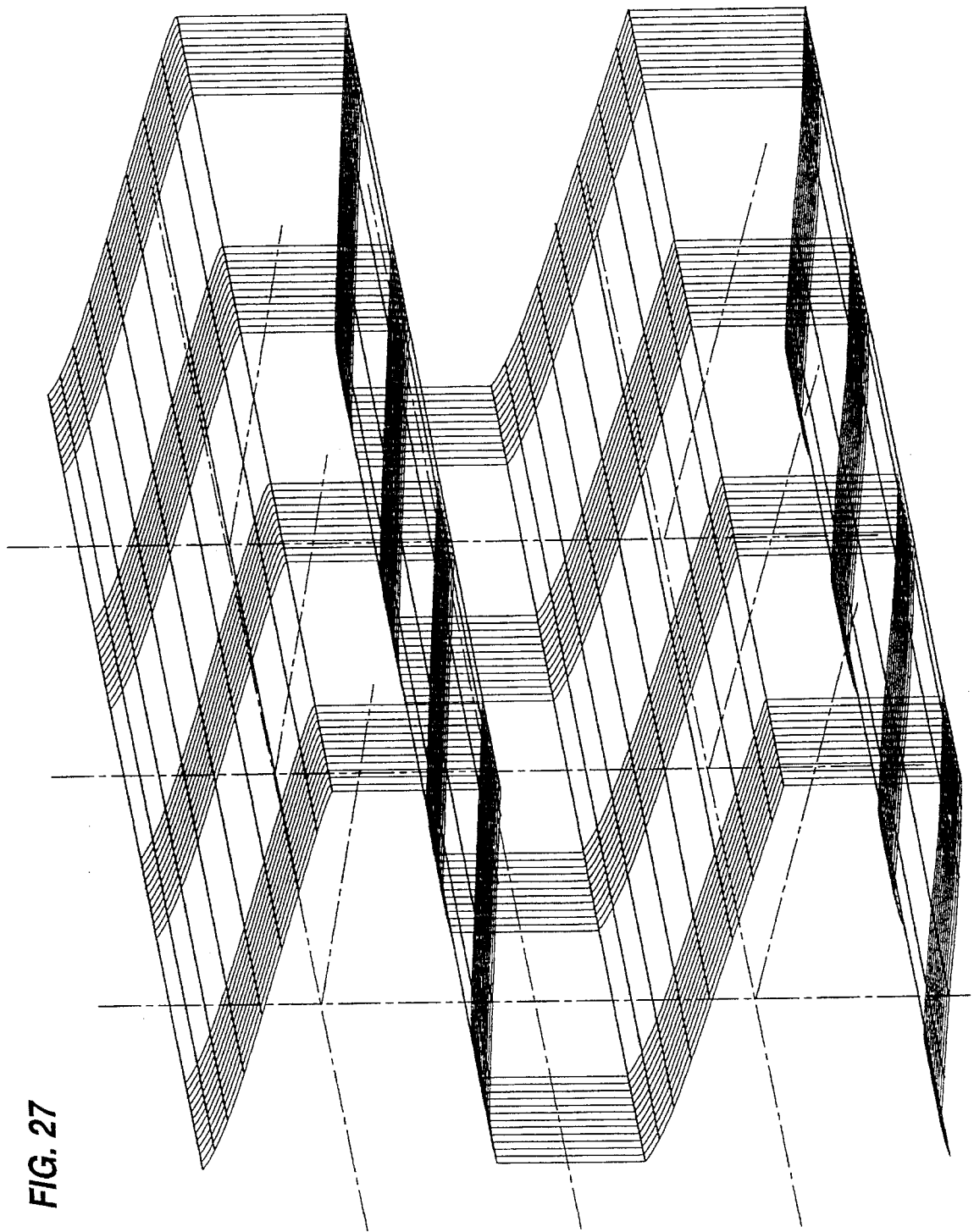
FIG. 27 illustrates the gradual decrease characteristics of the light intensity when using a gradual decreasing type projection angle control means provided at a position shifted by $2/\pi$ along the horizontal direction according to the second embodiment of the present invention.
Figure 28:
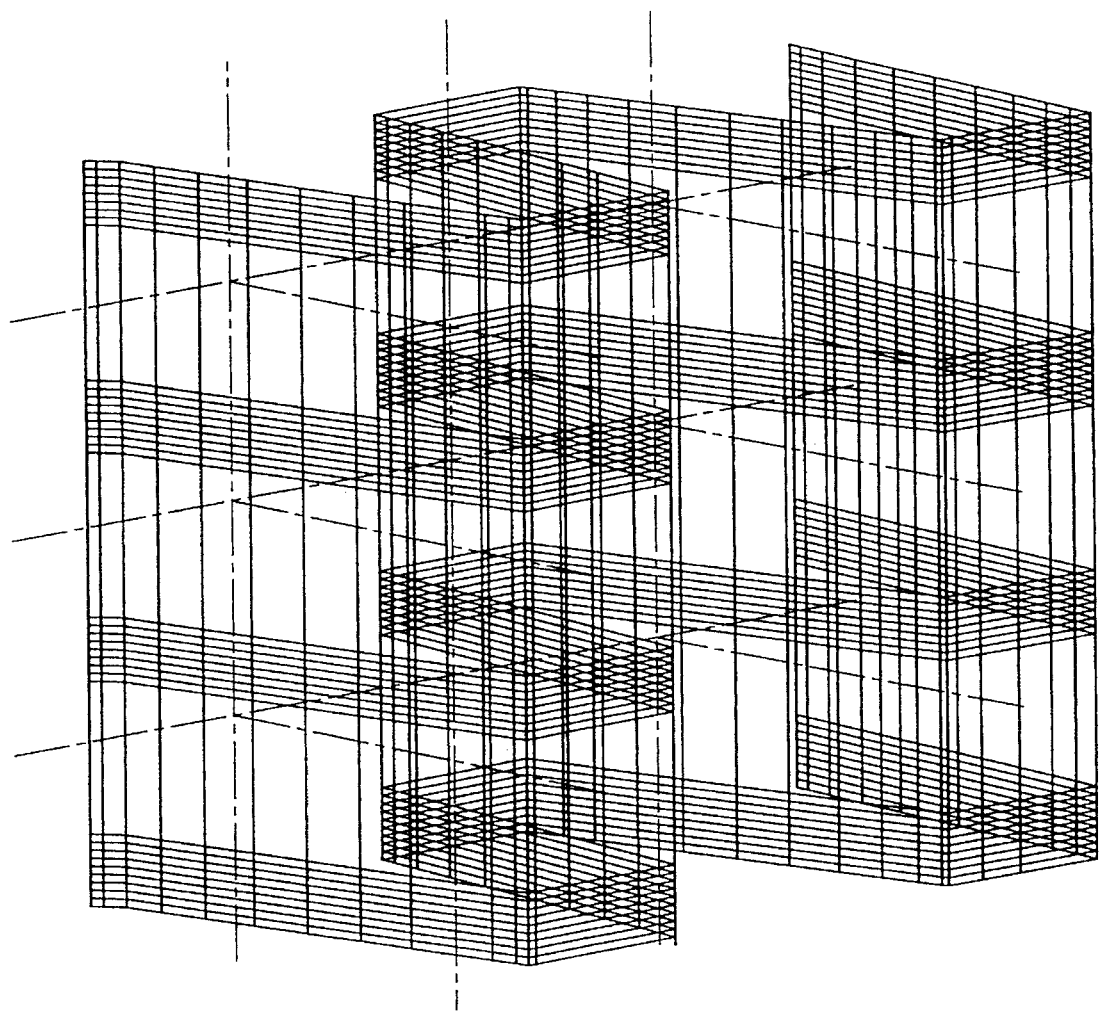
FIG. 28 illustrates the gradual decrease characteristics of the light intensity when using a gradual decreasing type projection angle control means provided at a position shifted by $2/\pi$ along the vertical direction according to the second embodiment of the present invention.

FIG. 26 schematically illustrates a gradually decreasing characteristic of light intensity when using the neighboring gradual decrease type projection angle control means in which the neighboring fractional pictures do not overlap with one another. FIG. 27 schematically illustrates a gradually decreasing characteristic of light intensity in which fractional pictures in the horizontal direction (x-direction) overlap when using the gradual decrease type projection angle control means having gradual decrease characteristics shown in FIG. 26. That is, FIG. 27 illustrates the characteristics when the gradual decrease type projection angle control means having the gradual decrease characteristics as shown in FIG. 26 is provided at a position shifted by π/2 in the horizontal direction between the neighboring gradual decrease projection angle control means. FIG. 28 schematically illustrates a gradually decreasing characteristic of light intensity in which fractional pictures in the vertical direction (y-direction) overlap for the gradual decrease type projection angle control means having gradual decrease characteristics shown in FIG. 26. That is, FIG. 28 illustrates the characteristics when the gradual decrease type projection angle control means having the gradual decrease characteristics as shown in FIG. 26 is provided at positions shifted by $\pi/2$ in the vertical direction between the neighboring gradual decrease projection angle control means.

Figure 29:
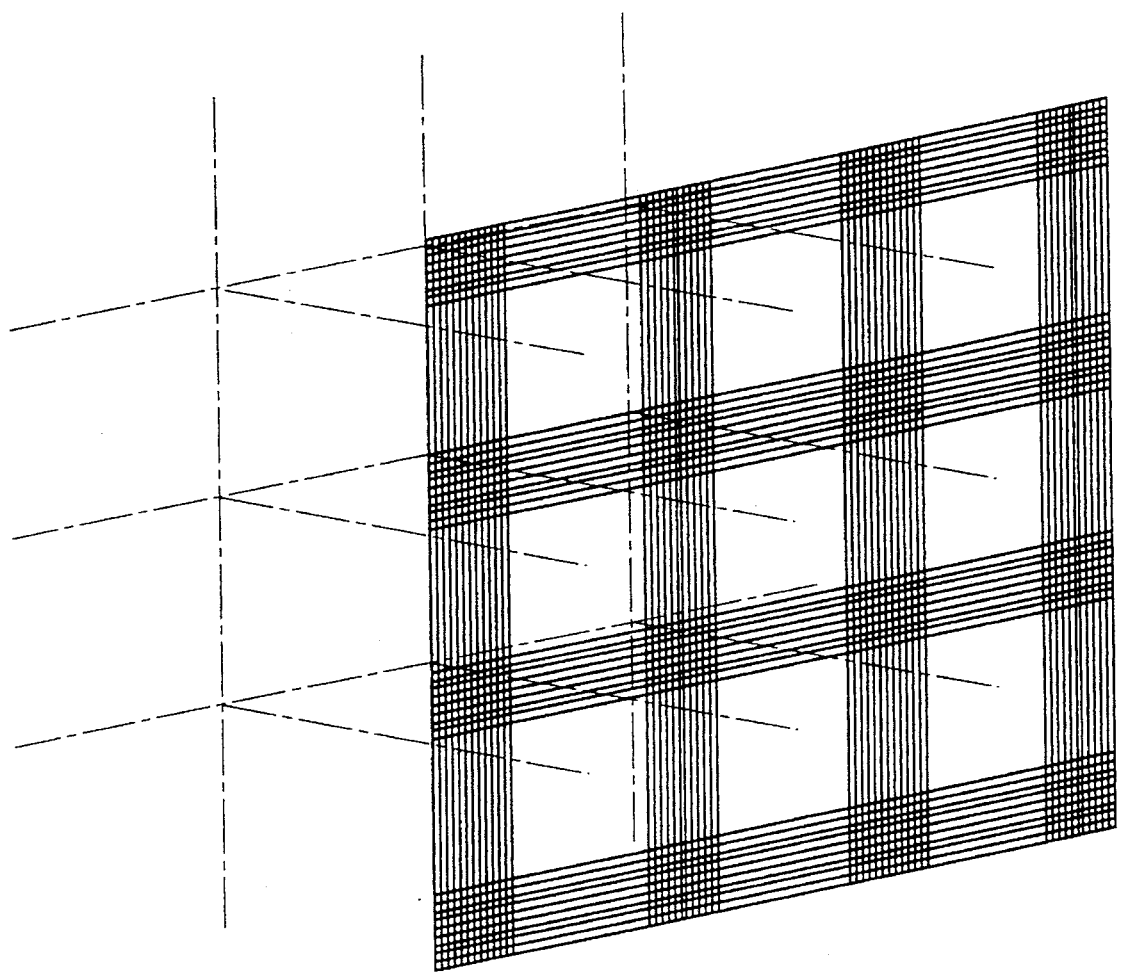
FIG. 29 illustrates the gradual decrease characteristics of the light intensity when using a gradual decreasing type projection angle control means provided at positions shifted by $2/\pi$ along the horizontal and vertical directions according to the second embodiment of the present invention.

Finally, FIG. 29 schematically illustrates gradual decrease characteristics of the light intensity in which fractional pictures in the horizontal direction (x-direction) and in the vertical direction (y-direction) are overlapped for the gradual decrease type projection angle control means having gradual decrease characteristics shown in FIG. 26. That is, FIG. 29 illustrates the characteristics when the gradual decrease type projection angle control means having the gradual decrease characteristics as shown in FIG. 26 is provided at a position shifted by $\pi/2$ in the horizontal direction and in the vertical direction between the neighboring gradual decrease projection angle control means. In the case of FIG. 29, the light intensity becomes uniform, that is becomes uniform at 100% light intensity, on the screen 1.

In the above-described second embodiment, the overlap areas between the neighboring fractional pictures in which the light intensity is optically decreased by the gradual projection angle control means is adapted to overlap only in the peripheral regions of the respective fractional pictures. To this end, the totality of the liquid crystal devices 4 as the fractional picture forming means are driven and supplied with picture signals in the following manner.

With the picture display device of the present second embodiment, the frequencies in the various portions of the arrangement of FIG. 14 employed in the above-described first embodiment are changed in the following manner for driving the various liquid crystal devices 4 and supplying picture signals in the above-described second embodiment. In that regard, FIGS. 30 to 32 discussed below, generally correspond to above-described FIGS. 15 to 17, respectively.

Figure 30:
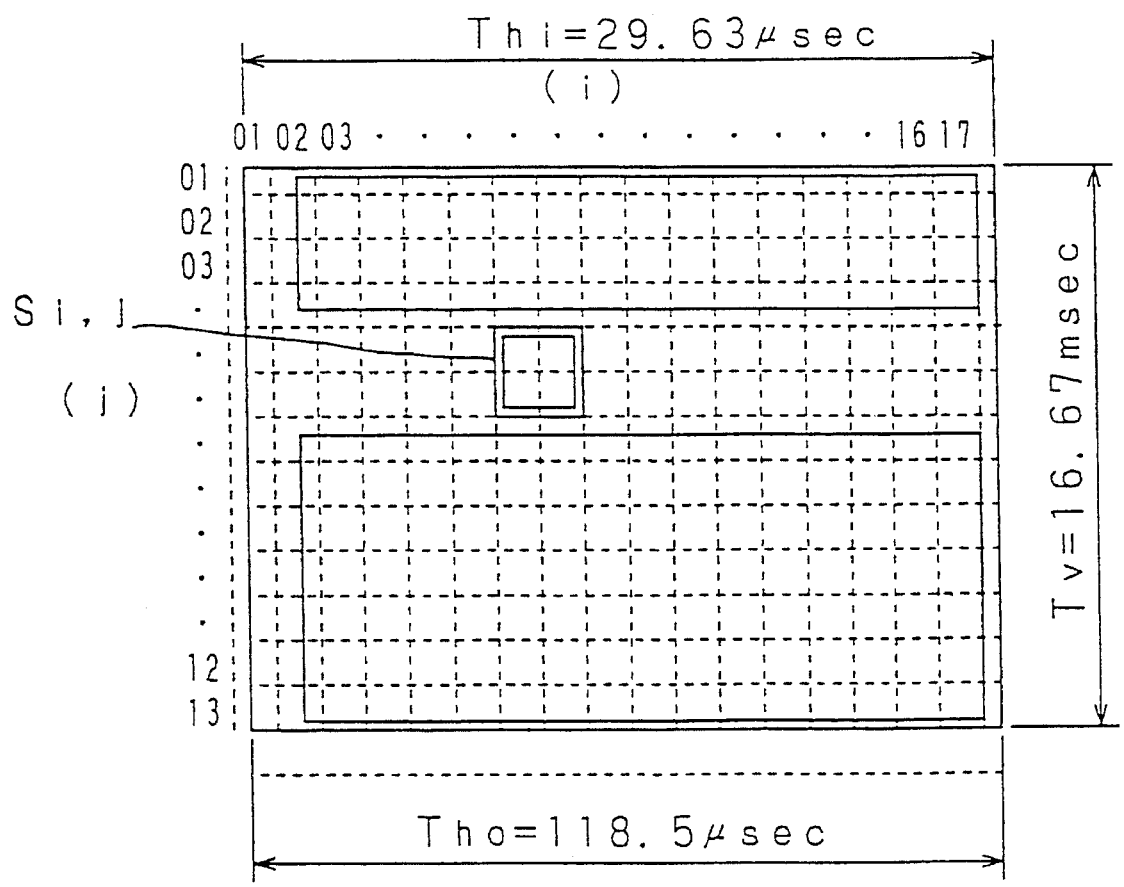
FIG. 30 is a diagrammatic view showing the relationship between the memory circuit according to the second embodiment of the present invention and the overlapping partial picture signals and the total picture of a screen.
Figure 31:
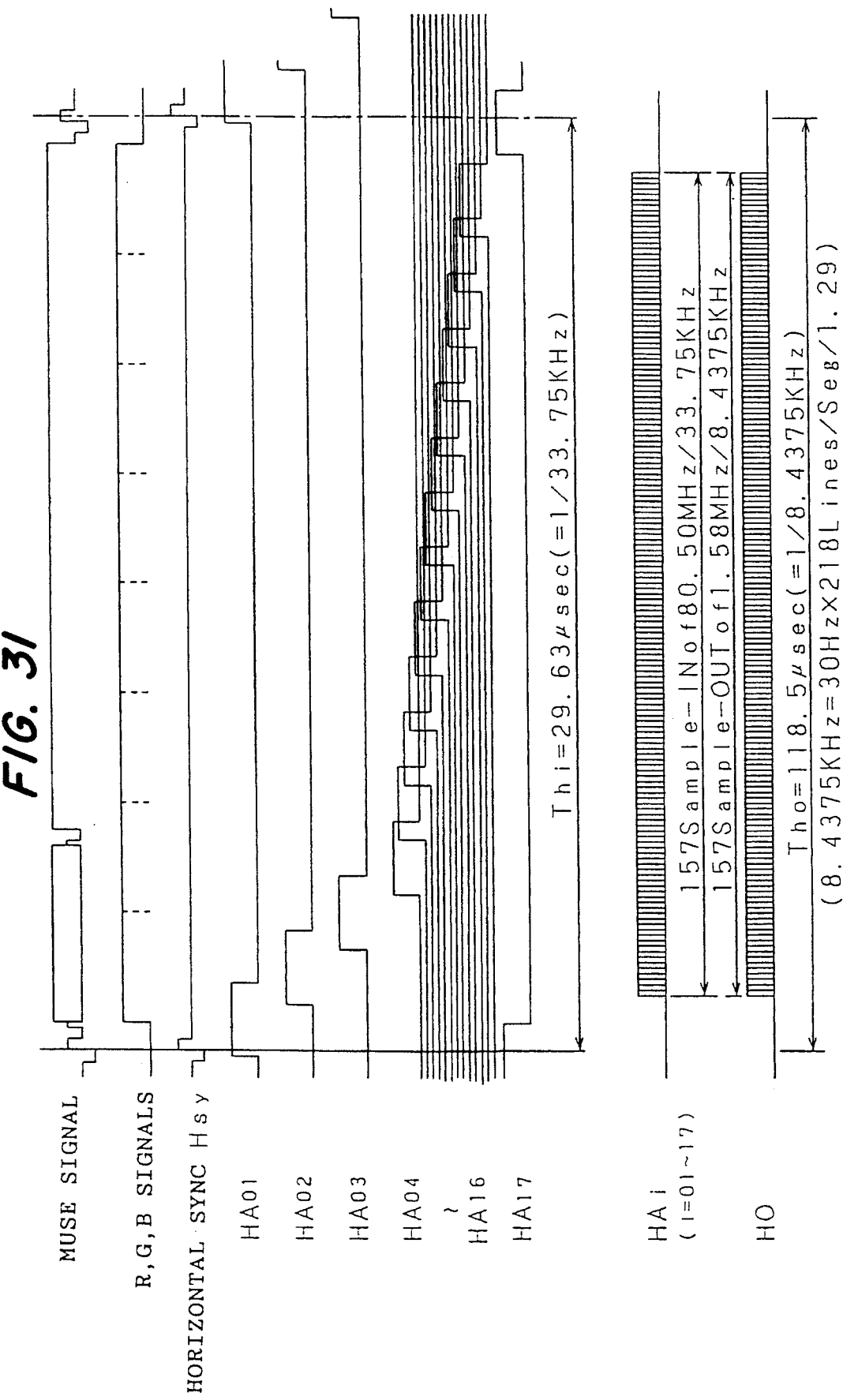
FIG. 31 is a timing chart illustrating the write timing and the read timing in the horizontal direction of the memory circuit according to the second embodiment of the present invention.
Figure 32:
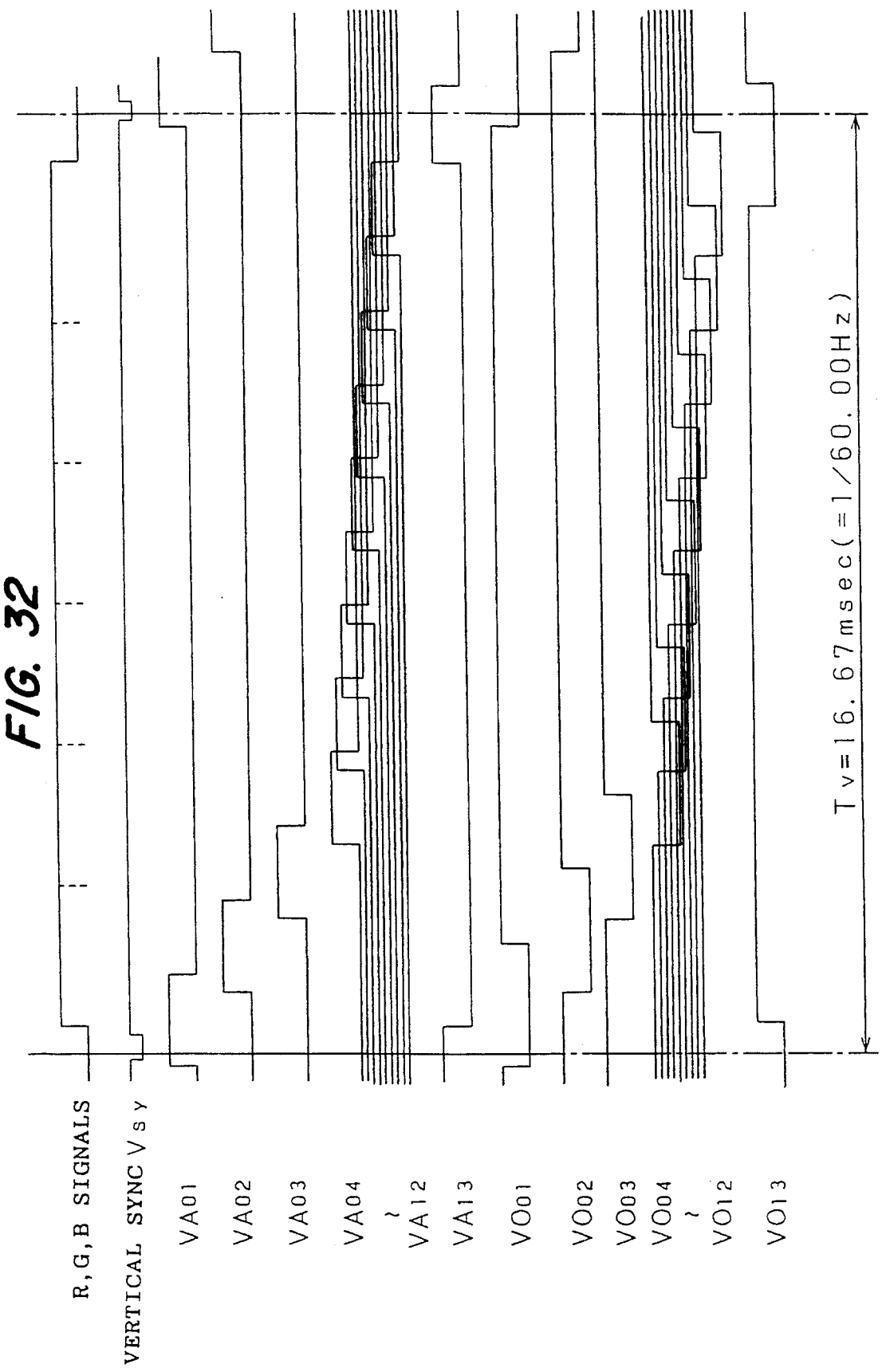
FIG. 32 is a timing chart illustrating the write timing and the read timing in the vertical direction of the memory circuit according to the second embodiment of the present invention.

Referring now to FIGS. 30 to 32, showing the device of the second embodiment, the horizontal write address generator 104 and the horizontal read address generator 107 drive the memory circuits $111_{0101}$ to $111_{1713}$ at the timing shown in FIG. 31 (which generally corresponds to FIG. 16). The vertical write address generator 105 and the vertical read address generator 106 drive the memory circuits $111_{0101}$ to $111_{1713}$ at the timing shown in FIG. 32 (which generally corresponds to FIG. 17).

However, in the exemplary device of the present second embodiment, Tho in FIG. 30 becomes equal to 118.5 μmsec (=1/8.4375 kHz) in distinction from the corresponding value of FIG. 15. The main point of difference of the arrangement of FIGS. 31 and 32 from the arrangement shown in FIGS. 16 and 17 is the different overlap period during which the horizontal write address signals $HA_{01}$ to $HA_{17}$ overlap with the vertical write addresses $VA^{01}$ to $VA_{13}$. The horizontal write address signals $HA_{01}$ to $HA_{17}$ become 80.50 MHz/ 33.75 kHz signals for sampling R, G and B signals, with the number of samples being 157 samples, while horizontal read address signals HO become 1.58 MHz/8.43 kHz signals for reading data stored in the memory circuits $111_{0101}$ to $111_{1713}$, with the number of the stored samples being 157.

It may be seen from FIGS. 31 and 32 that, in the present second embodiment, the sampling in which the overlap regions of the neighboring fractional pictures are present is only in peripheral areas of the fractional pictures. The R, G and B digital signals held by the memory circuits $111_{0101}$ to $111_{1713}$ are read based on the vertical read address signals $VO_{01}$ to $VO_{13}$ and the horizontal read address signals HO shown in FIGS. 31 and 32, so that the overlap areas of the picture signals of the neighboring fractional pictures are present only in the peripheral areas of the respective fractional pictures which may be transmitted to the liquid crystal devices 4.

In the above-described picture display devices of the first and second embodiments, the gradual decrease type projection angle control means causes the lightness of the overlap areas between the neighboring fractional pictures to be decreased gradually by optical means. Alternatively, the lightness of the overlapped regions between the neighboring sectional pictures may be decreased gradually by electrical means, by way of a third embodiment of the present invention.

Figure 33:
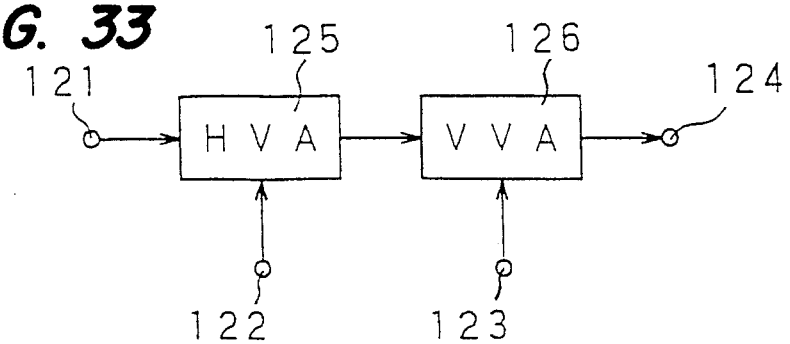
FIG. 33 is a block circuit diagram of an example of gradual decreasing type projection angle control means for gradually electrically decreasing the divisional picture signals according to a third embodiment of the present invention.

Specifically, as shown in FIG. 33, the gradual decrease type projection angle control means in the third embodiment of the present invention may be implemented by a horizontal attenuator circuit (HVA) 125 and a vertical attenuator circuit (VA) 126 adapted for attenuating picture signals in the overlapping areas of the neighboring picture signals supplied to the liquid crystal devices 4 in the horizontal and vertical directions, respectively.

Figure 34:
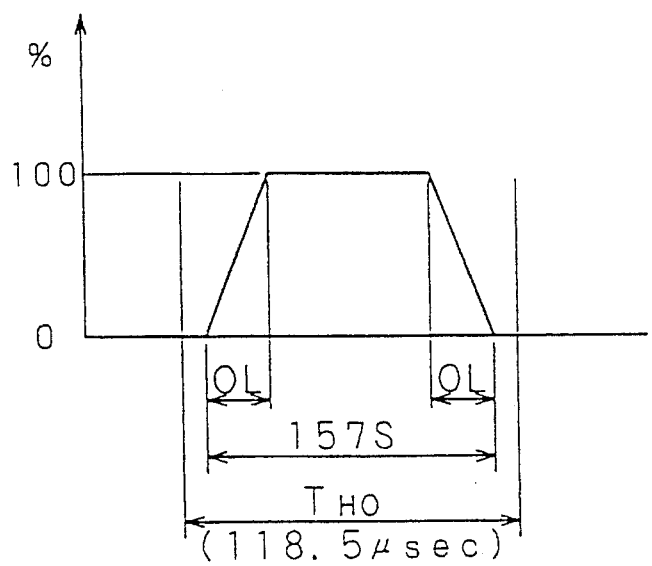
FIG. 34 is a chart illustrating a gradually decreasing characteristic in the horizontal direction of the gradual decreasing type projection angle control means for gradually electrically decreasing the divisional picture signals according to a third embodiment of the present invention.
Figure 35:
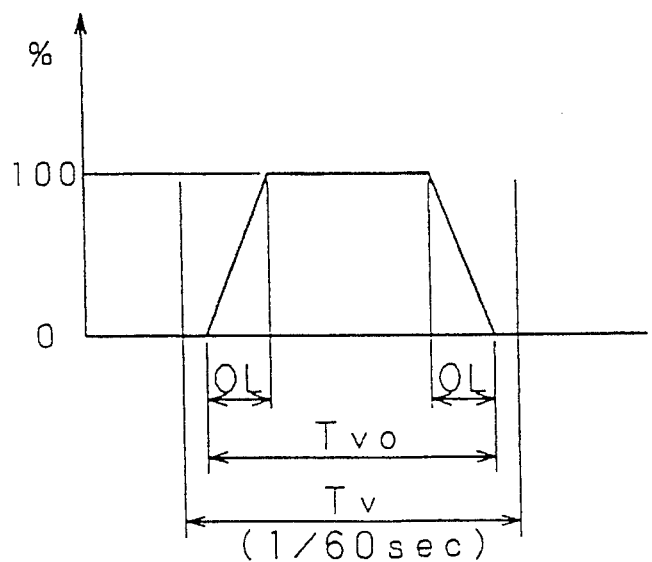
FIG. 35 is a chart illustrating a gradually decreasing characteristic in the vertical direction of the gradual decreasing type projection angle control means for gradually electrically decreasing the divisional picture signals.

The gradually decreasing characteristic of the horizontal attenuator circuit 125 and the vertical attenuator circuit 126 may be designed as shown, for example, in FIGS. 34 and 35, respectively, in which time periods indicated by OL represent the gradual decrease periods.

The relationship between an input $T_{v1}$ to an output $T_{vo}$ of the vertical attenuator circuit 126 and 1/60 sec=$T_v$ is given by $T_{vo} \leq T_v - T_{v1}$.

The picture signals from the memory circuits $111_{0101}$ to $111_{1713}$, as shown in FIG. 14, are supplied via an input terminal 121 to the horizontal attenuator circuit 125 and the vertical attenuator circuit 126 having the gradual decrease characteristics shown in FIGS. 34 and 35, respectively. A gradual decrease command signal instructing a gradual decrease period OL shown in FIG. 34 is supplied to a terminal 122, while a gradual decrease command signal instructing a gradual decrease period OL shown in FIG. 35 is supplied to a terminal 123. According to the third embodiment, electrical gradual decrease is provided by the horizontal and vertical attenuator circuits 125, 126 gradually decreasing the video signals based on the gradual decrease command signals. An output of the vertical attenuator circuits 126 is supplied via an output terminal 124 to a downstream circuit, not shown herein.

Figure 36:
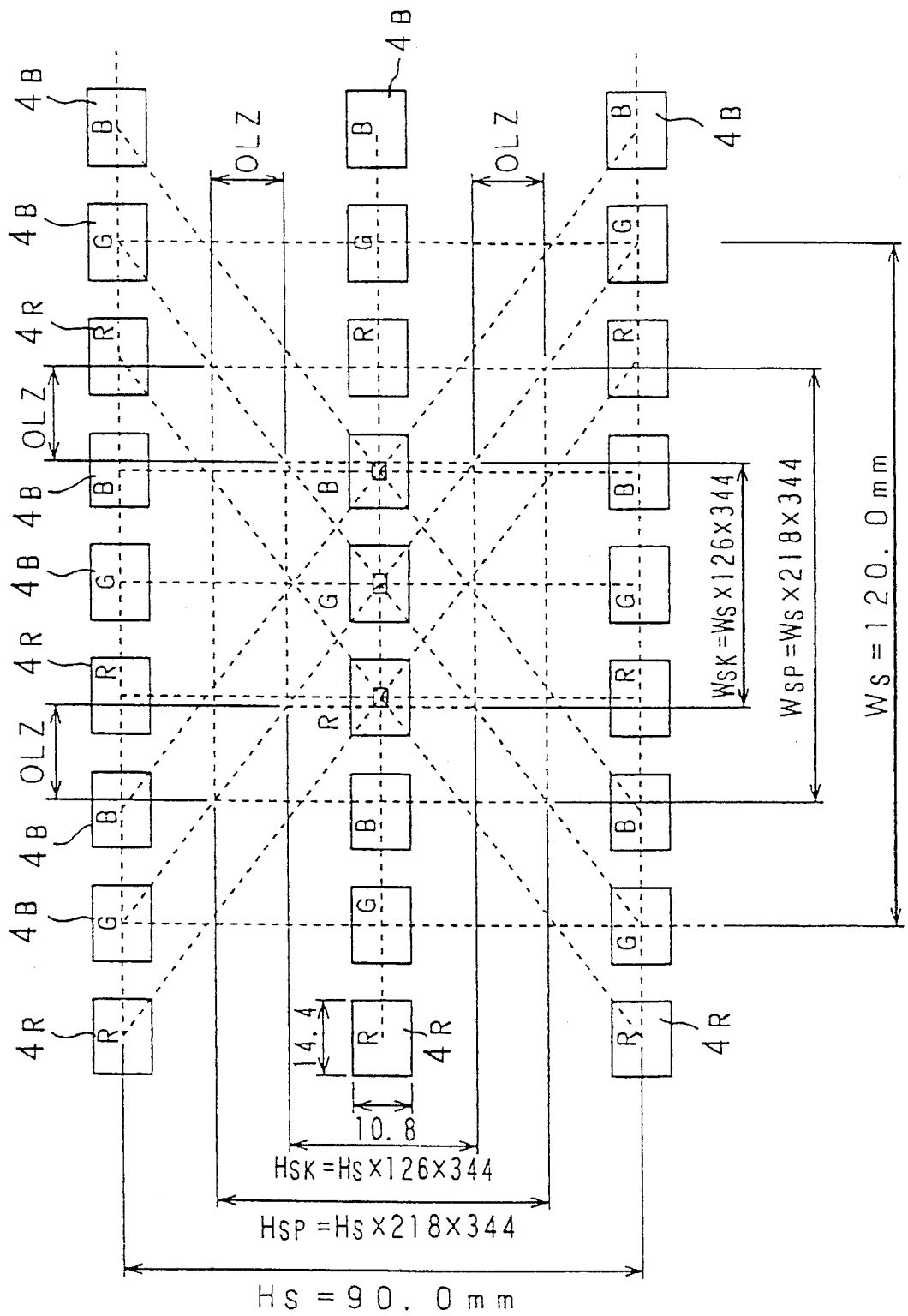
FIG. 36 is a partially enlarged see-through front view showing a device according to a fourth embodiment of the present invention.
Figure 37:
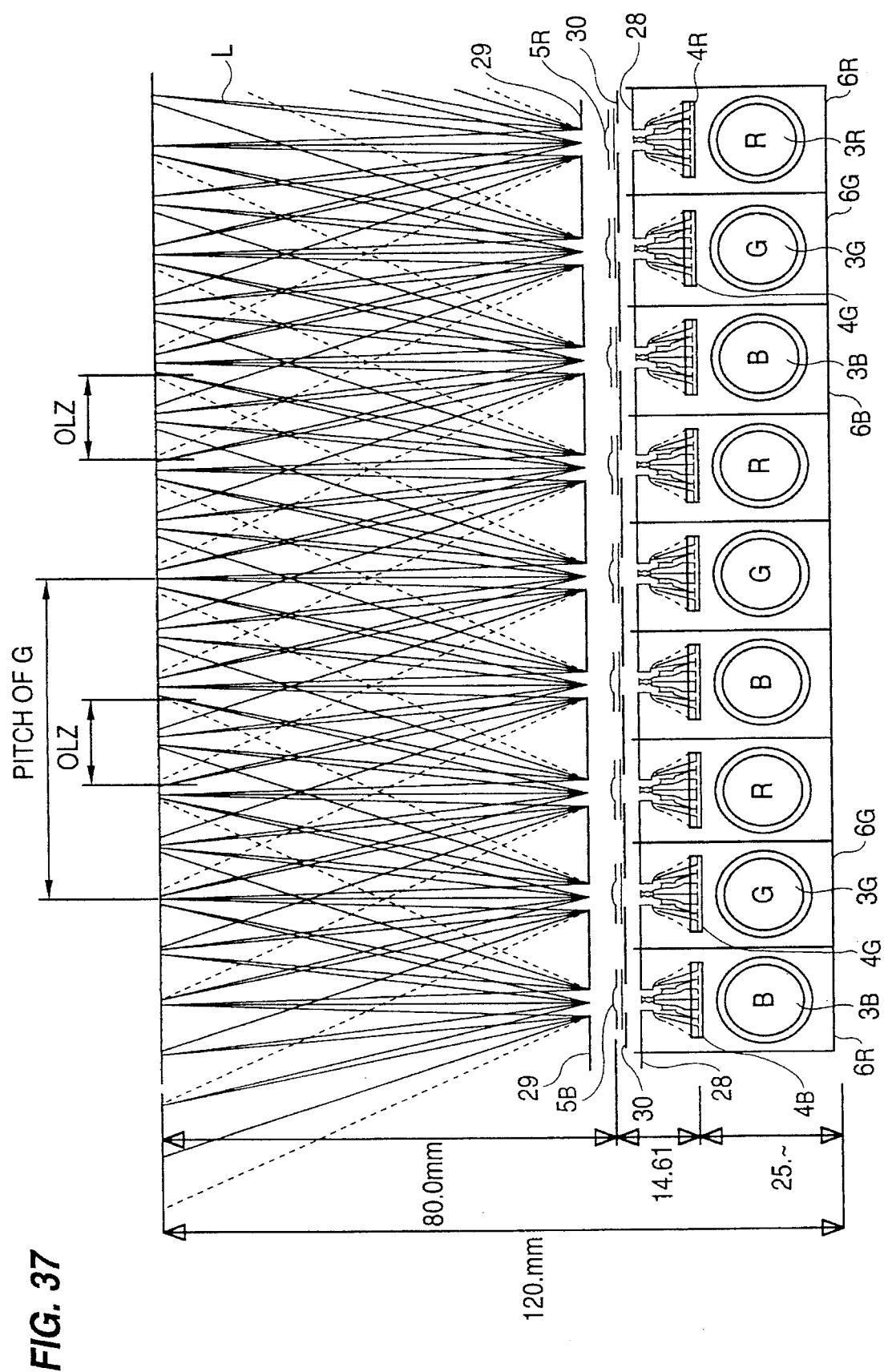
FIG. 37 is a partially enlarged see-through top plan view showing the device of the fourth embodiment of the present invention.

As shown in the fourth embodiment illustrated in FIGS. 36 and 37, the present invention may also be arranged so that three prime colors R, G and B are allocated to three different picture projection means grouped together into a set, so that the three picture projection means of the set have areas not overlapping with one another. FIGS. 36 and 37 illustrate a see-through partial front view corresponding to FIG. 4 of the first embodiment, and a see-through partial top plan view corresponding to FIG. 5 of the first embodiment, respectively.

In the present fourth embodiment, a picture projecting means taking charge of R, a picture projecting means taking charge of G, and a picture projecting means taking charge of B, are provided separately from one another. In other words, the light from a light source unit $3_R$, in charge of the color R, is projected on the screen 1 via a reflector plate $6_R$, a liquid crystal device $4_R$ and a projection lens $5_R$. Similarly the light from a light source unit $3_G$, in charge of the color G, is projected on the screen 1 via a reflector plate $6_G$, a liquid crystal device $4_G$ and a projection lens $5_G$. Similarly, the light from a light source unit $3_B$, in charge of the color B, is projected on the screen 1 via a reflector plate $6_B$, a liquid crystal device $4_B$ and a projection lens $5_B$. The fractional pictures projected from the picture projection means for the colors R, G and B are synthesized on the screen 1 into a color picture.

In the illustrated example of the present fourth embodiment, the distances between the reflecting plates $6_R$, $6_G$ and $6_B$ and the centers of the associated liquid crystal devices $4_R$, $4_G$ and $4_B$ are not less than 25 mm, while the distance between centers of the liquid crystal devices $4_R$, $4_G$ and $4_B$ and the distal points or apex points of the associated projection lenses $5_R$, $5_G$ and $5_B$ are 14.61 mm and the distances between the distal points or apex points of the associated projection lenses $5_R$, $5_G$ and $5_B$ and the associated positions on the screen 1 are 80 mm, so that the picture display device has a depth of 120 mm.

In the fourth embodiment, as shown in FIGS. 36 and 37, gradual decrease type projection angle control plates 28, 29 providing a rear aperture RA and a front aperture FA similar to those of the second embodiment and a non-gradual decrease type projection intensity control plate 30 providing a center aperture CA are provided for each of the picture projection means. The picture projection means of a given set have areas which do not overlap with one another; that is, the fractional pictures of each of the prime colors R, G and B have areas which do not overlap with one another.

In the present fourth embodiment, as illustrated in FIG. 36, the overlap zone OLZ between neighboring fractional pictures with respect to an arbitrary fractional picture of an arbitrary prime color is an area delimited between $W_{sp}$ ($=W_s \times 218/344$) and $W_{sk}$ ($=W_s \times 216/344$) in FIG. 36 in the horizontal direction and a region delimited between $H_{sp}$ ($=H_s \times 218/344$) and $H_{sk}$ ($=H_s \times 216/344$) in the vertical direction. In the present embodiment, as illustrated in FIG. 36, $W_s=120$ mm and $H_s=90.0$ mm.

In a fifth embodiment of the picture display device of the present invention, not shown herein, the projection images R, G and B are allocated to three light source nits of the picture projection means as a set, and the sole fractional picture forming means, inclusive of the liquid crystal device and the projection lens, is associated with the three light source units, while the light rays of the prime colors R, G and B radiated via the common sectional picture forming means have zones which do not overlap with one another.

That is, in distinction from the fourth embodiment, the present fifth embodiment is so designed that only the light source units radiate the prime color lights of R, G and B which are illuminated on the common liquid crystal device 4. Consequently, the device of the fifth embodiment has the resolution reduced to one-third of the fourth embodiment, although the Construction is simplified as compared to the fourth embodiment.

Figure 38:
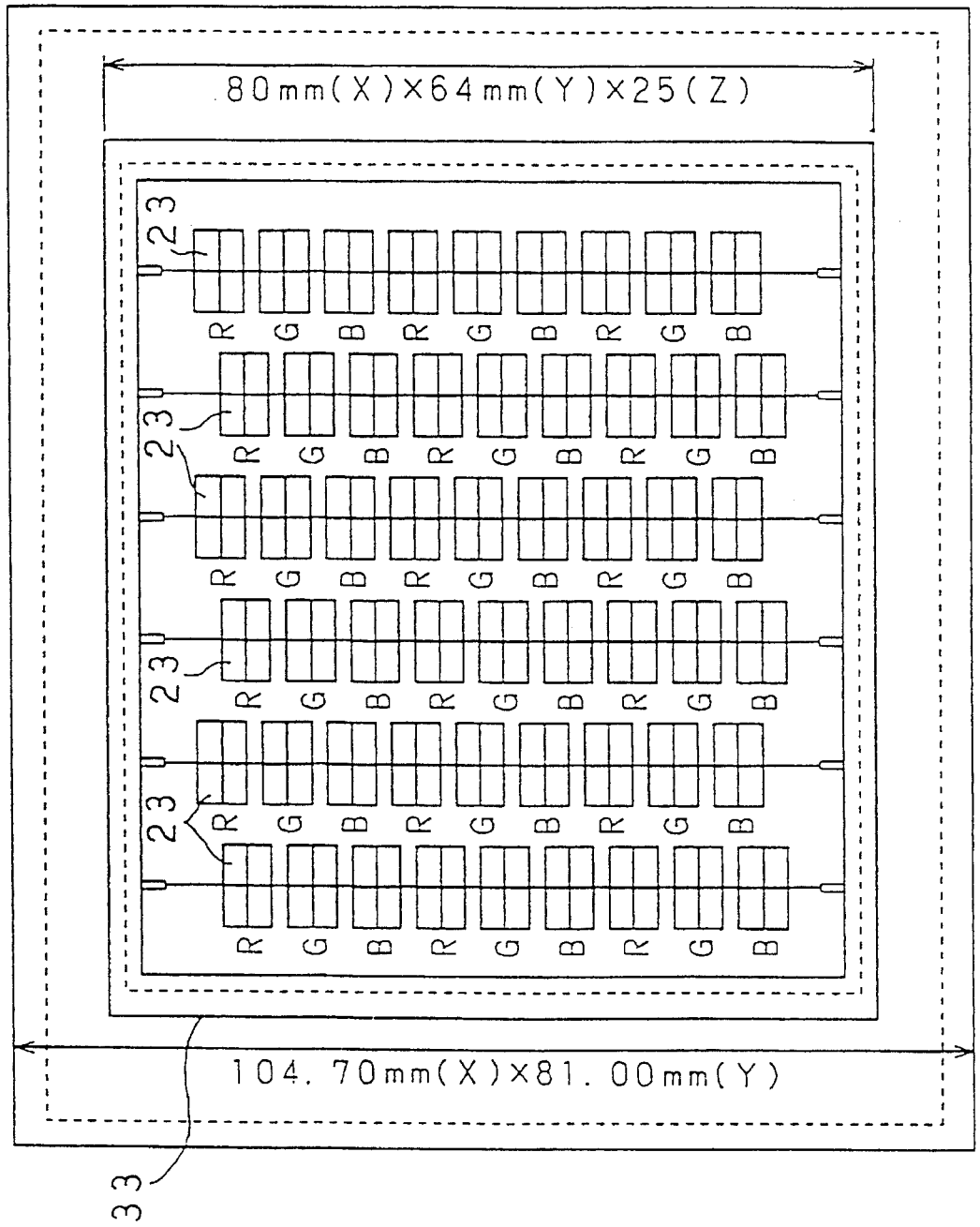
FIG. 38 is a front view showing a light source unit according to a sixth embodiment of the present invention.
Figure 39:
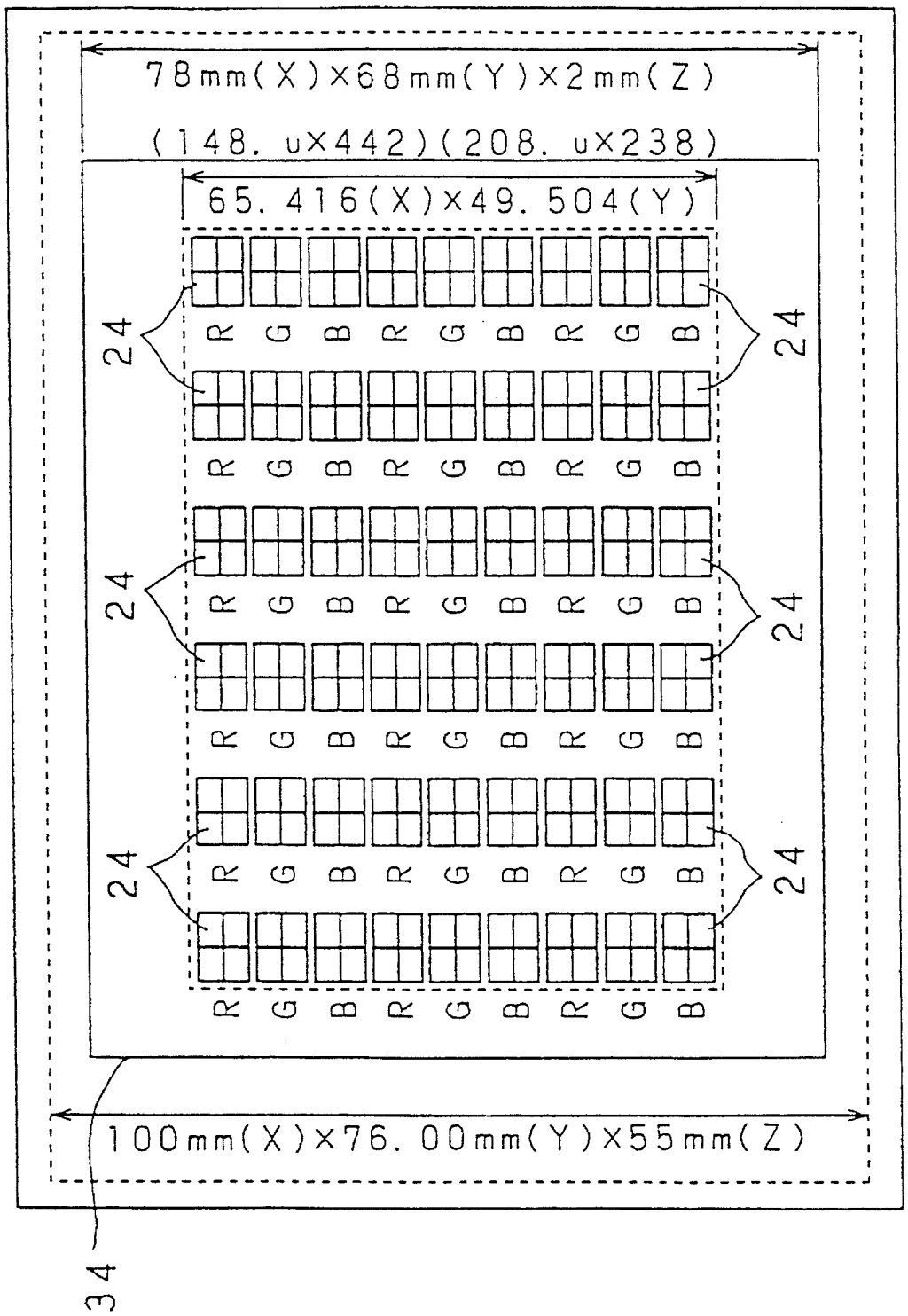
FIG. 39 is a front view showing a liquid crystal unit according to a sixth embodiment of the present invention.
Figure 40:
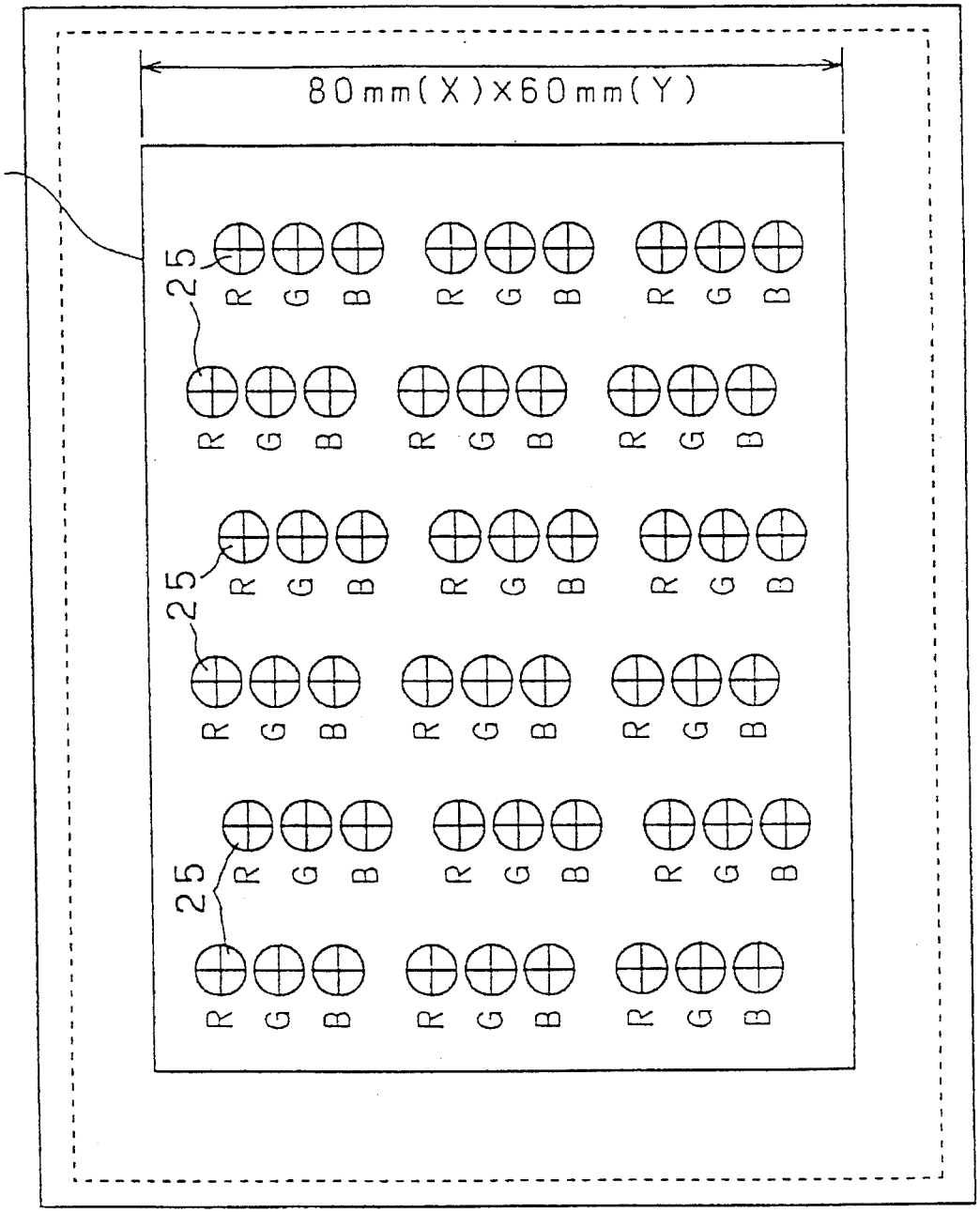
FIG. 40 is a front view showing a lens unit according to a sixth embodiment of the present invention.

A picture display device according to a sixth embodiment of the present invention, as shown in FIGS. 38, 39 and 40, has a picture projection means made up of a light source unit 33 for generating light radiating devices 23 for separately generating light rays of the three prime colors of R, G and B, depending on respective fractional picture signals, a liquid crystal unit 34 made up of separate liquid crystal devices 24 allocated to R, G and B, and a lens unit 35 made up of projection lenses 25 associated with R, G and B for forming an image of the light rays from the liquid crystal devices 24 of the liquid crystal unit 34 on the screen 1. The liquid crystal devices 24 split and distribute the light rays from the light emitting devices 23 of the three prime colors R, G and B based on the fractional picture signals for forming the fractional pictures as shown in FIG. 39. The light rays of R, G and B from the light radiating devices 23 of the light source unit 33 may be used for generating a color picture of the full screen size as shown in a perspective view in FIG. 41, a side view of FIG. 42 and a top plan view of FIG. 43 showing an arrangement of the various units of the picture display device.

Figure 42:
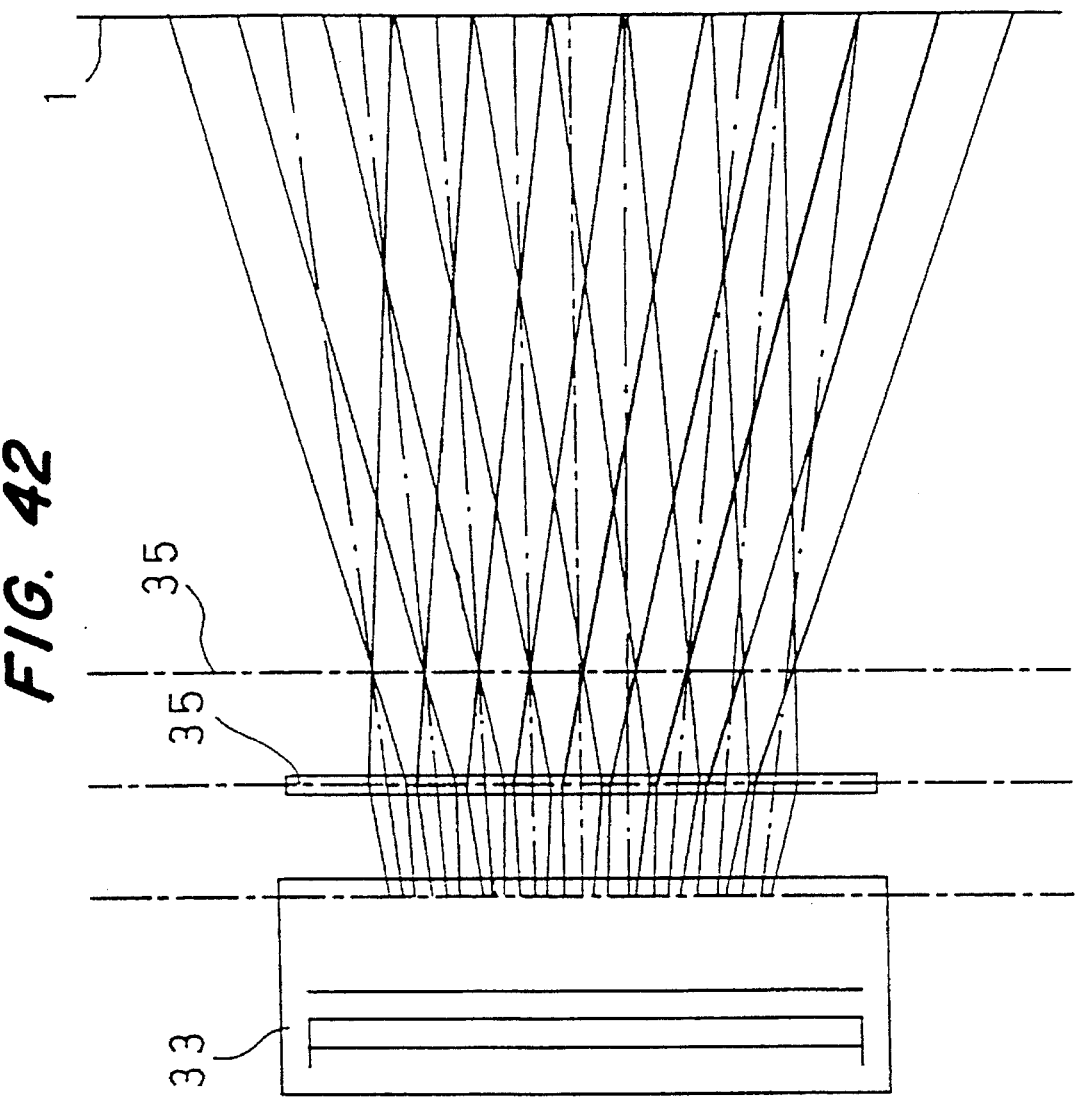
FIG. 42 is a side view showing the various units according to the sixth embodiment of the present invention illustrating the manner in which the fractional pictures reach a screen.
Figure 43:
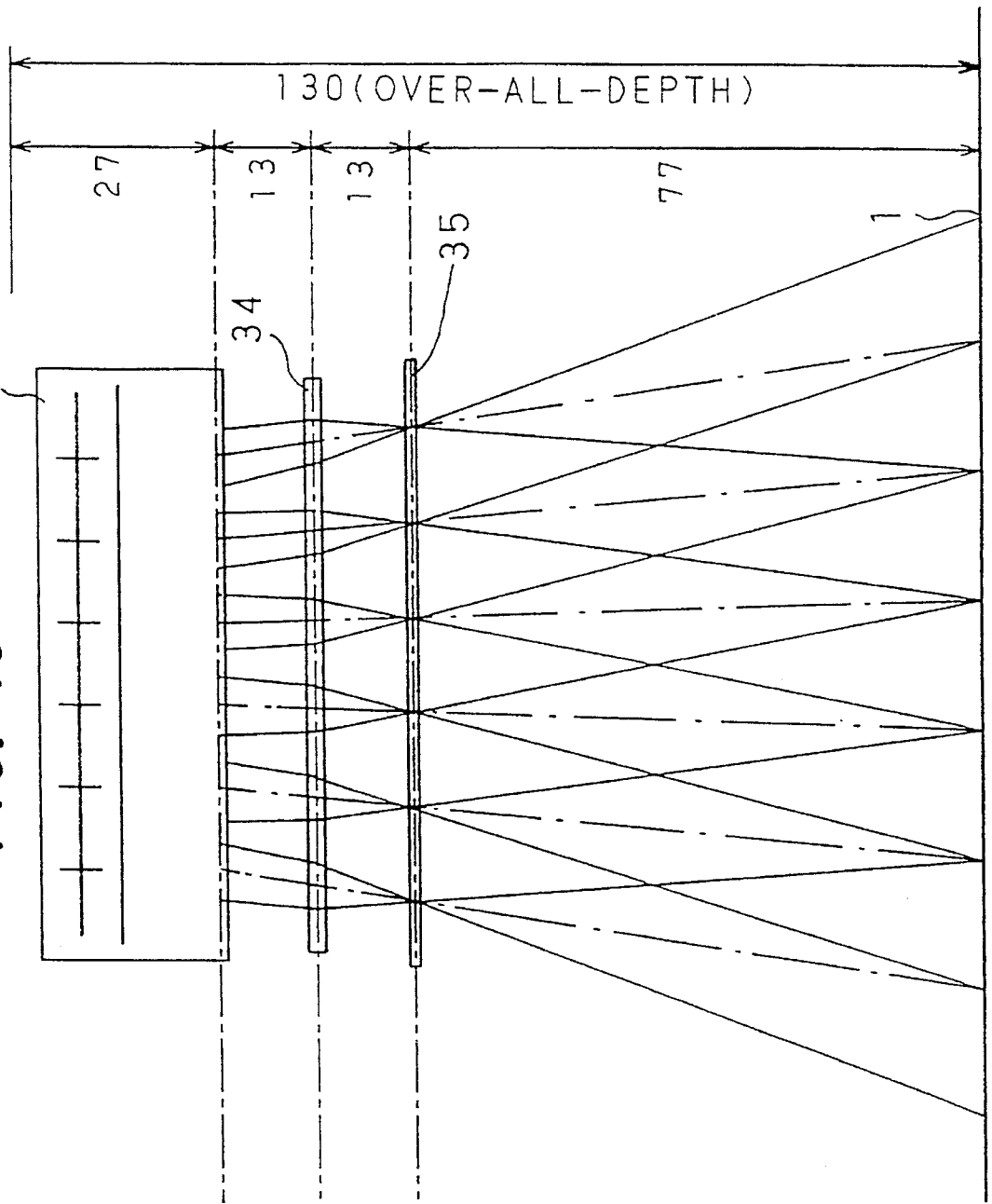
FIG. 43 is a side view showing the various units according to the sixth embodiment of the present invention illustrating the manner in which the fractional pictures reach a screen.
Figure 44:
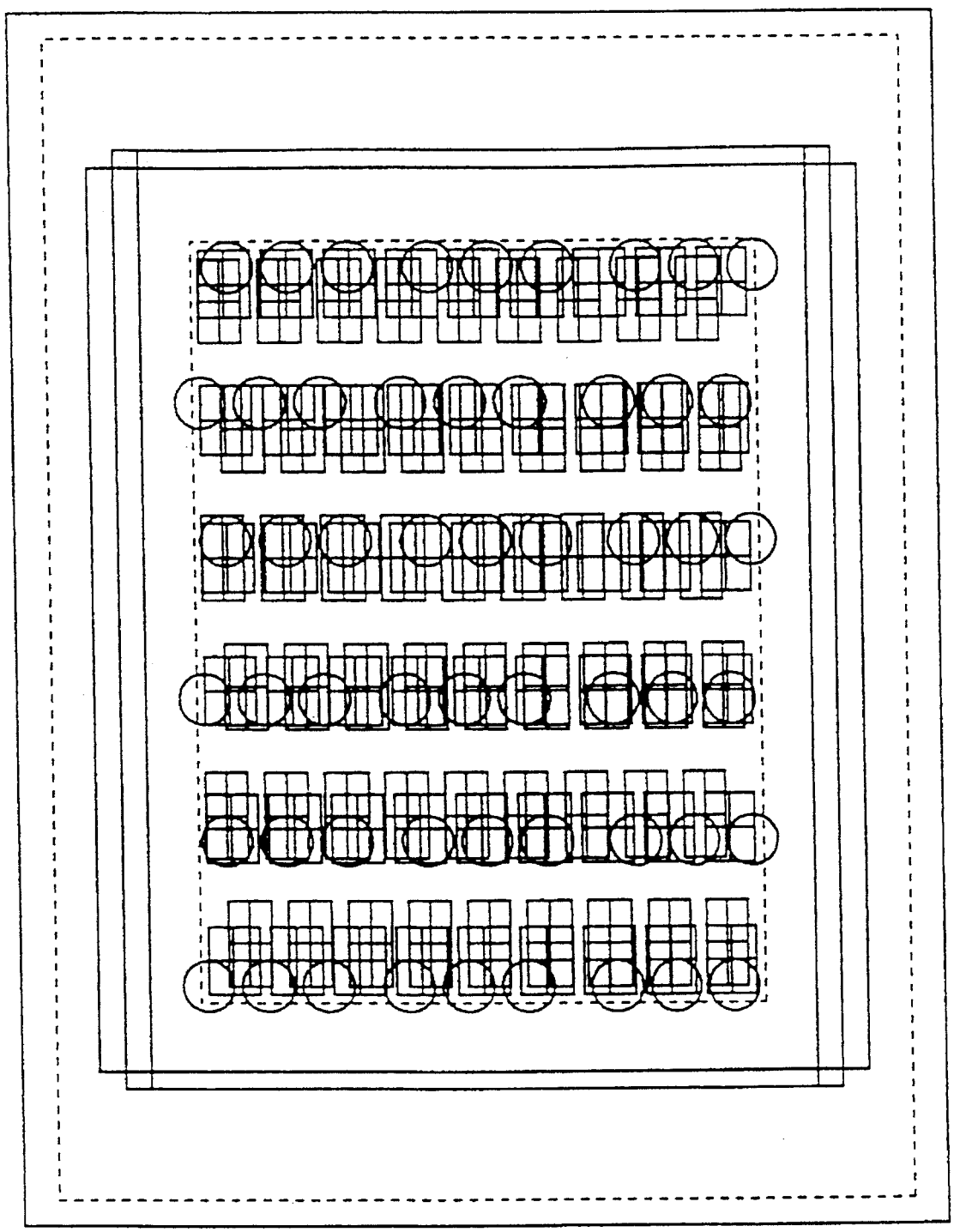
FIG. 44 is a see-through view showing the units of the screen, with the units being stacked one on another.
Figure 45:
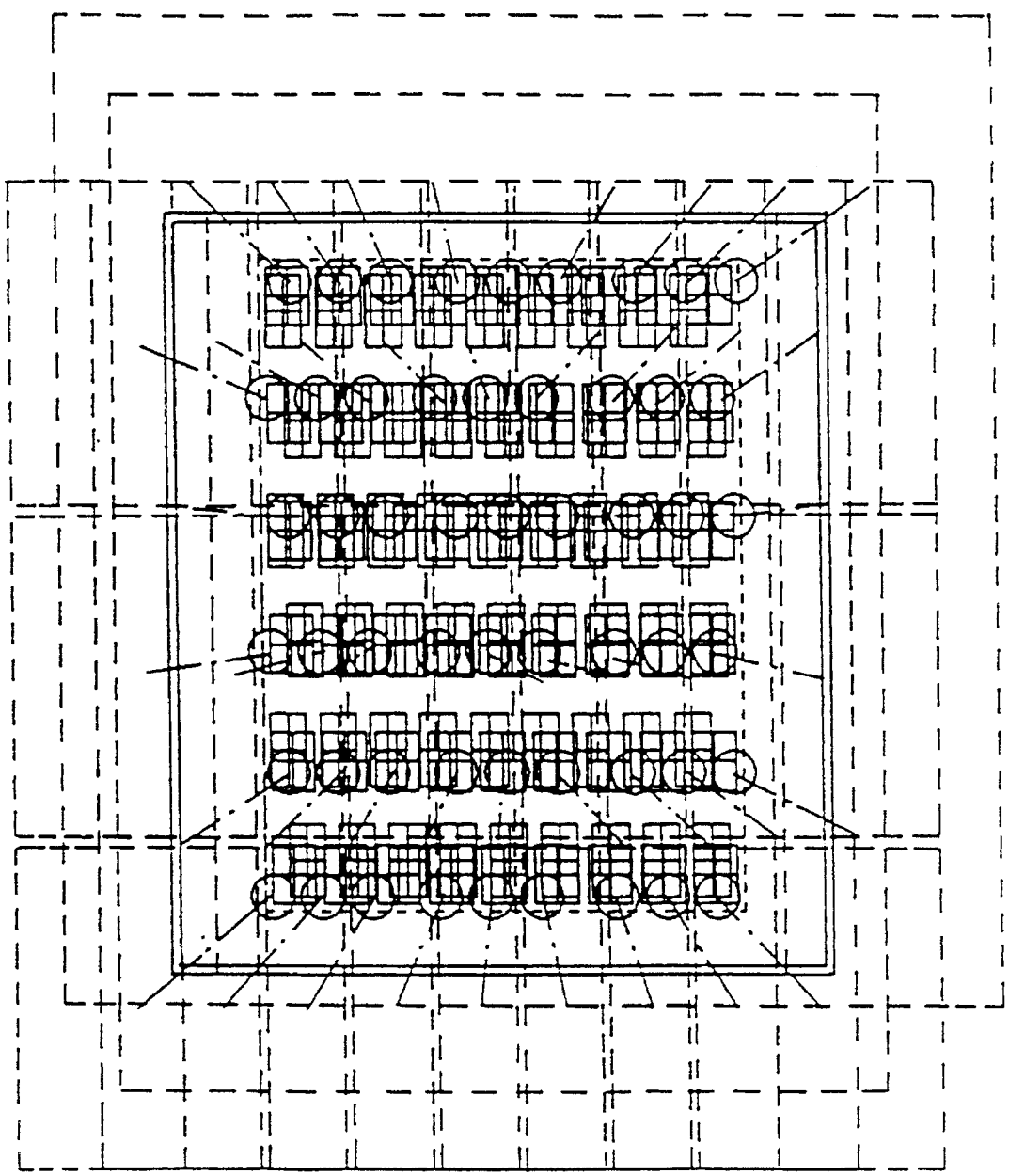
FIG. 45 is a see-through view from the screen side illustrating overlap between fractional pictures corresponding to R, G and B according to the fifth embodiment of the present invention.

In FIGS. 42 and 43, the lens unit 35 is shown only by a centerline. In the see-through view of FIG. 44, the display device is viewed from the screen 1, with FIGS. 38 to 40 being stacked one on the other, while, in the see-through view of FIG. 45 of the picture display device from the screen 1, the fractional pictures for the prime colors R, G and B are shown overlapped with one another.

The light radiating devices 23 of the light source unit 33 in the picture display device of the present sixth embodiment are formed by phosphor light sources. That is, the light source unit 33 is formed by a two-dimensional array of light radiating devices 23 which are plural phosphor display segments in the form of horizontally elongated rectangles having phosphor layers for R, G and B. The light source unit also includes, in association with the phosphor display segments, a first grid (control electrode) having plural cathodes and slits and a common second grid (accelerating electrode) having a slit. An electron beam from the cathode is transmitted through the slits of the first grid and the second grid to reach the phosphor display segment to emit light in the phosphor display segment.

The light source unit 33 in the example shown in FIG. 38 has a transverse width X of 104.70 mm and a longitudinal width Y of 81.00 mm. The light radiating devices 23 are arranged within a range of the transverse width X of 80 mm, the longitudinal width Y of 64 mm and a depth Z of 25 mm within the light source unit 33. The phosphor display segments (light radiating devices 23) are each of a size of 9.0 mm×4.7 mm, that is of an area equal to 9.0×4.7 mm$^2$, and 54 of the phosphor display segments are arranged within each unit.

The liquid crystal unit 34 in the example shown in FIG. 39 is of a transverse width X of 100 mm, a longitudinal width Y of 76.00 mm and a depth Z of 55 mm. Each liquid crystal device 24 has a 3-inch display surface and is within a range of the transverse width X of 78 mm, a longitudinal width Y of 68 mm and a depth Z of 2 mm within the liquid crystal unit 34. The liquid crystal unit 34 is arranged within a range of the transverse width X of 65.416 mm and a longitudinal width Y of 49.504 mm. The liquid crystal devices 24 constitute a monochromatic liquid crystal display made up of 40×22=880-pixels, and are arrayed in a configuration of 6×3×3=54.

The lens unit 35 in the example shown in FIG. 40 is made up of 6×9=54 projection lenses 25, each of which is a single lens having an F-number of 3 to 3.5 and a focal length f=13 mm, in a area measuring 80 mm in the transverse (X) direction and 60 mm in the longitudinal (Y) direction.

In the present example of the sixth embodiment, as illustrated in FIG. 43, the display device has a depth of 130 mm and the distance from the center of each projection lens 25 of the lens unit 35 up to the screen 1 is 77 mm, while the distance from the center of each projection lens 25 of the lens unit 35 up to the display surface of the liquid crystal device 34 of the liquid crystal unit 24 is 13 mm and the distance from the display surface of the liquid crystal device 34 up to the light radiating device 23 of the light source unit 33 is 13 mm.

In this embodiment, 11×8=88 picture projection means composed of these units are provided so that the picture projected on the screen 1 of the present sixth embodiment has a transverse width W of 115 cm and a height of 65 cm.

Further, 18 segments, each made up of 40×20=880 pixels, are provided for each unit in a set of R, G and B so that the number of pixels of each unit equals 15,840. Since 11×8=88 units are grouped together with an aspect ratio of 16:9, the total number of pixels is 1,393,920.

Figure 41:
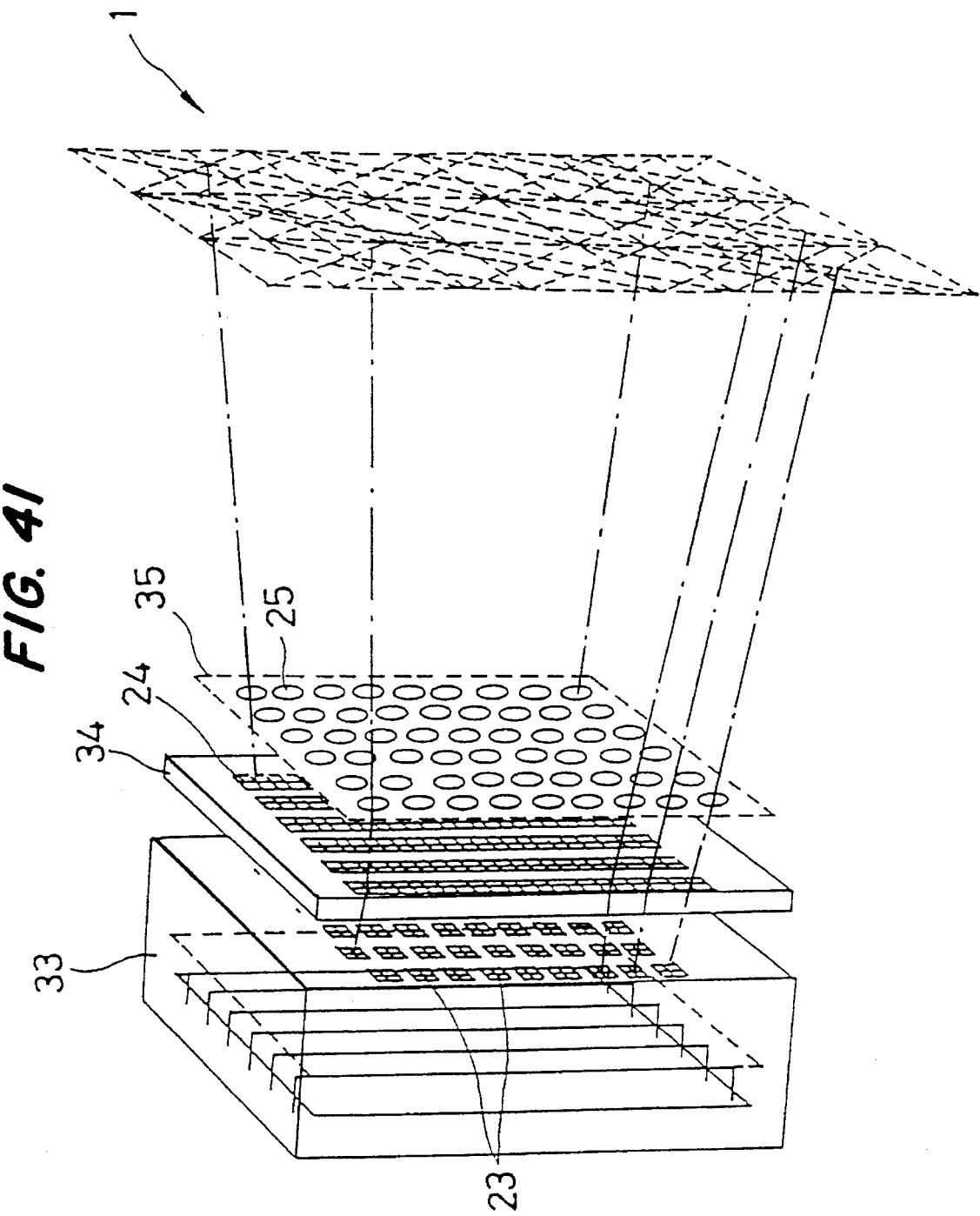
FIG. 41 is a perspective view showing the various units according to the sixth embodiment of the present invention illustrating the manner in which the fractional pictures reach a screen.
Figure 46:
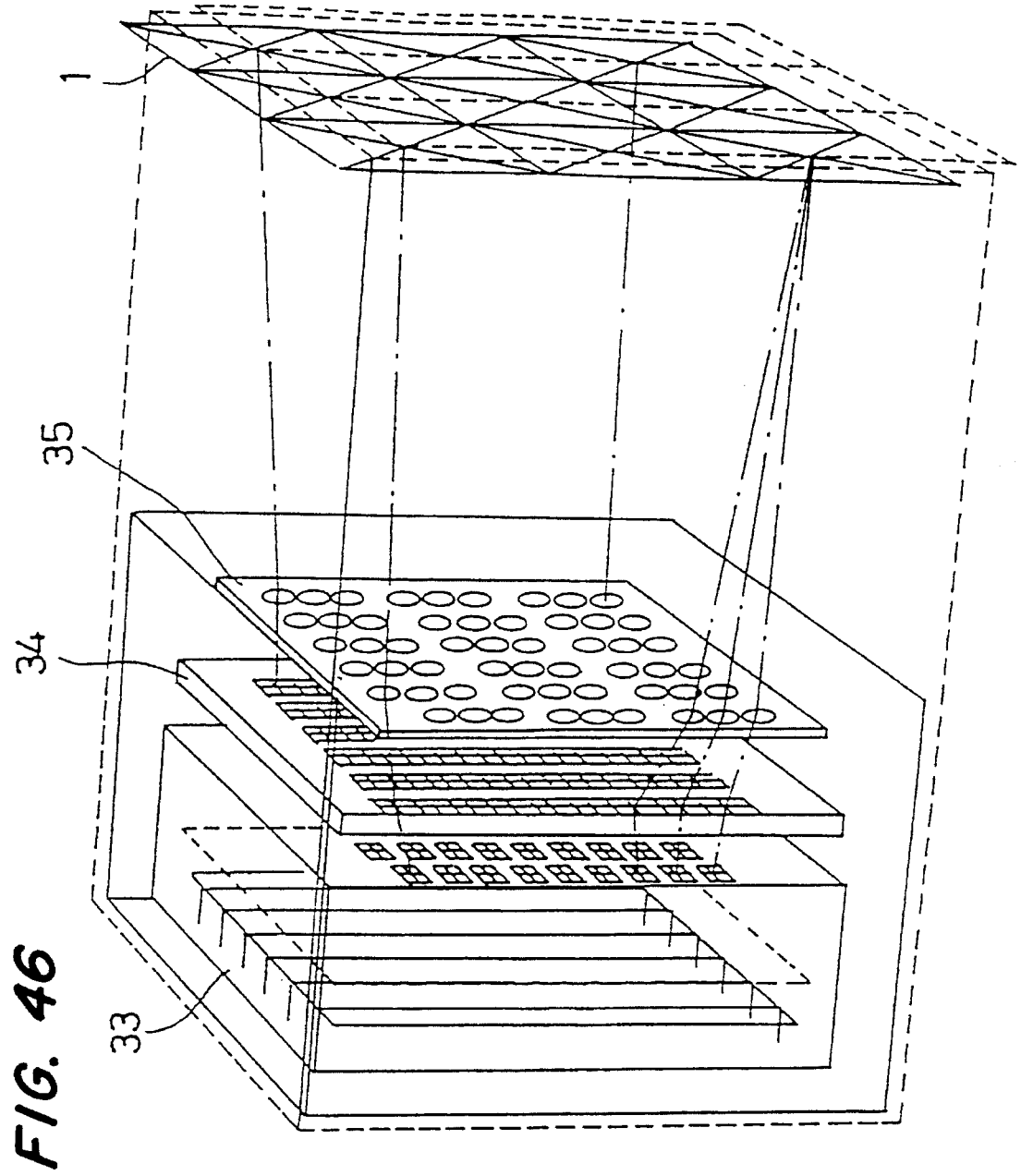
FIG. 46 is a perspective view showing the various units according to a seventh embodiment of the present invention illustrating the manner in which the fractional pictures reach a screen.
Figure 47:
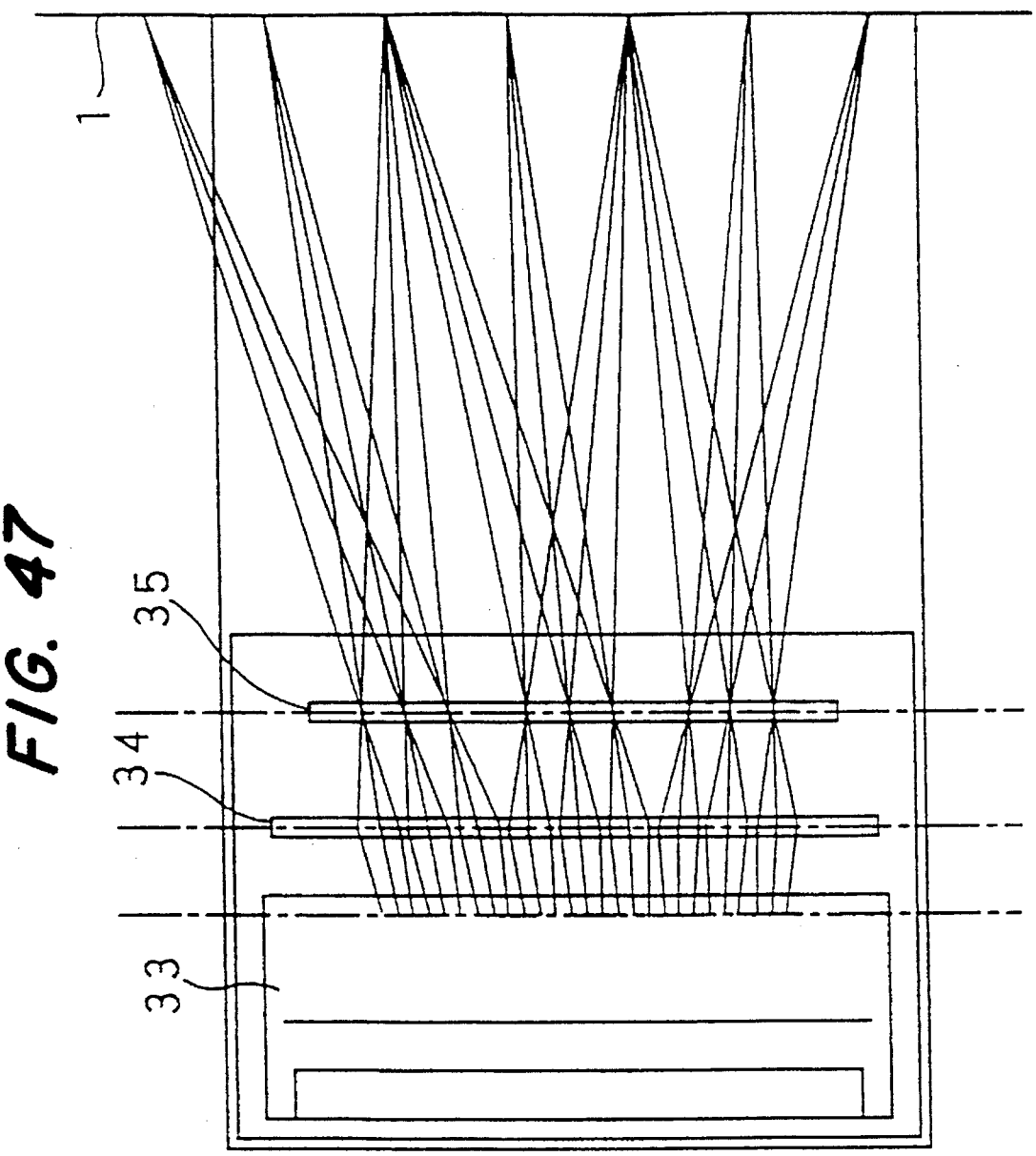
FIG. 47 is a side view showing the various units according to the seventh embodiment of the present invention illustrating the manner in which the fractional pictures reach a screen.
Figure 48:
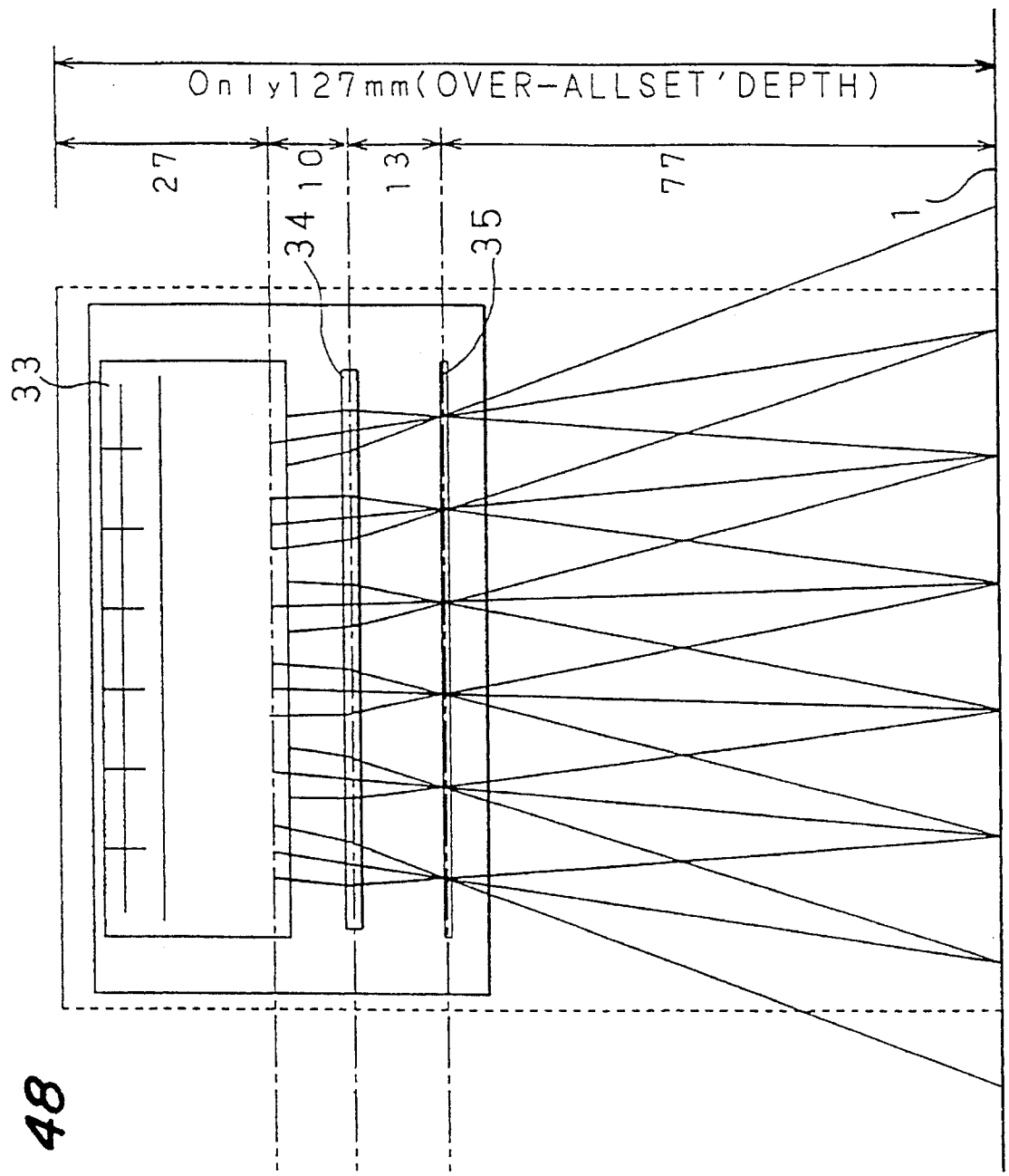
FIG. 48 is a side view showing various units according to the seventh embodiment of the present invention illustrating the manner in which the fractional pictures reach a screen.
Figure 49:
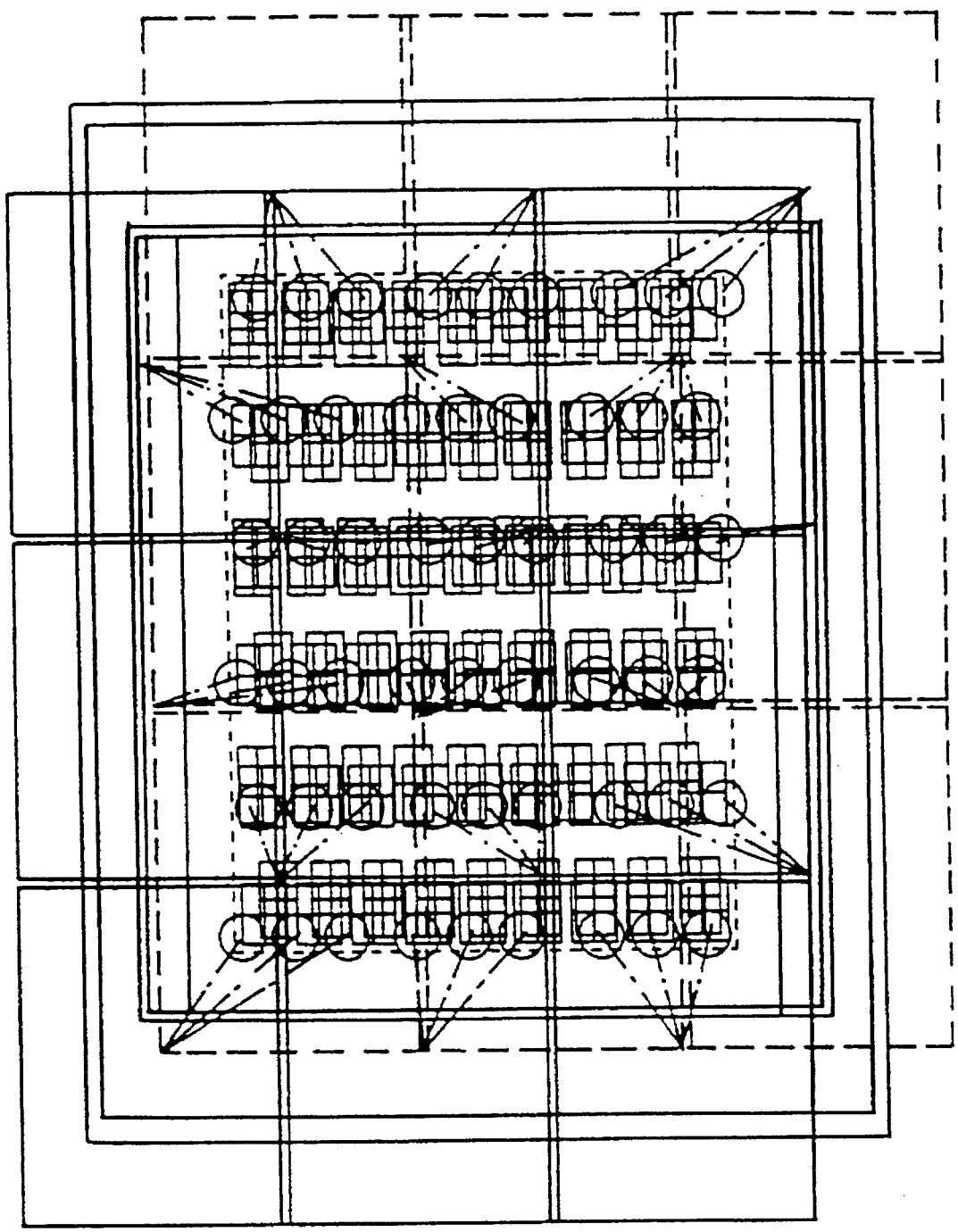
FIG. 49 is a see-through view from the screen side illustrating the overlap between fractional pictures corresponding to R, G and B of the seventh embodiment.

With the above-described sixth embodiment, the projected sectional pictures associated with R, G and B overlap as shown in FIGS. 41 to 43. Such picture overlap may be eliminated in a seventh embodiment shown in FIGS. 46 to 48 and in FIG. 49 which correspond to FIGS. 41 to 43 and FIG. 45, respectively.

In the present example of the seventh embodiment, the depth of the display device is 127 mm and the distance from the center of each projection lens 25 of the lens unit 35 up to the screen 1 is 77 mm, while the distance from the center of each projection lens 25 of the lens unit 35 up to the display surface of the liquid crystal device 24 of the liquid crystal unit 24 is 13 mm and the distance from the display surface of the liquid crystal device 34 up to the light radiating device 23 of the light source unit 33 is 10 mm. The total number of pixels in the present seventh embodiment equals to 1,393,920 pixels, as in the above-mentioned sixth embodiment.

Figure 50:
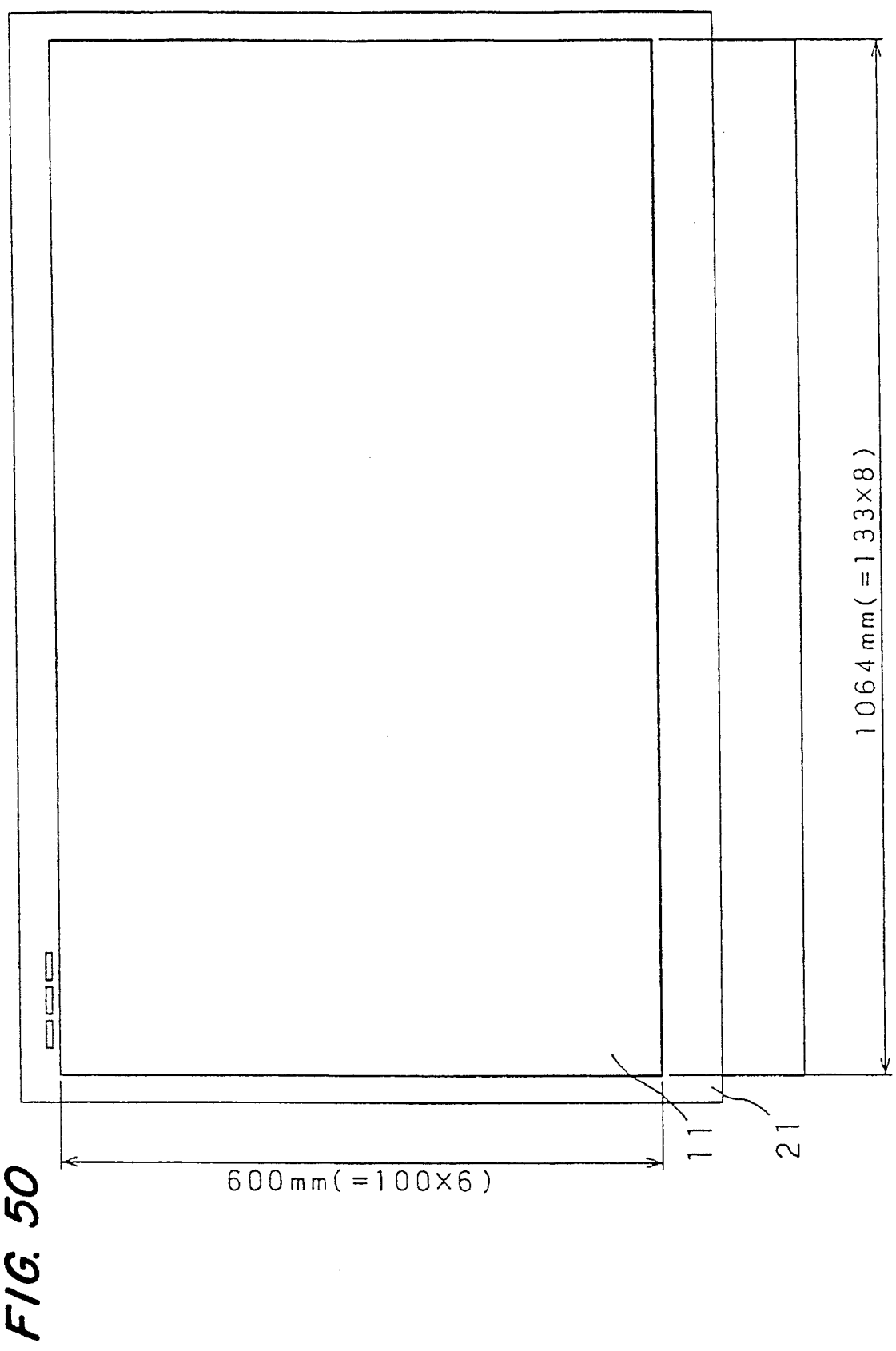
FIG. 50 is a partially see-through front view showing a picture display device according to an eighth embodiment of the present invention.
Figure 51:
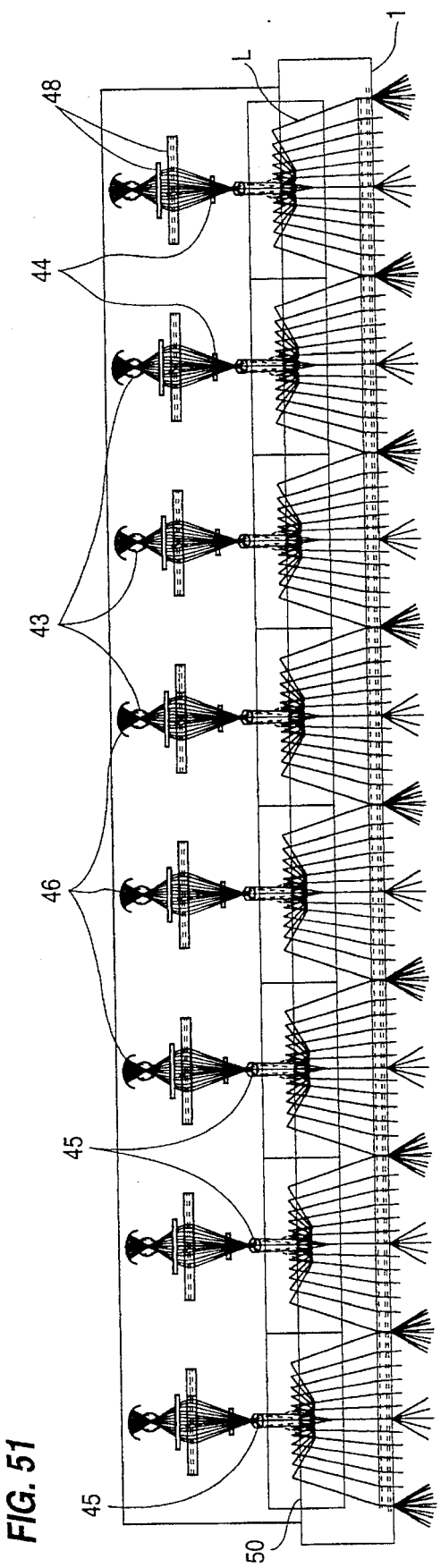
FIG. 51 is a see-through top plan view of the picture display device of FIG. 50.
Figure 52:
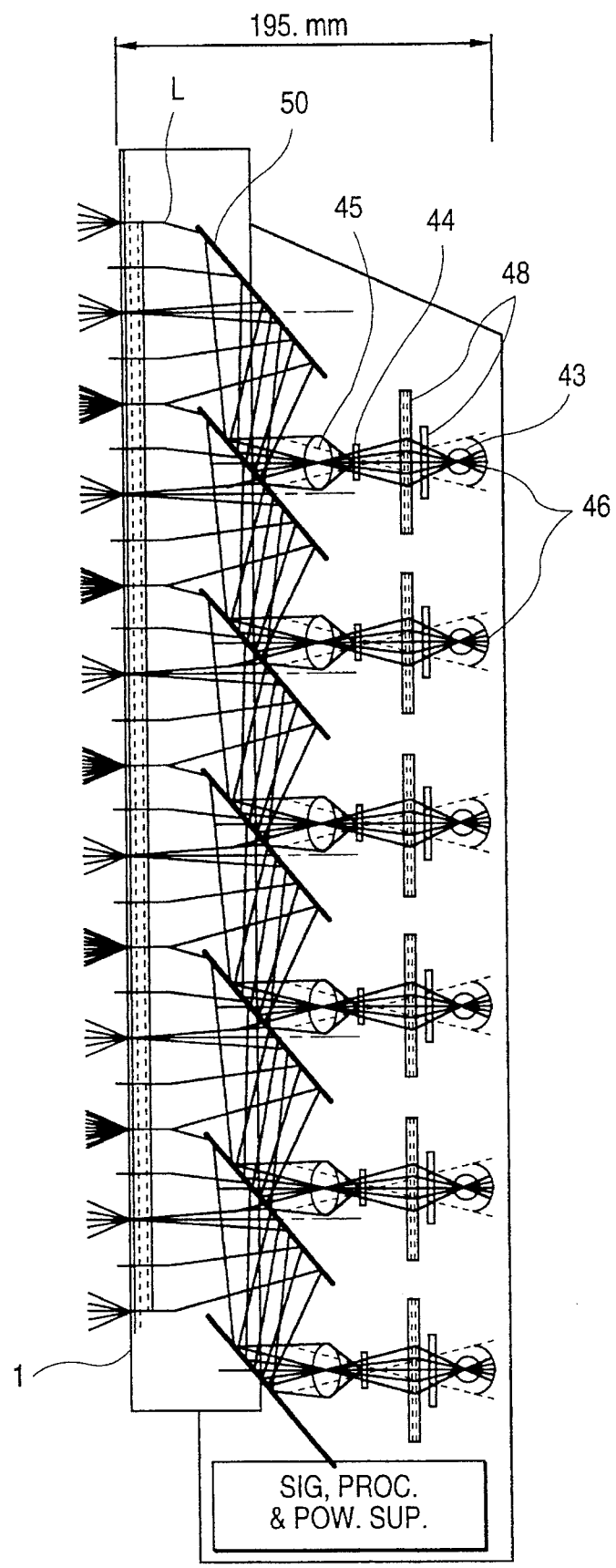
FIG. 52 is a see-through right side view of the picture display device of FIG. 50.

The picture display device according to an eighth embodiment of the present invention, as shown in FIGS. 50 to 52, is designed so that the picture projecting light is reflected at least twice by a projection optical system of each picture projection means before the fractional pictures are projected on the screen 11. By reflecting the picture projecting light by two reflecting mirrors 50, the projection light path presents a Z-shape, for reducing the optical path length of the fractional pictures; that is, for reducing the depth of the display device.

FIGS. 50, 51 and 52 illustrate the eighth embodiment in a front view, a see-through top plan view and a see-through right side view, respectively.

Figure 53:
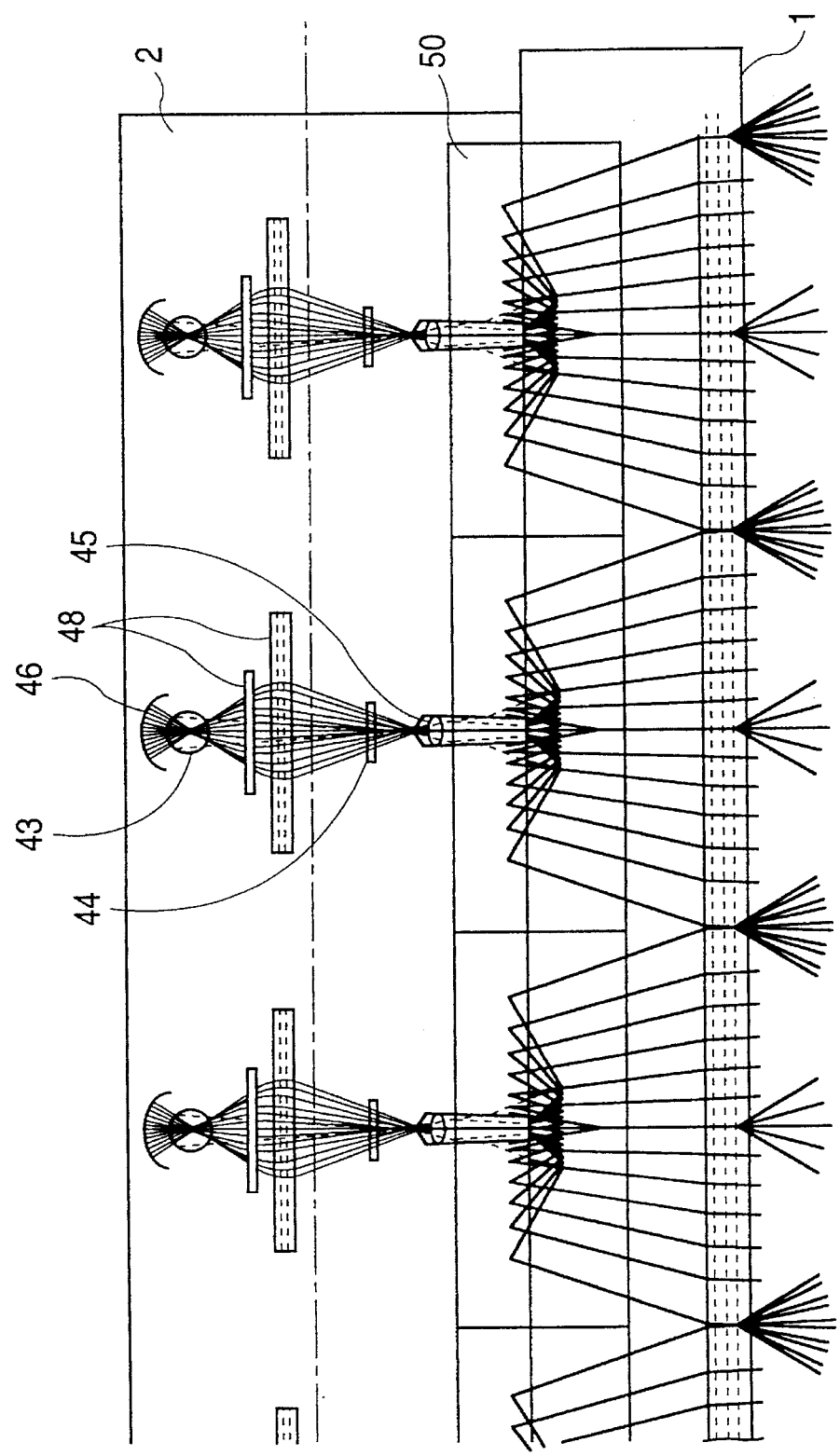
FIG. 53 is a partially enlarged see-through top plan view of the device of FIG. 50.
Figure 54:
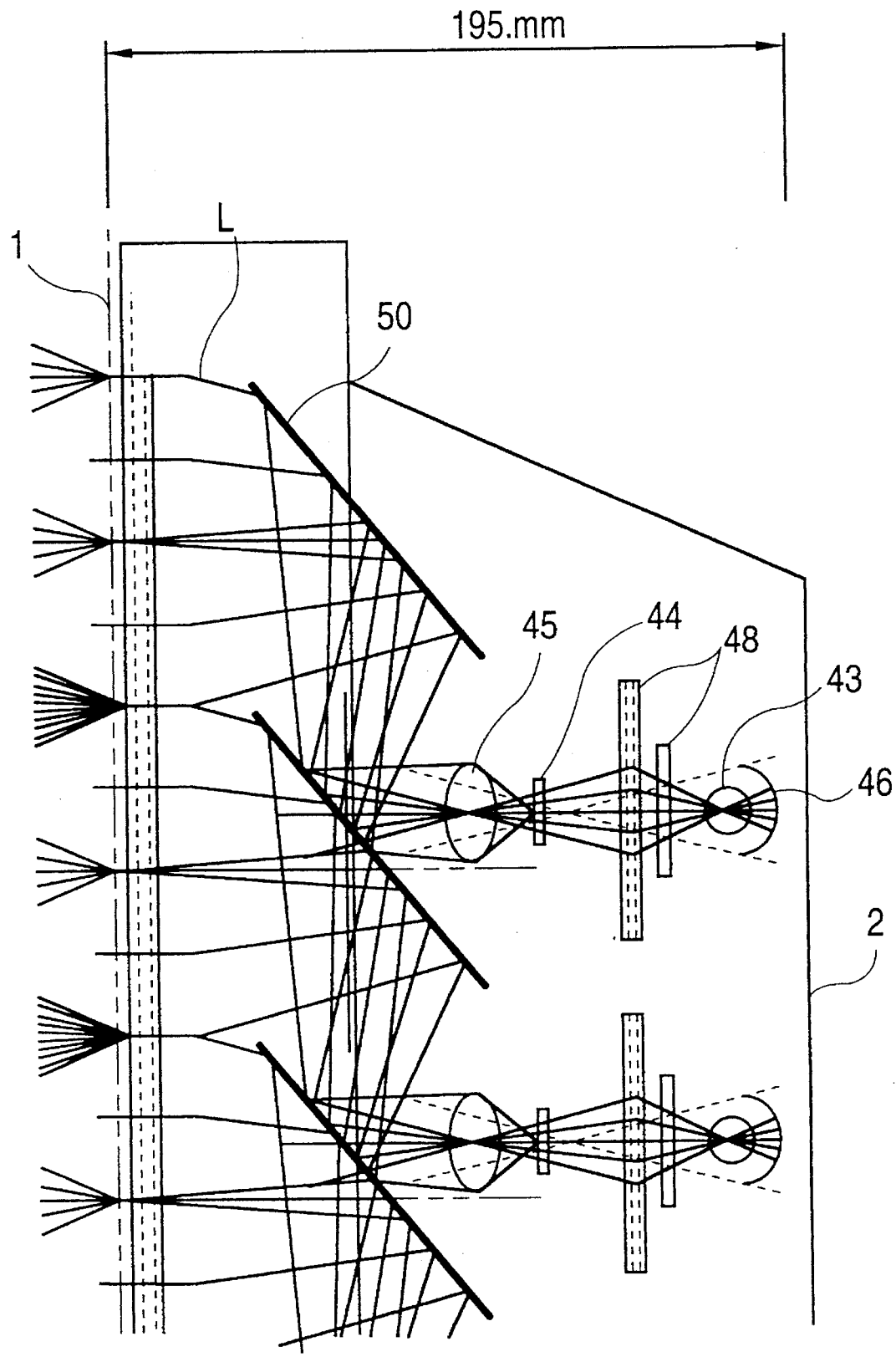
FIG. 54 is a partially enlarged see-through right side view of the device of FIG. 50.

As shown in FIGS. 53 and 54, which respectively illustrate portions of FIGS. 51 and 52 as a see-through enlarged view, the picture display device according to the eighth embodiment includes picture projection means made up at least of a spherical-shaped light source unit 43 for radiating light, a liquid crystal device 44 for dividing and distributing the light from the light source unit 43 based on picture signals, that is fractional picture signals corresponding to the respective fractional pictures for generating the fractional pictures, a concave mirror 46 for reflecting the light from the light source unit 33 and for guiding the light to the liquid crystal unit 44, two condenser lenses 48 for condensing the direct light from the light source unit 43 and the light from the light source unit 43 reflected by the concave mirror 46 on the reverse surface of the liquid crystal device 44, a projection lens 45 for forming the fractional pictures obtained by the liquid crystal device 44 on the screen 1, and a double-side reflection type reflecting mirror 50 for reflecting the light of the fractional pictures from the projecting lens 45 along a Z-shaped optical path. The picture projection means made up of these optical components is provided in association with each of the fractional picture pictures making up a complete picture. Consequently, the full-screen size picture is projected on the screen 1 by projecting and synthesizing the fractional pictures from the respective picture projection means on the screen to an enlarged scale. In FIGS. 51 to 54, the letter L is used to indicate part of the projecting light of the projected picture. Each of the liquid crystal devices 44 has a square-shaped aperture corresponding in size to the liquid crystal device 44, and is secured to the housing 2, as in the previous embodiments. Each liquid crystal device 44 associated with each projection lens 45 and the condenser lens 48 may be assembled into one optical unit, which in such case is secured to the housing 2.

An exemplary picture display device according to the eighth embodiment of the present invention has a depth of 195 mm, with the transverse and longitudinal widths of the screen 11 being 1064 mm (=133 mm×8) and 600 mm (=100 mm×6). The picture display device of the eighth embodiment may comprise a 48-inch size high-definition display including 48 picture display means, each having a 0.7 inch size liquid crystal device 44, with the aspect ratio of the screen being 16:9.

Although the fractional pictures do not overlap with the display device in the present eighth embodiment, it is possible for the fractional pictures to be progressively overlapped as in the above-described embodiments. In such a case, it is necessary to provide an optical gradual decrease type projection angle control means as explained in connection with the above-described embodiments.

The color pictures may also be obtained with the present eighth embodiment by employing R, G and B color pixels as in the previous embodiments.

Figure 55:
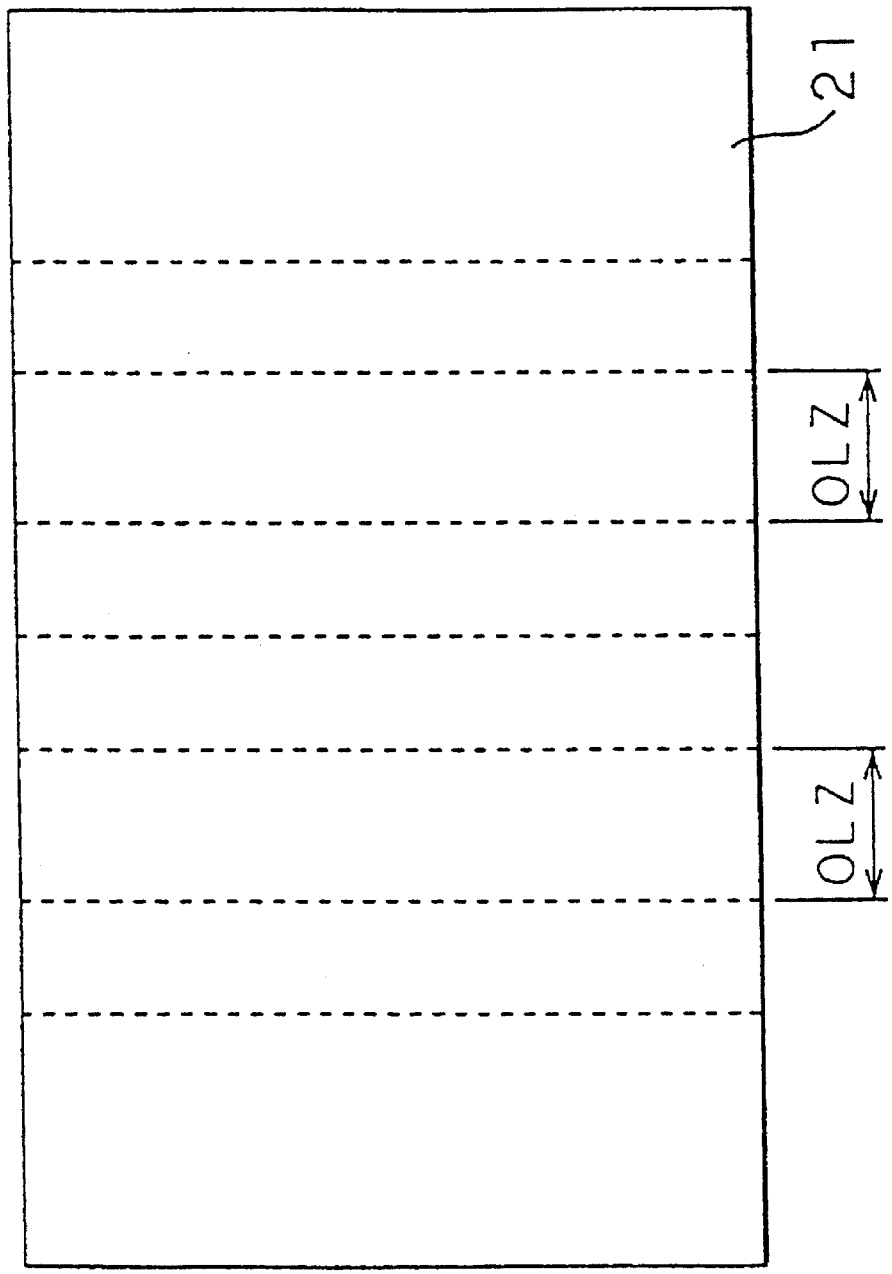
FIG. 55 is a partially enlarged see-through front view of a device according to a ninth embodiment of the present invention.
Figure 56:
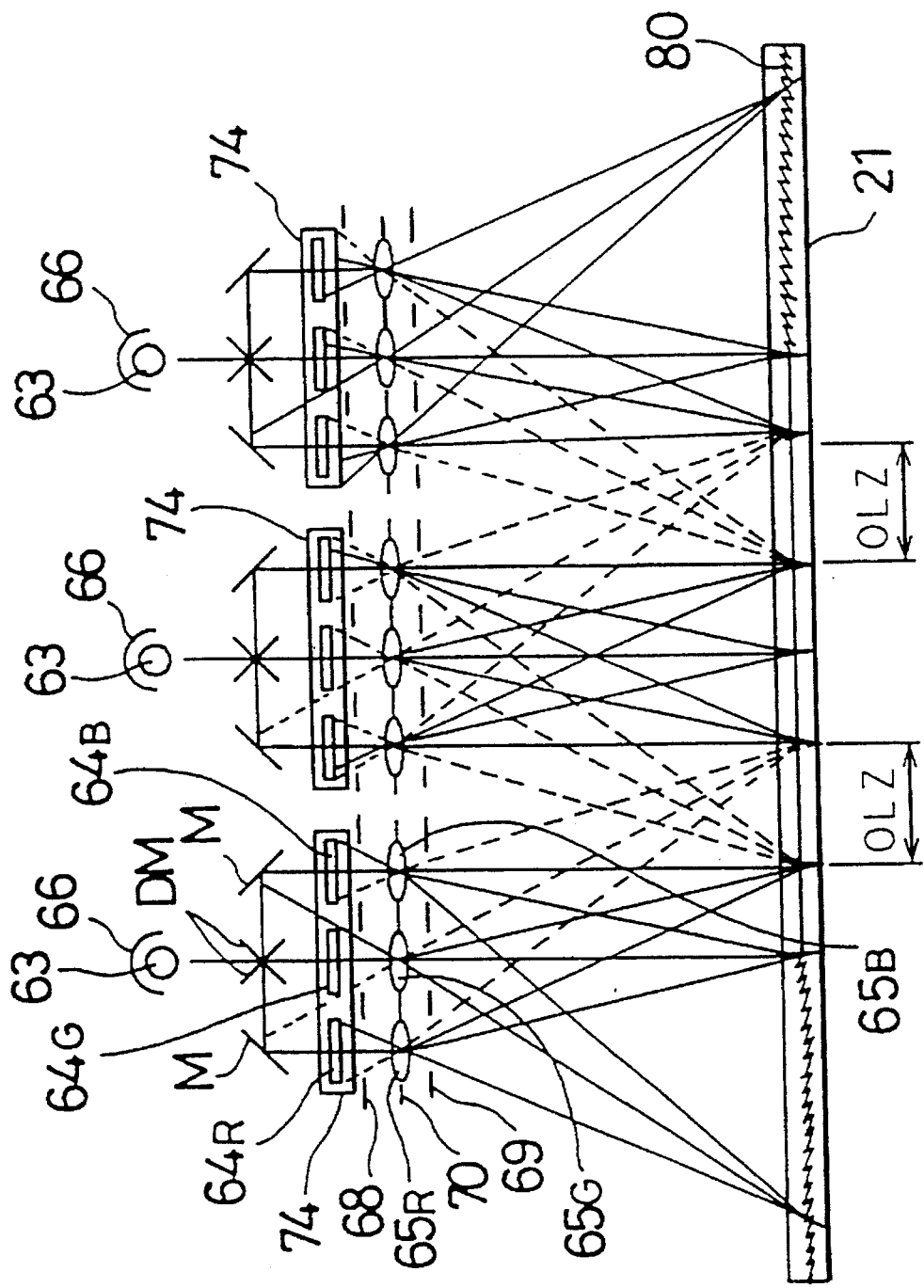
FIG. 56 is a partially enlarged see-through top plan view of the device of FIG. 55.
Figure 57:
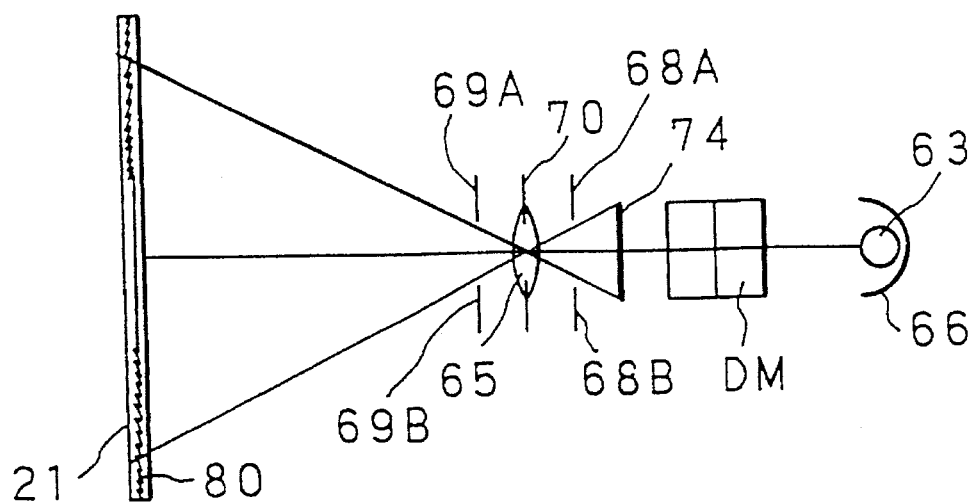
FIG. 57 is a partially enlarged see-through right side view of the device of FIG. 55.

Referring now to FIGS. 55 to 58, a display device according to a ninth embodiment of the present invention will be explained. FIGS. 55, 56 and 57 illustrate the ninth embodiment in a partial front view, a see-through top plan view and a partial see-through right side view, respectively.

Figure 58:
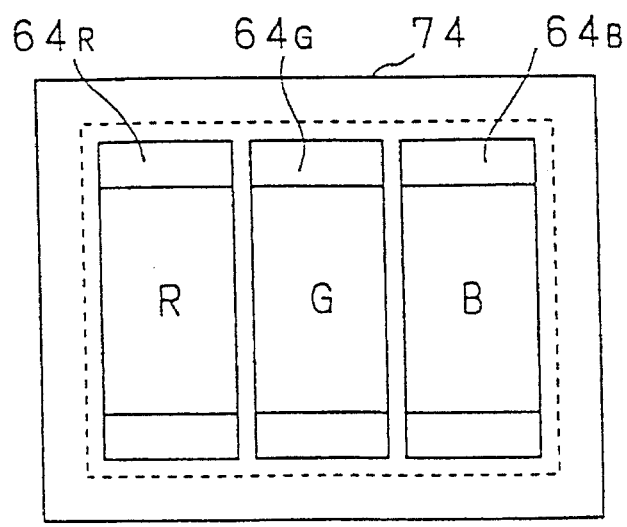
FIG. 58 is a front view showing a liquid crystal unit of the device of FIG. 55.

The picture display device according to the ninth embodiment includes picture projection means made up of, e.g., a spherical-shaped light source unit 63 for generating a light source light, a liquid display unit 74 having liquid crystal devices $64_R$, $64_G$ and $64_B$ for separating and distributing the light from the light source unit 63 based on picture signals, that is fractional picture signals corresponding to the respective fractional pictures as shown in FIG. 58 for forming fractional pictures of R, G and B, a concave mirror 66 for reflecting the light source light from the light source unit 63, dichroic mirrors DM and reflecting mirrors $M_R$, $M_B$ for separating the light source light from the light source unit 63 reflected by the concave mirror 66 into light beams R, G and B for guiding the separated light beams to the liquid crystal devices $64_R$, $64_G$ and $64_B$ of the liquid crystal unit 74 associated to R, G and B, projecting lenses $65_R$, $65_G$ and $65_B$ for forming images of the R, G and B fractional pictures obtained by radiation on the back surfaces of the liquid crystal devices $64_R$, $64_G$ and $64_B$ of the R, G and B light beams separated by the reflecting mirrors $M_R$, $M_B$ and the dichroic mirrors DM, and gradual decrease type projecting angle control systems 68, 69 and 70 having a rear aperture RA and a front aperture FA as a gradual decrease type projection angle control means for gradually decreasing the light volume of the overlapped portions of the R, G and B fractional pictures projected with overlap on the screen 21, and a center aperture CA as a non-gradual projection intensity control means. The picture projection means made up of these optical components is provided in association with each of the fractional pictures making up a complete picture. Consequently, the full-screen size picture is projected on the screen 1 by projecting and synthesizing the fractional pictures from the respective picture projection means on the screen to an enlarged scale. With the present ninth embodiment of the picture display device, a Fresnel lens 80 is mounted in proximity to the screen 21.

In the present embodiment, the light source light from the light source unit 63 reaches the dichroic mirrors DM directly or after reflection by the concave mirror 63. These dichroic mirrors DM reflect the R light beam and the B light beam, respectively. Consequently, the R light beam reflected by the dichroic mirrors DM is reflected further by the reflecting mirror $M_R$ so as to be directed to the back side of the liquid crystal device $64_R$, while the B light beam reflected by the dichroic mirrors DM is reflected further by the reflecting mirror $M_B$ so as to be directed to the back side of the liquid crystal device $64_B$ for the B light beam. The remaining G light beam, separated from the R and B light beams by the dichroic mirrors DM, reaches the back surface of the liquid crystal device 64G for the G light beam. In this manner, the projected fractional pictures corresponding to R, G and B may be obtained with the present embodiment.

With the present example of the ninth embodiment of the present invention, high-definition pictures with an aspect ratio of 16:9 may be obtained by the liquid crystal unit 74 made up of the liquid crystal devices $64_R$, $64_G$ and $64_B$ for R, G and B and associated three projection lenses or the like. That is, with the present ninth embodiment, each screen is made up of three projected fractional pictures.

With the present ninth embodiment, overlap zones OLZ of the fractional pictures from the liquid crystal devices $64_R$, $64_G$ and $64_B$ are as shown in FIG. 55. This eliminates junction zones between adjacent fractional pictures.

Figure 59:
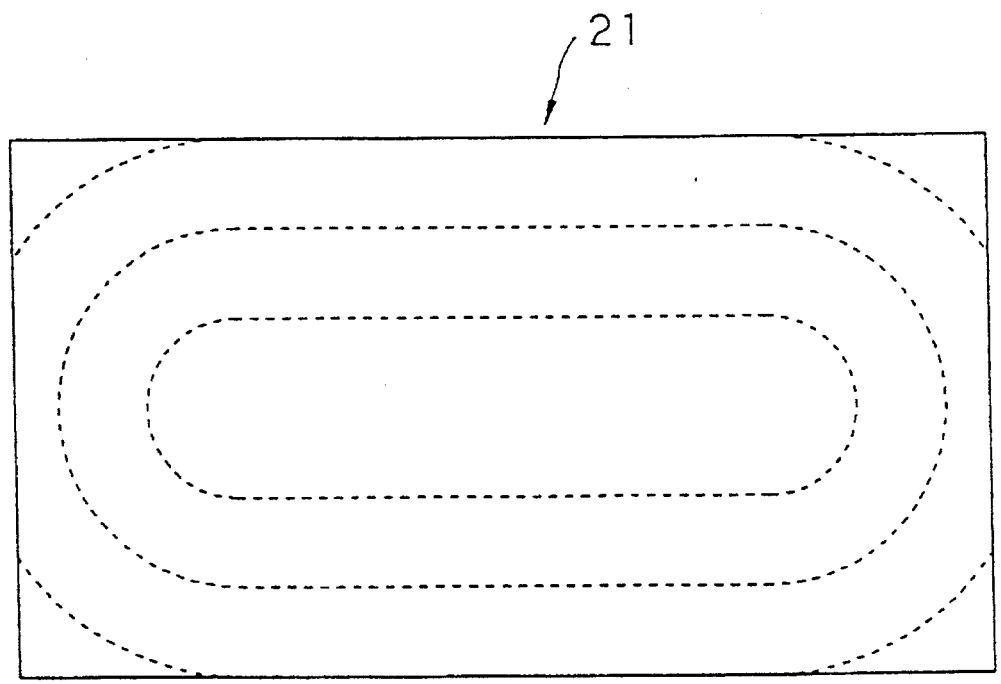
FIG. 59 illustrates the state of projection division pictures on a screen according to the ninth embodiment of the present invention.

In the present ninth embodiment, the picture is projected on the screen 21 in spherical and cylindrical shapes as shown by the broken lines in FIG. 59. This can be corrected by a Fresnel lens 80, as shown in FIGS. 56 and 57, on the picture projecting side of the screen 21.

Figure 60:
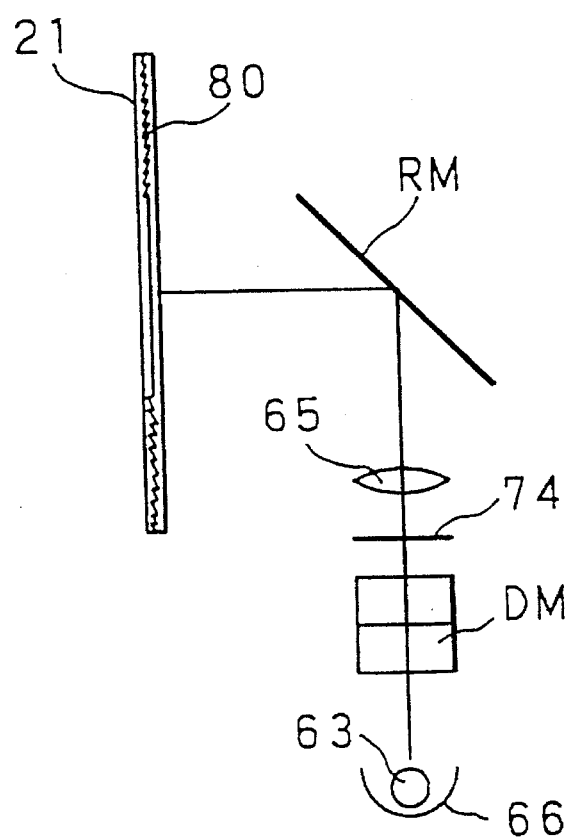
FIG. 60 illustrates an arrangement of essential portions of the device of in FIG. 55 of a tenth embodiment of the present invention.

FIG. 60 shows a tenth embodiment in which the device of the ninth embodiment is further reduced in depth. FIG. 60 is a schematic layout view similar to FIG. 57.

With the tenth embodiment of the picture display device, shown in FIG. 60, the light source unit 63, concave mirror 66, liquid crystal unit 74, projection lens 65 and the dichroic mirror DM are arranged at a pre-set angle, herein 90', relative to the screen 21 for reducing the depth of the device in its entirety. The reflective mirrors or the like are not shown in FIG. 60. A new reflective mirror RM is additionally provided for projecting the picture on the screen 21. The pre-set angle may be any other angle than a right angle.

In the above-described ninth and tenth embodiments, the liquid crystal devices $64_R$, $64_G$ and $64_B$, are arrayed in a straight line to form the liquid crystal unit 74. In an eleventh embodiment, nine 0.7-inch size liquid crystal devices may be arranged for the same purpose.

It is seen from above that the present invention provides a high-definition picture display device having an extremely large surface and an extremely small thickness. Specifically, a high-definition picture of a size of e.g. 36 inches may be obtained with the display device of a reduced thickness on the order of 10 cm.

Besides, since the enlarged projected fractional pictures have overlapped portions, junction zones between the neighboring fractional pictures or picture quality degrading factors such as shading or defocusing may be reduced significantly to render the junctions less perceptible and to assure a high-quality picture. By the system of synthesizing the three prime colors of R, G and B, significantly higher luminosity may be achieved. Geometrical distortions may be decreased as compared to the conventional concentrated projection type projector using three-color pictures, while the junctions between the adjacent sections may be rendered less perceptible by distribution by the colors R, G and B.

If liquid crystal display devices associated with the three prime colors are employed, the number of pixels may be increased by a factor of three so that a luminosity of 3×3=9 times higher than with the use of only one liquid crystal device may be achieved.

It is noted that a large screen size with a reduced depth of the display device may be achieved by increasing the angle of projection of the fractional pictures on the screen or increasing the number of the fractional pictures, that is by constituting the large screen using an increased number of the fractional pictures. However, if the projection angle is increased, the junctions between the fractional pictures as projected on the screen tends to be more pronounced because focusing tends to be lowered and geometrical distortion tends to be increased from the center towards the periphery of the screen. These inconveniences are overcome with the present embodiment by providing overlap between adjacent fractional pictures.

It will be seen from the foregoing that the present invention provides a picture display device in which a large size screen may be provided with high definition because the fractional pictures are projected to an enlarged scale on the screen and synthesized together to form a screen size picture. Since the fractional pictures adjacent to one another in the horizontal and vertical directions overlap and are synthesized on the screen, a continuous picture free of geometrical distortions and junctions between the fractional pictures may be displayed. A color picture may be obtained because the fractional pictures are projected using the R, G and B light beams. These fractional picture light beams are reflected at least twice before projecting the fractional pictures on the screen so that the distance between the light source and the screen may be diminished. Thus the present invention enables a high-quality picture to be displayed on a large size screen of extremely small thickness.

What is claimed is:

1. An image display device comprising:

a plurality of image projection means for projecting a plurality of fractional images on a screen, said plurality of fractional images, as displayed by said image display means on the screen, being synthesized in a manner wherein a screen-size image is displayed;

means for projecting said fractional images on said screen so that adjacent fractional images are projected with overlapping portions, and gradual decrease type projection angle control means, including a light attenuator, for gradually decreasing the light in said overlapping portions for providing uniform lightness of said overlapping portions of the adjacent fractional images as displayed on said screen;

wherein said light attenuator comprises an optical attenuator which comprises an optical aperture device for gradually decreasing the light in the overlapping portion of adjacent fractional images, and wherein said image projection means includes a projection lens and said optical attenuator device comprises at least two aperture devices, one positioned in front of and one behind said projection lens in the direction of said screen.

2. The image display device according to claim 1 wherein said optical attenuator device comprises three aperture devices.

3. The image display device according to claim 1 wherein said aperture device includes square-shaped apertures.

4. The image display according to claim 1 wherein said aperture device includes slit-shaped apertures.

5. An image display device comprising:

a plurality of image projection means for projecting a plurality of fractional images on a screen so that adjacent fractional images are projected with overlapping portions, said plurality of fractional images, as displayed by said image display means on the screen, being synthesized in a manner wherein a screen-size image is displayed, each of said image projection means including a projection lens; and a plurality of light attenuator means for gradually decreasing the light in said overlapping portions for providing uniform lightness of said overlapping portions of the adjacent fractional images as displayed on said screen, each of said light attenuator means comprising at least two aperture devices, one positioned in front of and one behind said projection lens in the direction of said screen.

* * * * *